(12) United States Patent
Takizawa et al.

(10) Patent No.: US 8,209,712 B2
(45) Date of Patent: *Jun. 26, 2012

(54) DISK CARTRIDGE WITH ROTATABLY SUPPORTED DISK STORAGE PORTIONS

(75) Inventors: Teruyuki Takizawa, Osaka (JP); Masahiro Inata, Hyogo (JP); Kozo Ezawa, Osaka (JP)

(73) Assignee: Panasonic Corporation, Osaka (JP)

(*) Notice: Subject to any disclaimer, the term of this patent is extended or adjusted under 35 U.S.C. 154(b) by 813 days.

This patent is subject to a terminal disclaimer.

(21) Appl. No.: 12/296,133

(22) PCT Filed: Apr. 26, 2007

(86) PCT No.: PCT/JP2007/059444
§ 371 (c)(1),
(2), (4) Date: Oct. 6, 2008

(87) PCT Pub. No.: WO2007/126144
PCT Pub. Date: Nov. 8, 2007

(65) Prior Publication Data
US 2009/0125933 A1 May 14, 2009

(30) Foreign Application Priority Data

Apr. 27, 2006 (JP) ................................. 2006-124207
Jun. 20, 2006 (JP) ................................. 2006-170471

(51) Int. Cl.
*G11B 23/03* (2006.01)
(52) U.S. Cl. ........................................ 720/735; 720/740
(58) Field of Classification Search .................. 720/725, 720/727, 728, 732–735, 738–744; 360/133
See application file for complete search history.

(56) References Cited

U.S. PATENT DOCUMENTS

| 3,788,576 | A | 1/1974 | Buslik |
| 4,695,911 | A | 9/1987 | Loosen |
| 4,740,949 | A | 4/1988 | Davis |

(Continued)

FOREIGN PATENT DOCUMENTS

EP 621594 A2 * 10/1994

(Continued)

OTHER PUBLICATIONS

International Search Report for corresponding Application No. PCT/JP2007/059444 dated Aug. 22, 2007.

(Continued)

*Primary Examiner* — Nathan Danielsen
(74) *Attorney, Agent, or Firm* — Renner, Otto, Boisselle & Sklar, LLP

(57) ABSTRACT

A disk cartridge according to the present invention includes first and second disk storage portions, each of which has a space to partially store a disk with at least one data storage side. When closed up, the first and second disk storage portions enclose the disk entirely. The disk cartridge further includes a supporting base member with a disk storage portion rotation supporting portion that supports rotatably the first and second disk storage portions so as to make or cover an opening with respect to the disk. The opening is used to get the disk chucked externally and to allow a head to access the data storage side of the disk and read and/or write data from/on that side. At least a portion of the supporting base member overlaps with the first and second disk storage portions so as to prevent the first and second disk storage portions from moving perpendicularly to the disk.

10 Claims, 38 Drawing Sheets

U.S. PATENT DOCUMENTS

| | | | |
|---|---|---|---|
| 6,583,956 B2 * | 6/2003 | Kikuchi et al. | 360/133 |
| 2003/0128655 A1 * | 7/2003 | Yim et al. | 369/291 |
| 2006/0294535 A1 * | 12/2006 | Funawatari et al. | 720/734 |

FOREIGN PATENT DOCUMENTS

| | | | |
|---|---|---|---|
| EP | 1 202 269 A2 | 5/2002 | |
| GB | 1 488 273 | 10/1977 | |
| JP | 09-153264 | 6/1997 | |
| JP | 2004-022107 | 1/2004 | |
| WO | 2005/055234 | 6/2005 | |

OTHER PUBLICATIONS

Form PCT/ISA/237 for International Application No. PCT/JP2007/059444 dated Aug. 22, 2007 (previously submitted on Oct. 6, 2008).

* cited by examiner (a)

(b)

(a)

(b)

(a)

(b)

(a)

(b)

(a)

(a)

(a)

(b)

DISK CARTRIDGE WITH ROTATABLY SUPPORTED DISK STORAGE PORTIONS

TECHNICAL FIELD

The present invention relates to a disk cartridge to enclose a disklike data storage medium such as an optical disk or a magnetic disk.

BACKGROUND ART

Various disk cartridges to enclose a disklike data storage medium have been proposed so far.

For example, Japanese Patent Application Laid-Open Publication No. 9-153264 discloses a disk cartridge in which a disklike storage medium with one or two data storage sides (which will be simply referred to herein as a "disk") is fully enclosed in a disk storage portion that is provided inside of a supporting base member consisting of upper and lower housings. The supporting base member has a chucking hole for allowing the turntable of a spindle motor and a damper to chuck a given disk and a head access window for allowing a head to read and write data from/on the disk. The chucking hole and the head access window are continuous with each other, and therefore, dust easily enters the cartridge or a finger mark is often left on the disk through these openings while this cartridge is carried. That is why a shutter that covers these openings is provided for the disk cartridge.

To get the disk chucked or to allow the optical head to access the entire data storage side of the disk, those openings need to be cover the range from around the center of the cartridge through an edge thereof. Also, in a disk cartridge with such a structure, the shutter is supposed to move linearly with respect to the cartridge case, and therefore, a space to store the shutter being opened is needed. For these reasons, the sizes of the openings depend on the outer dimensions of the cartridge. That is to say, it is difficult to design a small cartridge with big openings. As a result, in disk camcorders and other portable electronic devices that use a small cartridge, the maximum allowable size of the optical head is limited, which is a problem.

Also, in loading a disk drive with such a disk cartridge to read and write data from/on the disk enclosed in the cartridge, a space for allowing some error that should occur in positioning the disk cartridge in the disk drive needs to be left in the disk storage space between the upper and lower housings. As a result, the outer dimensions of the cartridge should increase for this reason, too. In addition, to allow such a positioning error, the disk needs to be movable in that space. In that case, however, the disk could move inconstantly within the disk cartridge to possibly get its data storage side scratched. Or the disk might collide against the inner wall of the disk cartridge to produce dust particles, which could deposit themselves on the disk, too.

Besides, the lower housing needs those openings for allowing the turntable of the spindle motor and the head to access the disk and the upper housing needs another opening for allowing the damper to access the disk. That is why a shutter to shut all of these openings at the same time should have a continuous C-shape that covers both the upper and lower housings. However, a shutter of such a shape is expensive, thus increasing the manufacturing cost of the disk cartridge. On top of that, a movement guide portion to open and close the C-shutter needs to be provided for either the upper housing or the lower housing so as to build a bridge across the head access window. And that guide portion limits the height of the head.

What is more, such a C-shutter should have a thin plate shape so as not to increase the thickness of the disk cartridge significantly. For that reason, such a thin shutter cannot guarantee sufficient mechanical strength. Therefore, if the disk cartridge were subjected to great impact, the shutter might be broken. Or if somebody stepped on the cartridge by mistake, the shutter could be deformed so much as to scratch the data storage side of the disk.

DISCLOSURE OF INVENTION

In order to overcome at least one of these problems, the present invention has an object of providing a disk cartridge that can make a large head access window even though its outer dimensions are small.

A disk cartridge according to the present invention includes first and second disk storage portions, each of which has a space to partially store a disk with at least one data storage side. When closed up, the first and second disk storage portions enclose the disk entirely. The disk cartridge further includes a supporting base member with a disk storage portion rotation supporting portion that supports rotatably the first and second disk storage portions so as to make or cover an opening with respect to the disk. The opening is used to get the disk chucked externally and to allow a head to access the data storage side of the disk and read and/or write data from/on that side. At least a portion of the supporting base member overlaps with the first and second disk storage portions so as to prevent the first and second disk storage portions from moving perpendicularly to the disk.

In one preferred embodiment, each of the first and second disk storage portions has a flat and thin inner space to store at least a portion of the disk. The first and second disk storage portions store the disk so as to prevent the disk from being exposed at least where the first and second disk storage portions closed do not overlap with the supporting base member.

In another preferred embodiment, the supporting base member overlaps with only parts of the first and second disk storage portions that are located closer to the disk storage portion rotation supporting portion with respect to the center of the disk that is enclosed in the first and second disk storage portions closed.

In still another preferred embodiment, the first and second disk storage portions have parts engaging with each other and rotate in mutually opposite directions synchronously with each other.

In still another preferred embodiment, the supporting base member includes first and second locking members that prevent the first and second disk storage portions closed up from rotating unnecessarily.

In still another preferred embodiment, the disk cartridge further includes at least one locking member for locking the first and second disk storage portions closed and preventing the first and/or second disk storage portion(s) from rotating with respect to the supporting base member. The first and second disk storage portions assume either a first opened state in which the disk is removable or a second opened state in which the disk is not removable.

In still another preferred embodiment, the first and second locking members are supported rotatably by a locking member rotation supporting portion that is arranged on the supporting base member. The disk cartridge further includes: catching lever portions to contact with respective latching portions of the first and second disk storage portions that are closed up; restriction planes for restricting the rotation of the first and second locking members in the same directions as the first and second disk storage portions that are turning to make the opening by contacting partially with the supporting base member; unlocking levers; and elastic portions for applying elastic force to the first and second locking members to make the first and second locking members rotate in the same directions as the first and second disk storage portions that are turning to make the opening. A distance between the locking member rotation supporting portion and the disk storage portion rotation supporting portion is equal to or shorter than a distance from the latching portions of the first and second disk storage portions to the disk storage portion rotation supporting portion. When the latching portions of the first and second disk storage portions contact with the catching lever portion while the first and second disk storage portions closed are going to rotate, the restriction planes contact with parts of the supporting base member, thereby restricting the rotation of the first and second locking members in the same directions as the first and second disk storage portions. The unlocking levers are pressed down, thereby rotating the first and second locking members in mutually opposite directions and releasing the catching lever portions from the latching portions of the first and second disk storage portions.

In still another preferred embodiment, at least one of the first and second disk storage portions includes a drive interlocking portion to interlock with an external disk drive in order to open or close the first and second disk storage portions.

In still another preferred embodiment, the drive interlocking portion is a groove that has been cut through a side surface of the first and second disk storage portions.

In still another preferred embodiment, the first and second locking members are arranged symmetrically with respect to not only a line segment that connects together the center of the disk and the midpoint between the centers of the disk storage portion rotation supporting portion but also a plane including the axis of rotation of the disk.

In still another preferred embodiment, the locking member is supported rotatably with respect to the first and/or second disk storage portion(s). The locking member is located at one of: a first position in which the locking member locks the first and second disk storage portions closed and prevents the first and second disk storage portions from rotating with respect to the supporting base member; a second position in which the first and second disk storage portions are rotatable and are able to make a transition from the closed state into the first opened state, or vice versa; a third position in the first opened state; and a fourth position in the second opened state.

The disk cartridge of the present invention has no housing that defines the profile of a conventional cartridge but instead includes a pair of disk storage portions that not only defines the profile of the cartridge but also functions as shutters. In a conventional disk cartridge, a movement guide portion for opening and closing its shutter needs to be provided for its head access window. However, according to the present invention, a big head access window with no movement guide portion can be created by opening the pair of disk storage portions. Consequently, even a small cartridge can create as big a head access window as that of a large cartridge. Furthermore, since the disk cartridge of the present invention includes a supporting base member that partially overlaps with the pair of disk storage portions, a disk cartridge with such high mechanical strength as to easily withstand deformation perpendicular to the disk enclosed there is realized.

Other features, elements, processes, steps, characteristics and advantages of the present invention will become more apparent from the following detailed description of preferred embodiments of the present invention with reference to the attached drawings.

BEST MODE FOR CARRYING OUT THE INVENTION

Embodiment 1

Hereinafter, a first preferred embodiment of the present invention will be described.

Figure 1:
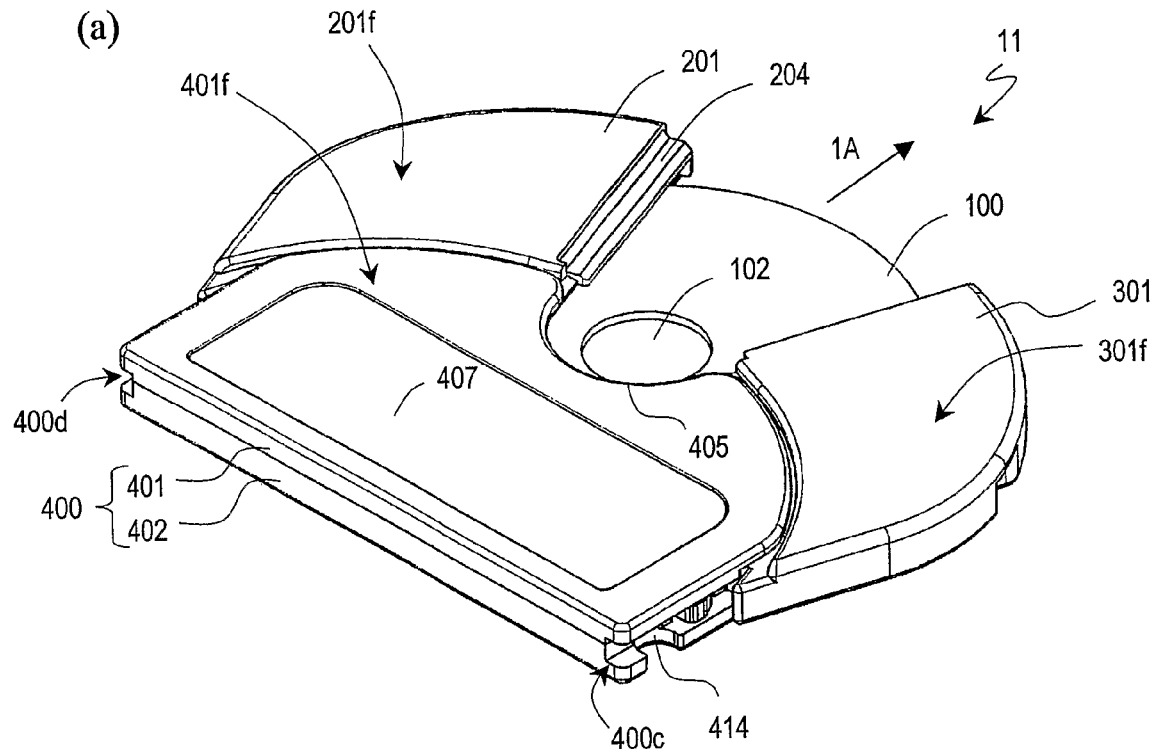
FIGS. 1(*a*) and 1(*b*) are perspective views of a disk cartridge according to a first preferred embodiment of the present invention, as viewed from above the label side of the disk enclosed there, illustrating how the disk cartridge looks in the opened state and in the closed state, respectively.
Figure 1:
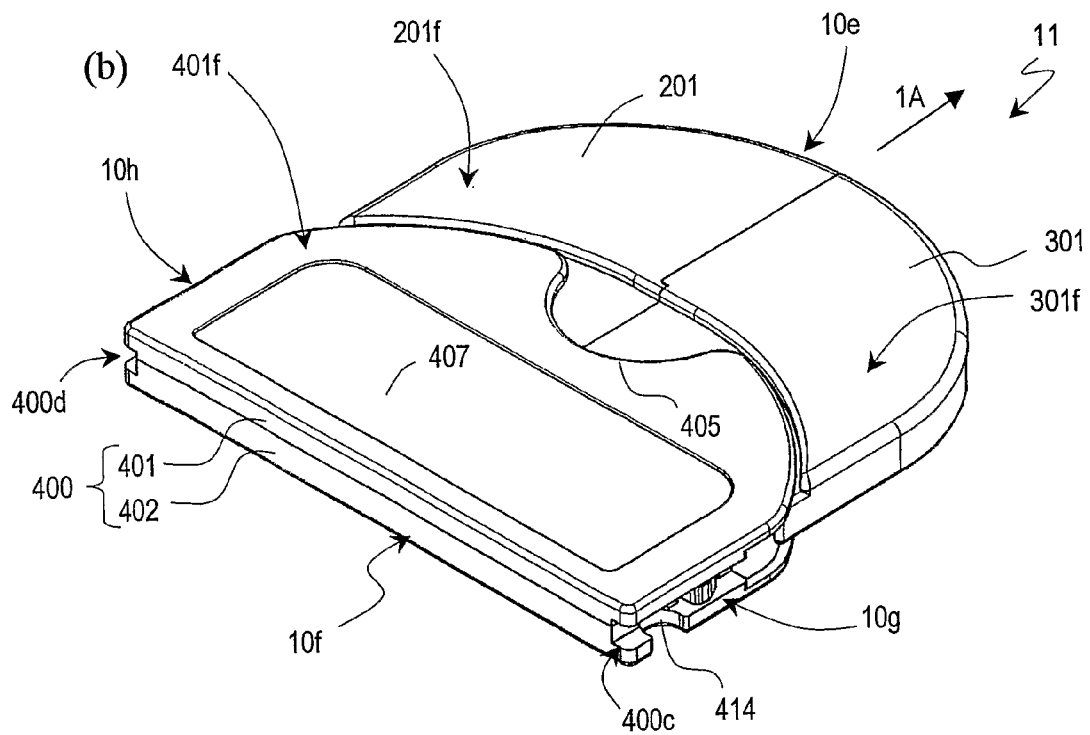

FIG. 1(a) is a perspective view of a disk cartridge 11, as viewed from above the cartridge, illustrating a situation where a disk 100 is enclosed in the cartridge and first and second disk storage portions 201 and 301 are opened. On the other hand, FIG. 1(b) is a perspective view of the disk cartridge 11, as viewed from above the cartridge, illustrating a situation where the first and second disk storage portions 201 and 301 are closed.

Figure 2:
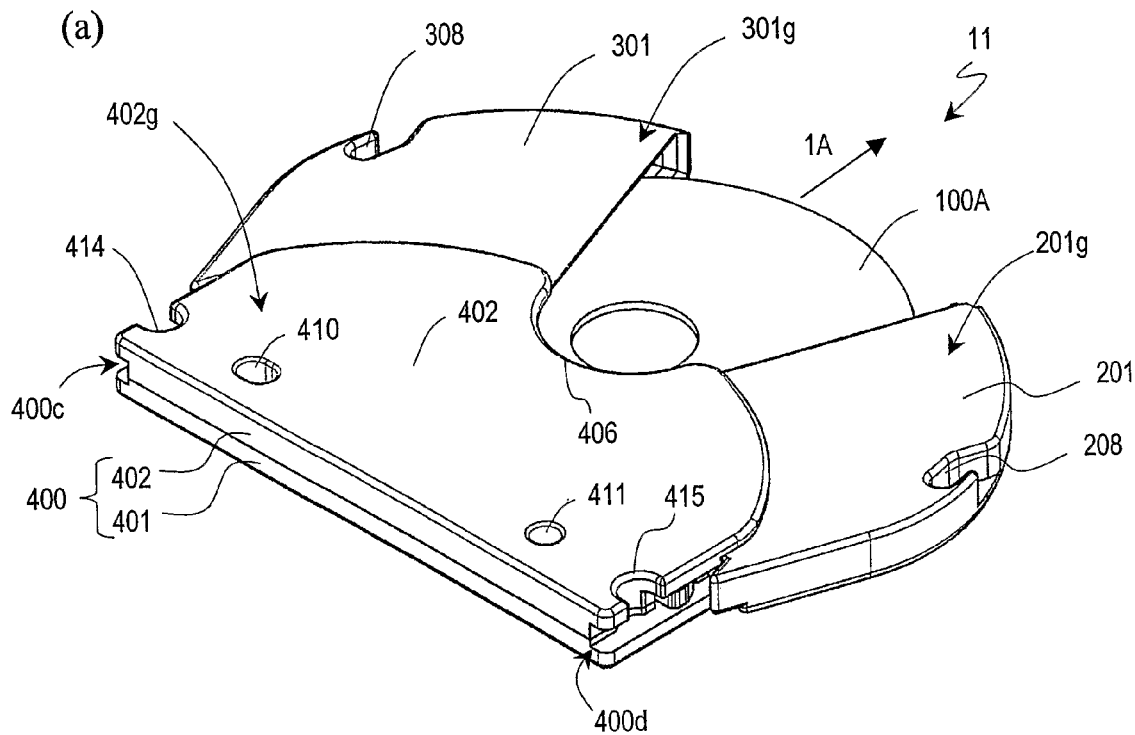
FIGS. 2(*a*) and 2(*b*) are perspective views of the disk cartridge of the first preferred embodiment of the present invention, as viewed from under the data storage side of the disk enclosed there, illustrating how the disk cartridge looks in the opened state and in the closed state, respectively.
Figure 2:
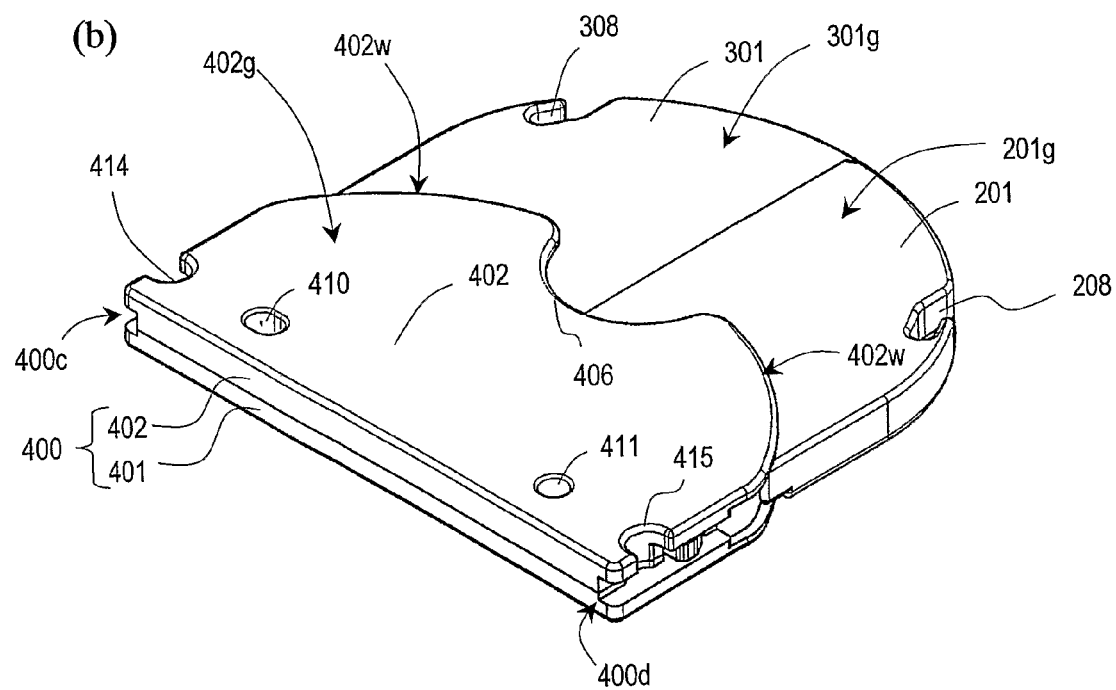

FIG. 2(a) is a perspective view of the disk cartridge 11, as viewed from under the data storage side 100A of the disk, illustrating a situation where the disk 100 is enclosed in the cartridge and the first and second disk storage portions 201 and 301 are opened. On the other hand, FIG. 2(b) is a perspective view of the disk cartridge 11, as viewed from under the data storage side 100A of the disk, illustrating a situation where the first and second disk storage portions 201 and 301 are closed.

Figure 3:
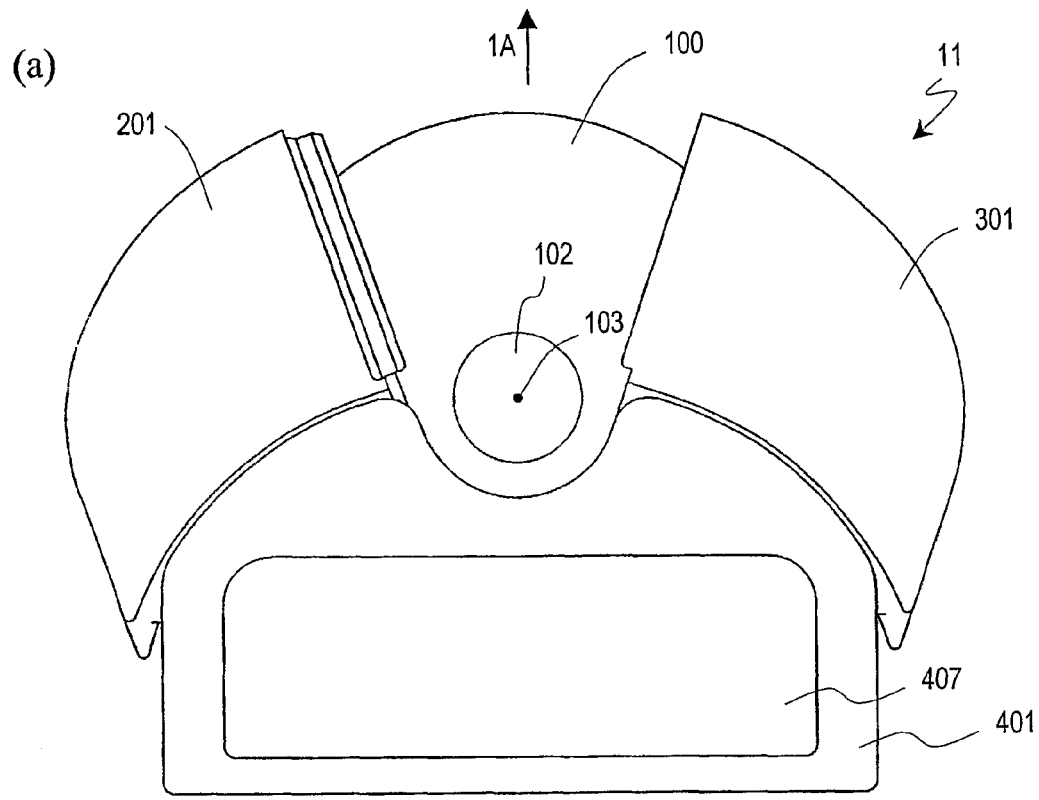
FIGS. 3(*a*) and 3(*b*) are plan views of the disk cartridge of the first preferred embodiment of the present invention, as viewed from above the label side of the disk enclosed there, illustrating how the disk cartridge looks in the opened state and in the closed state, respectively.
Figure 3:
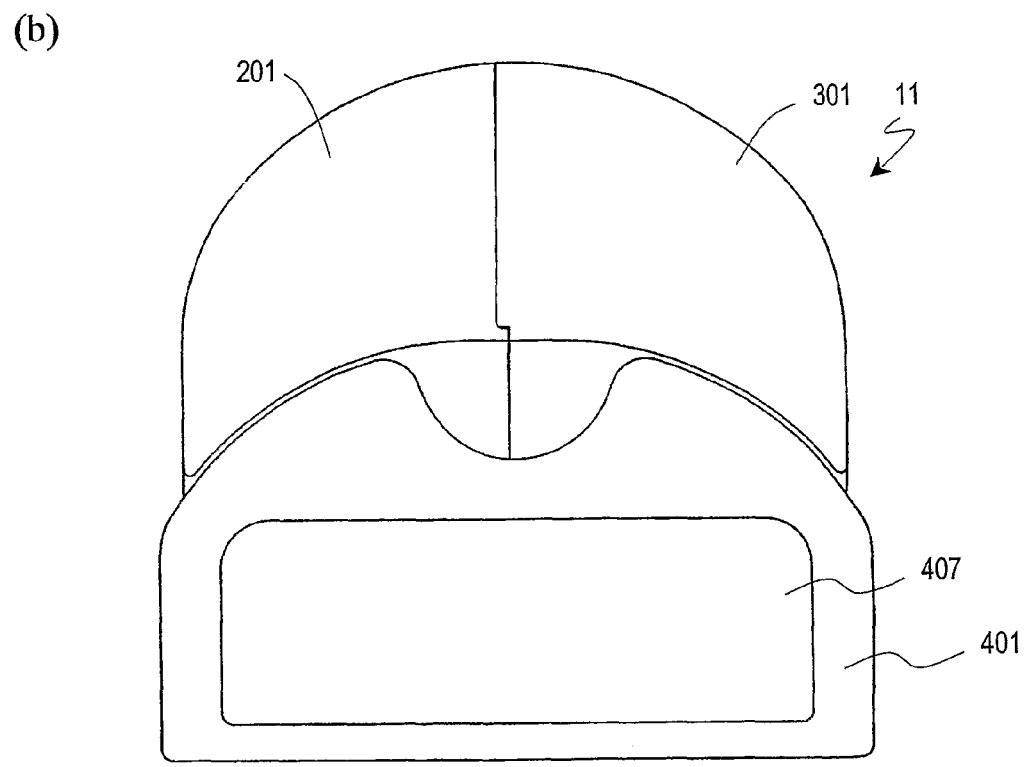

FIG. 3(a) is a top plan view of the disk cartridge 11 illustrating a situation where the disk 100 is enclosed in the cartridge and the first and second disk storage portions 201 and 301 are opened. On the other hand, FIG. 3(b) is a top plan view of the disk cartridge 11 illustrating a situation where the first and second disk storage portions 201 and 301 are closed.

Figure 4:
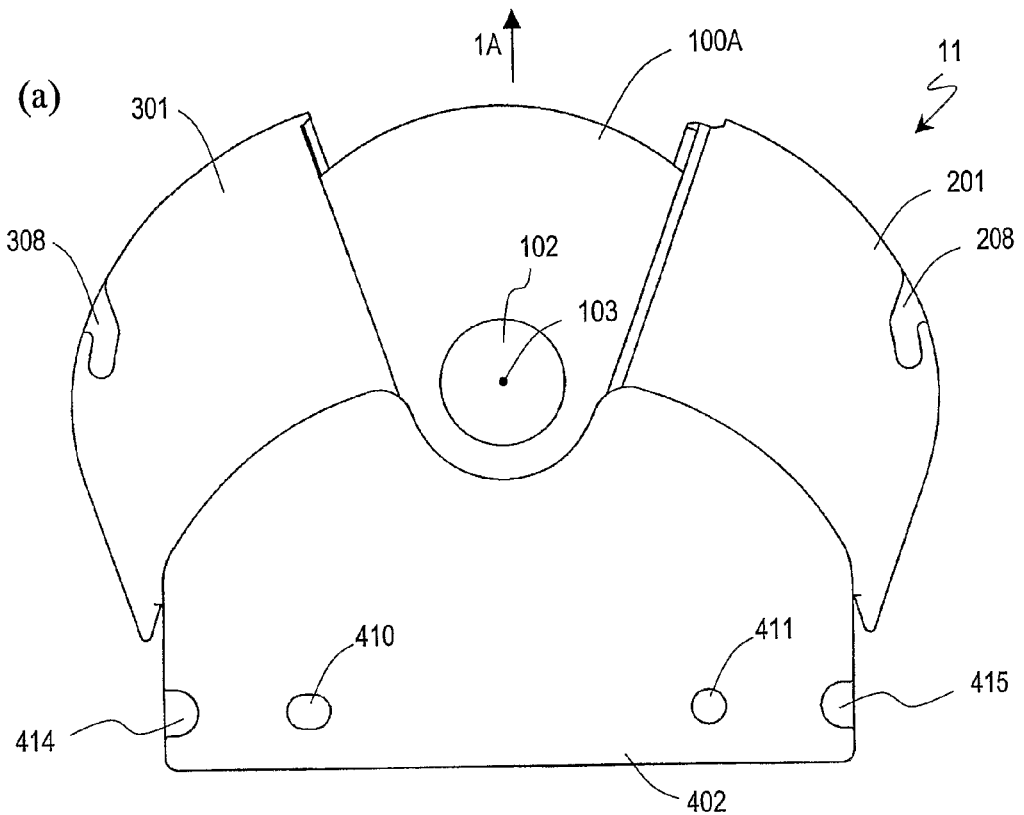
FIGS. 4(*a*) and 4(*b*) are plan views of the disk cartridge of the first preferred embodiment of the present invention, as viewed from under the data storage side of the disk enclosed there, illustrating how the disk cartridge looks in the opened state and in the closed state, respectively.
Figure 4:
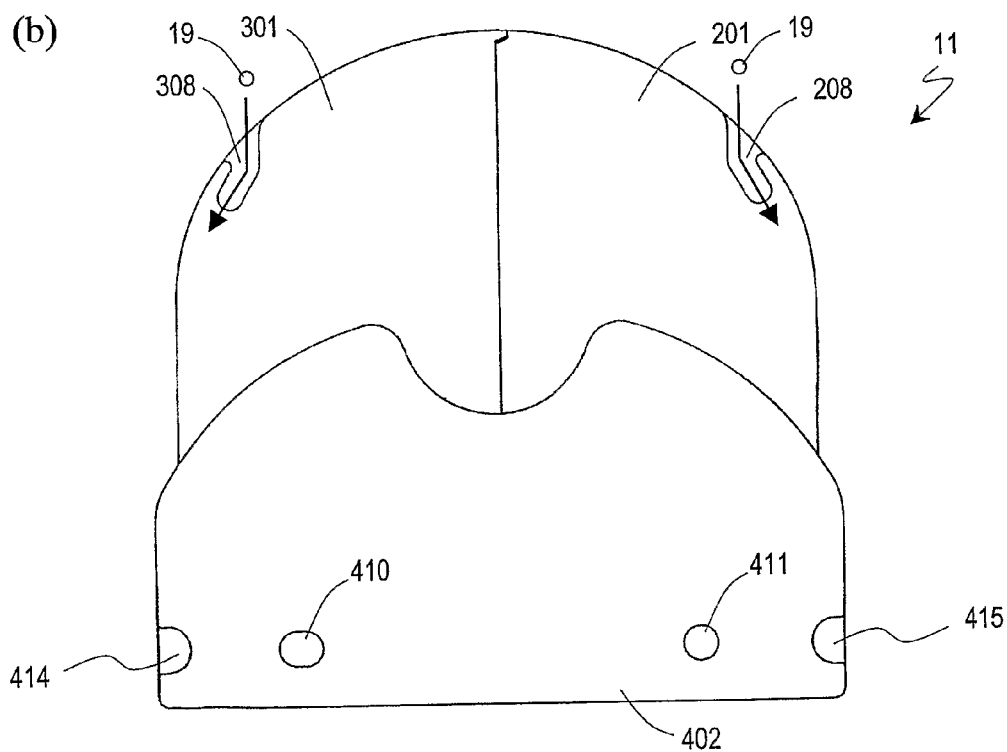

FIG. 4(a) is a bottom view of the disk cartridge 11 illustrating a situation where the disk 100 is enclosed in the cartridge and the first and second disk storage portions 201 and 301 are opened. On the other hand, FIG. 4(b) is a bottom view of the disk cartridge 11 illustrating a situation where the first and second disk storage portions 201 and 301 are closed.

As shown in these drawings, the disk cartridge 11 includes a first disk storage portion 201, a second disk storage portion 301 and a supporting base member 400 and encloses a disk 100 inside.

The disk 100 has first and second sides. The first side of the disk 100, on which a label or any other picture, photo or letters are often printed, is shown in FIGS. 1(a) and 3(a), while the second side of the disk 100, i.e., the data storage side 100A, is not shown in FIGS. 1(a) and 3(a) but in FIGS. 2(a) and 4(a). Optionally, a double-sided disk, of which the first and second sides are both data storage sides, may also be enclosed in the disk cartridge 11. It should be noted that the disk cartridge 11 enclosing the disk 100 could sometimes be simply called a "disk" or a "data storage medium".

Figure 5:
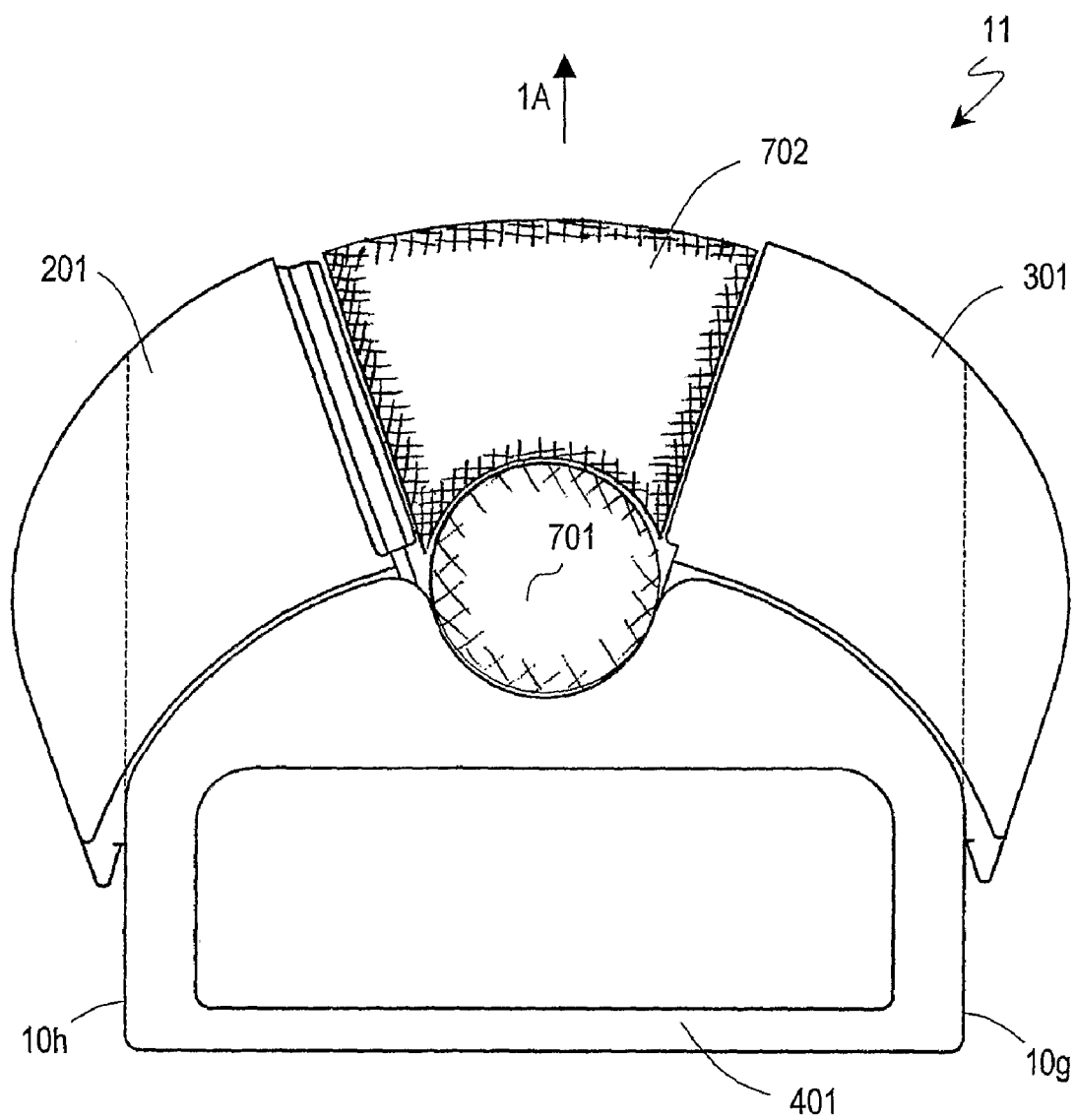
FIG. 5 is a plan view illustrating the head access window and chucking hole of the disk cartridge of the first preferred embodiment of the present invention.

FIG. 5 is a top view of the disk cartridge 11 in which no disk 100 is enclosed and of which the first and second disk storage portions 201 and 301 are opened. As shown in FIG. 5, a chucking hole 701, which has been cut open to allow an external chucking member of a spindle motor to enter the disk cartridge and turn the disk 100, and a head access window 702, which has been cut open to allow a head to enter the disk cartridge and access the data storage side 100A of the disk 100 to read and/or write data from/on the disk 100, are defined between the first and second disk storage portions 201 and 301. These openings are located in a substantially fan-shaped open space to be created between the first and second disk storage portions 201 and 301 that are opened.

In this state, the first and second disk storage portions 201 and 301 partially protrude outward to exceed the width of the disk cartridge 11 that is defined by the side surfaces 10h and 10g. That is why the projection of the disk cartridge 11, including the disk 100, onto a plane that is parallel to the disk 100 has a greater area when the first and second disk storage portions 201 and 301 are opened than when the first and second disk storage portions 201 and 301 are closed.

In this preferred embodiment, the disk 100 has a center hole 102. For example, as the chucking member of a spindle motor, a turntable with a boss may access and mount the disk 100 thereon such that the boss is inserted into the center hole 102. The boss may have a rim to prevent the disk from dropping easily. Instead of providing the rim, a clamper may access the disk 100 from over the disk 100, i.e., opposite from the turntable, and hold the disk on the turntable. Alternatively, a metallic clamp (not shown) may be provided for the disk 100 to load the disk drive with the disk 100.

Figure 6:
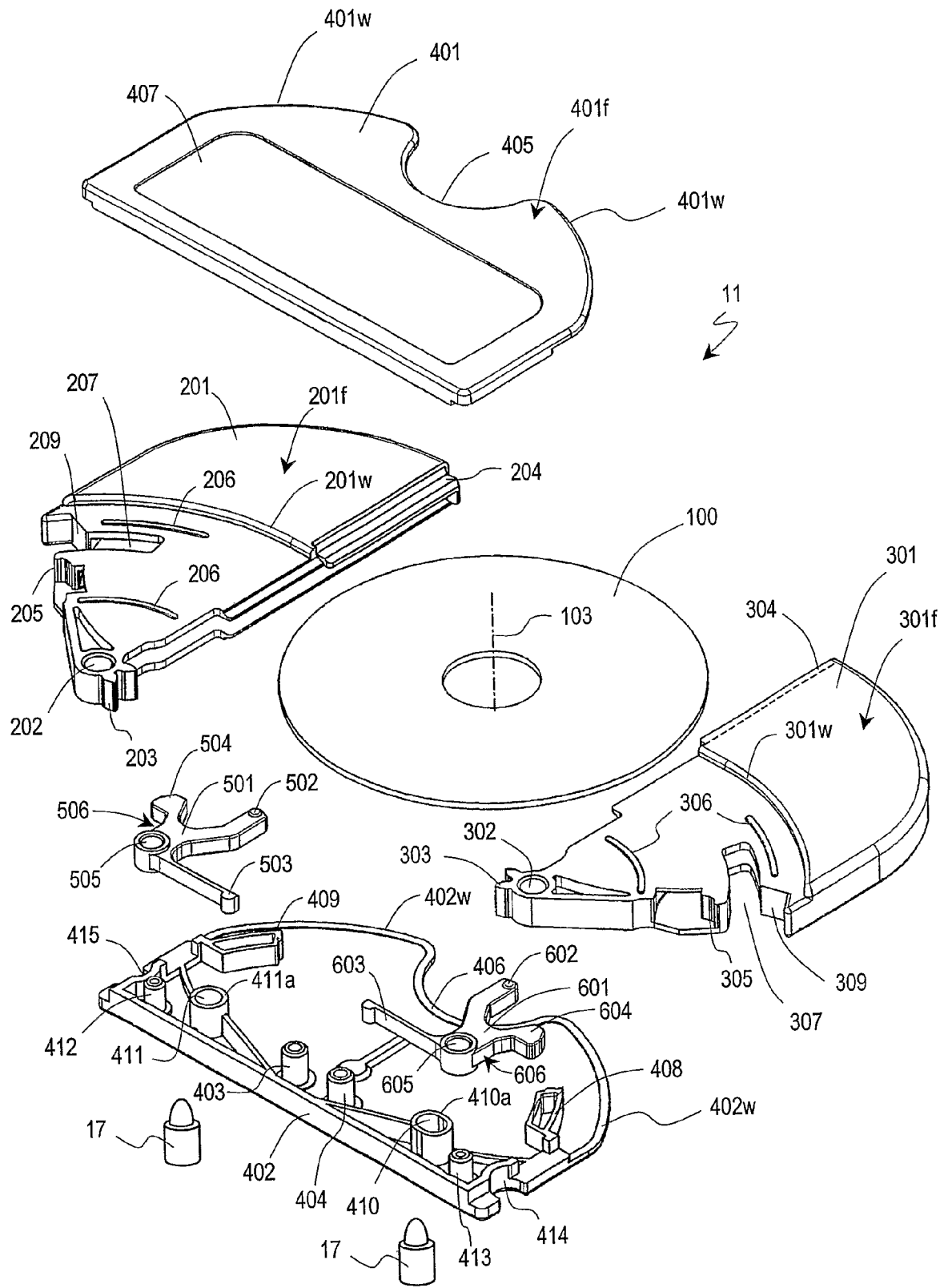
FIG. 6 is an exploded perspective view illustrating the structure of the disk cartridge of the first preferred embodiment of the present invention.

FIG. 6 is an exploded perspective view illustrating the structure of the disk cartridge 11. As described above, the disk cartridge 11 includes the first disk storage portion 201 and the second disk storage portion 301. The supporting base member 400 is made up of a supporting base member upper shell 401 and a supporting base member lower shell 402. The disk cartridge 11 further includes first and second locking members 501 and 601.

Figure 7:
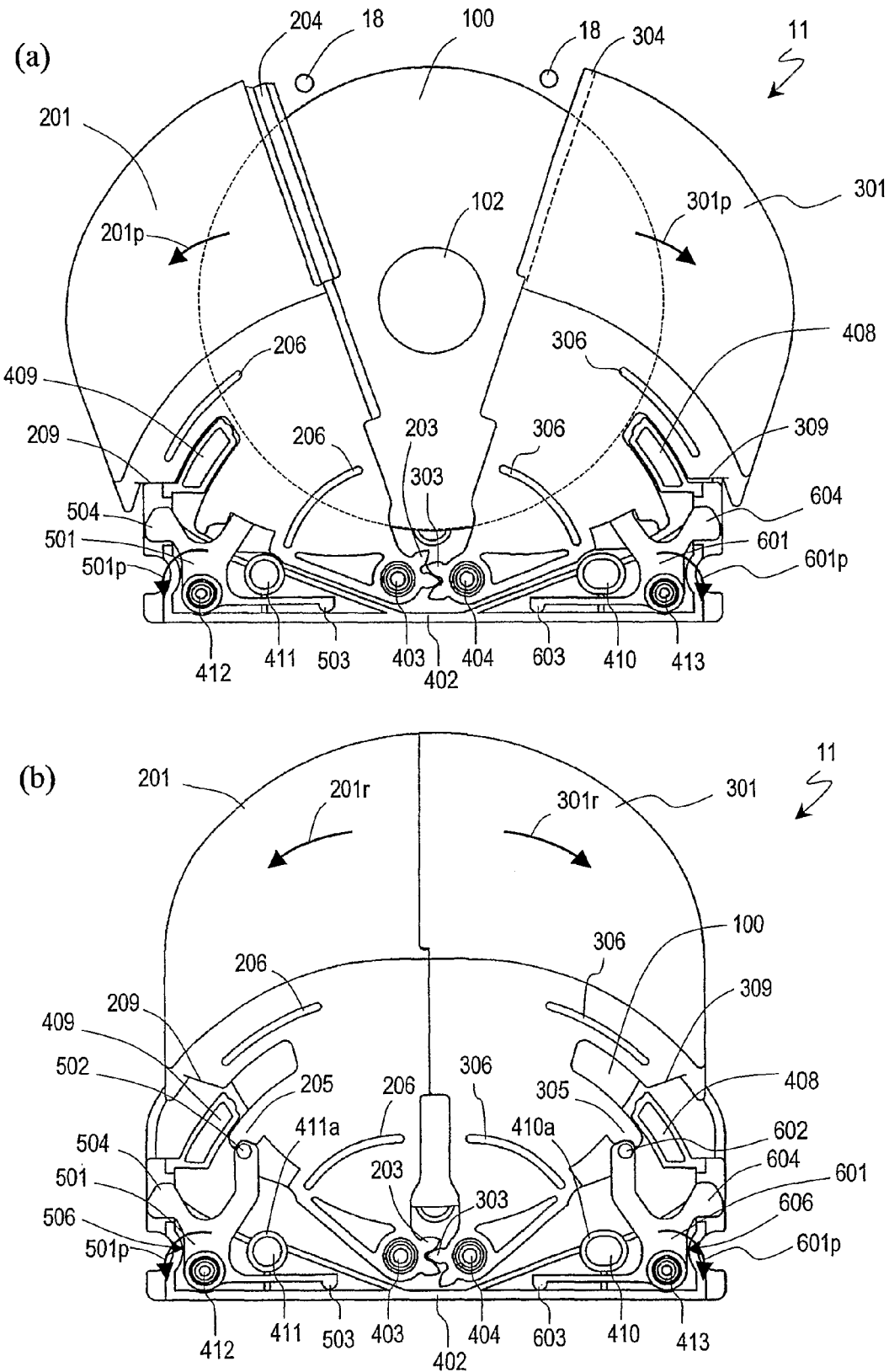
FIGS. 7(*a*) and 7(*b*) are plan views illustrating the structure of the disk cartridge of the first preferred embodiment of the present invention in the opened state and in the closed state, respectively, with the supporting base member upper shell removed.

FIGS. 7(a) and 7(b) are plan views illustrating the structure of all members of the disk cartridge 11 but the supporting base member upper shell 401. Specifically, FIG. 7(a) is a plan view of the disk cartridge 11, as viewed from over the cartridge 11, in a situation where the disk 100 is enclosed and where the first and second disk storage portions 201 and 301 are opened. On the other hand, FIG. 7(b) is a plan view of the disk cartridge 11, as viewed from over the cartridge 11, in a situation where the first and second disk storage portions 201 and 301 are closed.

As shown in FIG. 6, when closed up, the first and second disk storage portions 201 and 301 enclose the disk 100 inside. More specifically, each of the first and second disk storage portions 201 and 301 has a flat and thin inner space like a bag to store or put in a portion of the disk 100. And when the first and second disk storage portions 201 and 301 are closed up such that the borders of the openings of the respective spaces are aligned with each other, an inner space to enclose the entire disk 100 is created.

In principle, the function of exposing and storing the disk 100 to/from an external device can be performed only by the first and second disk storage portions 201 and 301. In a structure including only the first and second disk storage portions 201 and 301, however, if disturbance forces that are perpendicular to the disk 100 (i.e., produced along the axis of rotation 103) are applied to the closed first and second disk storage portions 201 and 301 in mutually opposite directions, then torsional force will be produced to possibly cause significant deformation or damage.

To avoid this problem, the disk cartridge 11 includes the supporting base member 400. At least a portion of the supporting base member 400 overlaps with the first and second disk storage portions 201 and 301 so as to prevent the first and second disk storage portions 201 and 301 from moving perpendicularly to the disk 100. More specifically, respective portions of the upper and lower shells 401 and 402 of the supporting base member 400 support their associated parts of the first and second disk storage portions 201 and 301 in the direction in which the axis of rotation 103 of the disk 100 is defined. In such a structure, even if some torsional force is applied to the first and second disk storage portions 201 and 301, it is still possible to prevent the first and second disk storage portions 201 and 301 from being deformed at least where the disk storage portions 201 and 301 are sandwiched between the upper and lower shells 401 and 402 of the supporting base member 400. As a result, the rigidity of the overall disk cartridge 11 can be increased. Also, as will be described in detail later, a locking mechanism that prevents the first and second disk storage portions 201 and 301 closed from rotating may also be provided.

Also, while the first and second disk storage portions 201 and 301 are opening or closing, the supporting base member 400 is always fixed and stands still. That is why in loading the cartridge 11 into a disk drive, the supporting base member 400 plays an important role as a holder portion that the user can grip with his or her hand. A label recess 407, on which a label sticker showing the contents of data stored on the disk 100 in the cartridge 11 can be attached, may be provided on the supporting base member upper shell 401.

The greater the area of overlap between the supporting base member 400 and the first and second disk storage portions 201 and 301, the more rigid the disk cartridge 11 can be. However, if the supporting base member 400 extended beyond the center of the disk 100, enclosed in the first and second disk storage portions 201 and 301 closed, to reach the head access window, then the open space to be created when the first and second disk storage portions 201 and 301 are opened would be covered with the supporting base member 400. That is why the supporting base member 400 preferably covers only parts of the first and second disk storage portions 201 and 301 that are closer to the shafts 403 and 404 of the first and second disk storage portions 201 and 301 and do not go beyond the center of the disk 100 enclosed in the first and second disk storage portions 201 and 301 closed.

As shown in FIGS. 1(b) and 2(b), where the first and second disk storage portions 201 and 301 are not overlapped by the supporting base member 400, the first and second disk storage portions 201 and 301 store the disk 100 so as not to exposed the disk 100.

Also, as shown in FIGS. 2(a) and 6, the supporting base member lower shell 402 has a pair of positioning holes 410 and 411 that fit into their associated cartridge positioning pins 17 of a disk drive, thereby positioning the disk cartridge 11 with respect to the disk drive. The supporting base member lower shell 402 is located closer to the data storage side 100A of the disk 100 enclosed.

The supporting base member upper and lower shells 401 and 402 are bonded or welded together at their outer peripheries or at the upper ends 410a and 411a on the outer peripheries of the two positioning holes 410 and 411, the upper ends of the shafts 403 and 404 of the first and second disk storage portions 201 and 301, the upper ends of the shafts 412 and 413 of the first and second locking members 501 and 601, and the upper ends on the outer peripheries of positioning portions 408 and 409 for the disk 100, thereby forming the supporting base member 400.

On the inner walls of the first and second disk storage portions 201 and 301, protrusions may be arranged so as to be located inside and outside of the data storage area of the disk 100 and make contact with those portions of the disk when the disk storage portions 201 and 301 are closed up. In this manner, the disk 100 may be held such that the data storage area thereof will not contact with the inner walls. Alternatively, the disk 100 may also be held such that the data storage area thereof can avoid contact with the inner walls by bringing either the outer side surface or the edge of the outer side surface of the disk 100 into contact with the inner walls of the first and second disk storage portions 201 and 301 closed.

As will be described in detail later, the disk cartridge 11 is inserted externally into a disk drive in the direction pointed by the arrow 1A shown in FIG. 1(b) such that the side surface 10e, in which the head access window 702 (see FIG. 5) is defined when the first and second disk storage portions 201 and 301 are opened, is opposed to the insertion slot of the disk drive. In this preferred embodiment, the side surface 10e is a curved raised surface. In this manner, as viewed perpendicularly to the axis of rotation 103 of the disk 100, the outer dimension of the disk cartridge can be reduced. And the size of the disk drive itself to be loaded with such a disk cartridge 11 can be reduced, too. Also, if another side surface 10f and a pair of opposed side surfaces 10g and 10h are flat surfaces, the disk cartridge inserting direction 1A can be easily known by the shape of the disk cartridge 11. Thus, the user can insert the disk cartridge 11 into the disk drive properly without checking the inserting direction indicated on the disk cartridge 11.

Figure 8:
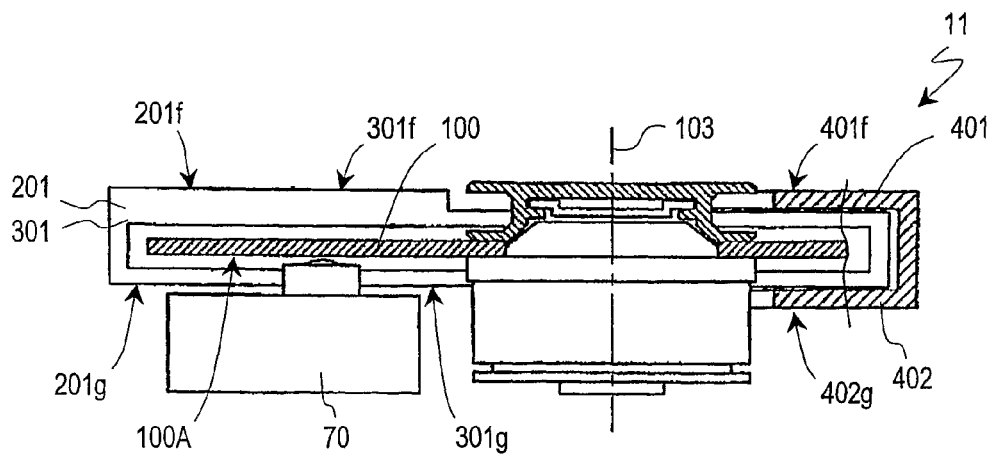
FIG. 8 is a cross-sectional view of the disk cartridge of the first preferred embodiment of the present invention.

FIG. 8 is a cross-sectional view illustrating a situation where the disk cartridge 11 enclosing the disk 100 has been loaded into a disk drive. In this cross-sectional view, the disk cartridge 11 is viewed from beside the outer side surface 10h with the first and second disk storage portions 201 and 301 opened.

As shown in FIGS. 8, 1(a), 1(b), 2(a), 2(b) and 6, the first and second disk storage portions 201 and 301 have outer surfaces 201f and 301f over the first side of the disk 100 and outer surfaces 201g and 301g under the data storage side 100A of the disk 100, respectively. With the curved surfaces 201w and 301w (see FIG. 6), which define paths of rotation of the first and second disk storage portions 201 and 301, and the curved surface 401w of the supporting base member upper shell 401, which is provided along the curved surfaces 201w and 301w, defined as the boundary, the outer surfaces 201f and 301f are leveled with the outer surface 401f of the supporting base member upper shell 401.

As a result, while the first and second disk storage portions 201 and 301 are closed, no level differences are created on the upper surface of the disk cartridge 11 and the upper surface can be a smooth surface of a good design overall. Also, those outer surface portions 201f and 301f of the first and second disk storage portions 201 and 301 can have their thickness increased by the thickness of the supporting base member upper shell 401. As a result, the mechanical strength of the first and second disk storage portions 201 and 301 can be increased and a rigid disk cartridge can be formed without being affected by the height of the disk drive.

On the other hand, the outer surfaces 201g and 301g under the data storage side 100A are not leveled with the outer surface 402g of the supporting base member lower shell 402 and a level difference is created around the curved surface 402w as a boundary. As a result, the outer surface portions 201g and 301g of the disk storage portions 201 and 301 can have their thickness reduced by the thickness of the supporting base member lower shell 402. Consequently, as shown in FIG. 8, the space under the outer surfaces 201g and 301g of the first and second disk storage portions 201 and 301 can have its height increased by the thickness of the supporting base member lower shell 402, and therefore, the head 70 for accessing the disk 100 can be given a greater margin in the height direction. That is to say, the head 70 can be designed more freely and the overall thickness of the disk drive can be reduced by the thickness of the supporting base member lower shell 402.

As will be described in detail later, the supporting base member upper and lower shells 401 and 402 have rim portions 405 and 406 that are similar to a partially notched ring, of which the inside diameter is defined by the chucking hole 701 that is exposed when the first and second disk storage portions 201 and 301 are opened externally.

As can be seen easily from FIG. 6, the first and second disk storage portions 201 and 301 have shaft holes 202 and 302, into which the shafts 403 and 404 are inserted. The shafts 403 and 404 are arranged on the supporting base member lower shell 402 parallel to the axis of rotation 103 of the disk 100. The first and second disk storage portions 201 and 301 further include interlocking portions 203 and 303 that engage with each other. As shown in FIGS. 7(a) and 7(b), as the interlocking portions 203 and 303 engage with each other, the first and second disk storage portions 201 and 301 rotate on the shafts 403 and 404 in mutually opposite directions and synchronously with each other.

As shown in FIG. 7(a), by arranging the shafts 403 and 404 on the supporting base member lower shell 402 outside of the projection area of the disk 100 that is defined perpendicularly to the disk 100 (i.e., along the axis of the rotation 103 of the disk 100), it is possible to avoid a situation where the disk 100 and the shafts 403 and 404 overlap with each other in the thickness direction of the disk cartridge 11. As a result, the thickness of the disk cartridge 11 can be reduced.

In addition, by providing the two different shafts 403 and 404 for the first and second disk storage portions 201 and 301 and by using gears as the interlocking portions 203 and 303, the first and second disk storage portions 201 and 301 can be rotated in mutually opposite directions and synchronously with each other using a simple structure. The first and second disk storage portions 201 and 301 are interlocked with each other in order to lock the first and second disk storage portions 201 and 301 more firmly and eventually increase the rigidity of the disk cartridge 11.

Furthermore, since there is no overlapping area between the first and second disk storage portions 201 and 301, the thickness of the disk cartridge 11 can be reduced. Nevertheless, the first and second disk storage portions 201 and 301 may be rotated on a single shaft if necessary. In that case, the space saved by aligning the two axes can be used for a locking mechanism, for example.

As shown in FIGS. 6, 7(a) and 7(b), the first and second locking members 501 and 601 have shaft holes 505 and 605, respectively. By fitting these shaft holes 505 and 605 into the shafts 412 and 413, which are provided as second rotation supporting portions for the supporting base member lower shell 402, the first and second locking members 501 and 601 are supported rotatably on the shafts 412 and 413.

The first and second locking members 501 and 601 include catching lever portions 502, 602, elastic portions 503, 603 as elastic force applying portions, unlocking lever portions 504, 604, and restriction planes 506, 606, respectively. As shown in FIGS. 7(a) and 7(b), when the first and second disk storage portions 201 and 301 are closed up externally, the catching lever portions 502 and 602 respectively contact with the latching portions 205 and 305 of the first and second disk storage portions 201 and 301, while the restriction planes 506 and 606 contact with portions of the supporting base member lower shell 402.

The distance from the shaft 412, 413 to the shaft 403, 404 is equal to or shorter than the distance from the latching portion 205, 305 to the shaft 403, 404. That is why it is possible to prevent the first and second locking members 501 and 601 from turning in the same directions 501p and 601p as the first and second disk storage portions 201 and 301 that are going to open. That is to say, when the first and second disk storage portions 201 and 301 are closed up, their rotations can be locked independently of each other.

Also, by pressing down the unlocking lever portions 504 and 604, the first and second locking members 501 and 601 can be rotated in opposite directions, compared to the situation where the first and second disk storage portions 201 and 301 should be locked, thereby releasing the catching lever portions 502 and 602 from the latching portions 205 and 305 of the first and second disk storage portions 201 and 301, respectively. As a result, the first and second disk storage portions 201 and 301 are now unlocked and rotatable.

As shown in FIGS. 6, 7(a) and 7(b), the supporting base member lower shell 402 includes positioning portions 408 and 409. As will be described in detail later, when the first and second disk storage portions 201 and 301 are opened externally, the positioning portions 408 and 409 and restricting members 18 of a disk drive, which are now located inside the head access window 702, restrict the position of the outer side surface of the disk 100, thereby positioning the center of the disk 100 accurately and getting the center hole 102 of the disk 100 chucked by the spindle motor just as intended. As described above, the disk cartridge 11 is positioned with respect to the disk drive using the positioning holes 412 and 411 and the disk 100 is also positioned by using the positioning portions 408 and 409. As a result, the disk 100 can be positioned more accurately.

Figure 9:
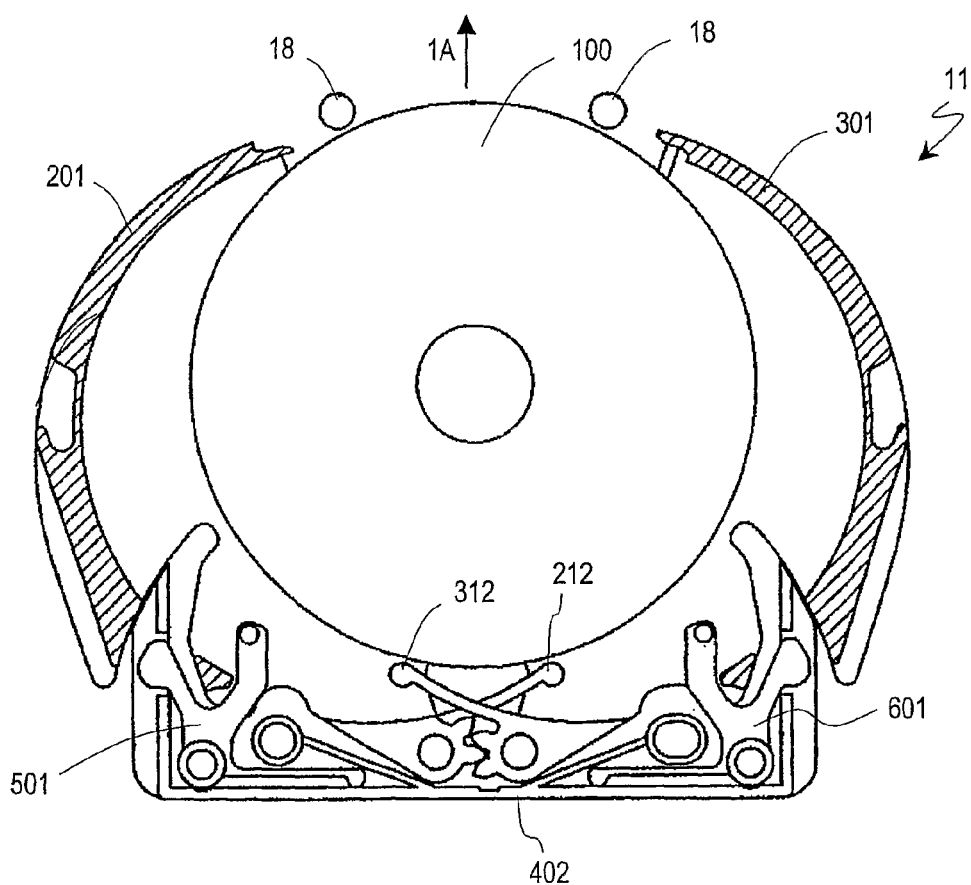
FIG. 9 is a plan view illustrating the structure of an alternative disk cartridge according to the first preferred embodiment of the present invention in the opened state with the supporting base member upper shell removed in a situation where the disk storage portions thereof include disk positioning members.

The disk cartridge 11 may include any other type of positioning portions instead of the positioning portions 408 and 409. FIG. 9 is a plan view illustrating the structure of the disk cartridge 11 with the supporting base member upper shell 401 removed. In FIG. 9, alternative positioning portions 212 and 312 are provided for the disk cartridge 11.

As shown in FIG. 9, as the first and second disk storage portions 201 and 301 are going to be opened externally, the positioning portions 212 and 312, provided for the first and second disk storage portions 201 and 301, contact with the outer side surface of the disk 100 while crossing each other in torsional relation along the axis of rotation 103 of the disk 100, thereby pushing the disk 100 in the direction pointed by the arrow 1A and soon making the outer side surface of the disk 100 contact with the restricting members 18 of the disk drive to position the disk 100. As a result, the center of the disk 100 can be positioned with respect to the restricting members 18 of the disk drive. That is to say, the positioning accuracy can be totally dependent on the disk drive in that case.

It should be noted that when the first and second disk storage portions 201 and 301 are closed, the position of the disk may be restricted by bringing the outer side surface of the disk 100 into a light contact with the inner surfaces of the first and second disk storage portions 201 and 301 or the movement of the disk 100 may be restricted by shortening the distance from the inner surface to the disk 100.

When the first and second disk storage portions 201 and 301 are going to be opened or closed, protrusions 206 and 306, provided for the first and second disk storage portions 201 and 301, slide while keeping contact with the supporting base member upper shell 401, thereby reducing the load resistance caused by rotation friction. Although not shown, similar protrusions are also arranged on the first and second disk storage portions 201 and 301 that contact with the supporting base member lower shell 402 closer to the data storage side 100A of the disk 100. The same effects are achieved even by arranging those protrusions on the surfaces of the supporting base member upper and lower shells 401 and 402 that are supposed to slide while keeping contact with the first and second disk storage portions 201 and 301.

As shown in FIG. 7(b), when the first and second disk storage portions 201 and 301 are closed up to cover the chucking hole 701 and the head access window 702 to the external device, the disk 100 is held with its movement perpendicular to the axis of rotation 103 of the disk 100 controlled by the positioning portions 408 and 409 and the storage inner walls (not shown) of the first and second disk storage portions 201 and 301.

Also, the latching portions 205 and 305 of the first and second disk storage portions 201 and 301 are making tight contact with, and are locked by, the catching lever portions 502 and 602 of the first and second locking members 501 and 601, of which the rotations in the directions pointed by the arrows 501p and 601p are restricted. In this manner, the rotations of the first and second disk storage portions 201 and 301 are locked by the supporting base member 400 via the first and second locking members 501 and 601. As a result, the rigidity of the disk cartridge 11 can be increased perpendicularly to the axis of rotation 103 of the disk 100.

As shown in FIGS. 6, 7(a) and 7(b), parts of the first and second disk storage portions 201 and 301 that define the respective openings of the spaces to store the disk 100 are raised and recessed overlapping edge portions 204 and 304, which are shaped so as to make a perfect fit with each other. In these drawings, only the upper parts of the overlapping edge portions 204 and 304, which are located over the first side of the disk 100, are illustrated. However, overlapping edge portions of the same shapes are also provided for the lower parts of the first and second disk storage portions 201 and 301 under the data storage side 100A of the disk 100.

By providing these overlapping edge portions 204 and 304 for the first and second disk storage portions 201 and 301, when the first and second disk storage portions 201 and 301 are closed up, dust will not reach the data storage side 100A of the disk 100 through the tightly fitted portions, thus increasing the dustproofness of the disk cartridge 11. In addition, by overlapping the tight-fitting portions of the first and second disk storage portions 201 and 301 with each other, the rigidity of the disk cartridge 11 can be increased significantly along the axis of rotation 103 of the disk 100. As a result, a disk cartridge 11 with increased impact resistance and mechanical strength is realized.

Besides, since the structure in which the first and second disk storage portions 201 and 301 are partially overlapped and sandwiched by the supporting base member upper and lower shells 401 and 402 is adopted, the mechanical strength of the disk cartridge 11 can be increased in the thickness direction. And it is possible to prevent the disk cartridge 11 from being deformed and scratching the data storage side 100A of the disk 100. What is more, since the supporting base member 400 partially covers the junction between the first and second disk storage portions 201 and 301 closed, the dustproofness of the disk cartridge 11 can also be increased.

In assembling the disk cartridge 11, first, with the disk 100 enclosed, the interlocking portions 203 and 303 are engaged with each other and the first and second disk storage portions 201 and 301 are closed up. Next, the first and second disk storage portions 201 and 301 closed are attached onto the supporting base member lower shell 402. Subsequently, the first and second locking members 501 and 601 are fitted to the supporting base member lower shell 402. Finally, the supporting base member upper shell 401 is bonded to, or welded with, the supporting base member lower shell 402. In this manner, all of these members can be arranged from the same direction. As a result, the assembling process can be simplified.

Hereinafter, it will be described how to open and close the first and second disk storage portions 201 and 301 after the cartridge 11 has been loaded into a disk drive.

If the disk cartridge 11 is inserted into the disk drive in the direction pointed by the arrow 1A shown in FIG. 1(b), a pair of unlocking protrusions (not shown) provided for the disk drive contact with, and press down, the unlocking levers 504 and 604 at the same time. Then, the first and second locking members 501 and 601 rotate in the directions opposite to those pointed by the arrows 501p and 601p while deforming the elastic members 503 and 603 as shown in FIG. 7(b). As a result of this operation, the catching lever portions 502 and 602 of the first and second locking members 501 and 601, which have been in contact with the latching portions 205 and 305 of the first and second disk storage portions 201 and 301, are released at the same time, thus making the first and second disk storage portions 201 and 301 rotatable.

As the cartridge 11 is inserted even deeper in the direction pointed by the arrow 1A, a pair of opening/closing levers 19 arranged in the disk drive soon get interlocked with drive interlocking portions 208 and 308 of the first and second disk storage portions 201 and 301 as shown in FIG. 4(b). The drive interlocking portions 208 and 308 are grooves that have openings on the side surface 10e that is opposed to the disk drive, extend from those openings in a predetermined direction (i.e., opposite to that pointed by the arrow 1A) and then run outward from the center of the cartridge 11 as shown in FIG. 4(b). Since the grooves run outward, the force received from the pair of opening/closing levers 19 is likely to be applied in the rotational tangential direction of the first and second disk storage portions 201 and 301 that have just started to rotate. Also, if the ends of the grooves have arced side surfaces, the first and second disk storage portions 201 and 301 can receive more easily the rotational tangential components of the force from the opening/closing levers 19, irrespective of how much the first and second disk storage portions 201 and 301 have rotated. As a result, the opening/closing levers 19 can open and close the first and second disk storage portions 201 and 301 more smoothly.

When the opening/closing levers 19 get interlocked with the grooves of the drive interlocking portions 208 and 308, the opening/closing levers 19, which are actually fixed, relatively move along the grooves. As a result, the opening/closing levers 19 rotate the first and second disk storage portions 201 and 301 in the directions pointed by the arrows 201p and 301p shown in FIG. 7(a), thereby opening the first and second disk storage portions 201 and 301.

The first and second disk storage portions 201 and 301 interlock with each other via the mutually engaging interlocking portions 203 and 303 and rotate in mutually opposite directions synchronously with each other. That is why it is not always necessary to provide a pair of opening/closing levers and a similar opening/closing operation is realized even by just one of the two drive interlocking portions 208 and 308. Nevertheless, by providing that pair of drive interlocking portions 208 and 308, the disk cartridge 11 being inserted into the disk drive can go straight with more certainty and the inserting/ejecting operations can be done with more stability.

Next, the first and second disk storage portions 201 and 301 rotate until the chucking hole 701 and head access window 702 shown in FIG. 5 are fully exposed to the external device. In such a state, a pair of cartridge inserted position sensing levers (not shown), provided for the disk drive, gets engaged with the notches 414 and 415 of the supporting base member lower shell 402, thereby fixing the inserted position of the cartridge 11. Then the restricting members 18 of the disk drive, now located within the head access window 702, and the positioning portions 408 and 409 restrict the outer side surface of the disk 100, thereby positioning the center of the disk 100 accurately.

Finally, the pair of cartridge positioning pins 17, the spindle motor (not shown) and the head (not shown, either) of the disk drive are moved up toward the data storage side 100A of the disk 100, thereby positioning the disk cartridge 11, getting the center hole 102 of the disk 100 chucked into the spindle motor just as intended, and fixing the head at a desired vertical level and predetermined planar location with respect to the data storage side 100A.

To prevent the positioning portions 408 and 409 from interfering with the rotation of the first and second disk storage portions 201 and 301 in the directions pointed by the arrows 201p and 301p, respectively, the first and second disk storage portions 201 and 301 have notched portions 207 and 307, respectively. Also, by bringing the rotation restricting portions 209 and 309 of the first and second disk storage portions 201 and 301 into contact with the supporting base member lower shell 402, the rotations of the first and second disk storage portions 201 and 301 in the directions pointed by the arrows 201p and 301p are restricted such that the disk 100 will never drop from the cartridge 11 while the first and second disk storage portions 201 and 301 are turning.

If the disk 100 enclosed has only one data storage side 100A, the drive interlocking portions 208 and 308 are cut on the outer surfaces 201g and 301g of the first and second disk storage portions 201 and 301. In that case, even if the disk cartridge 11 were inserted upside down into the disk drive by mistake, the opening/closing levers of the drive would contact with the side surface 10e of the first and second disk storage portions 201 and 301, thus preventing the disk cartridge 11 from being loaded erroneously.

On the other hand, if the disk enclosed has data storage layers on both of the first and second sides, then there is no need to tell one side from the other. In that case, the drive interlocking portions are extended through the outer surfaces 201f and 301f, thereby eliminating interference between the opening/closing levers and the side surface 10e. And the notched portions 414 and 415 are also extended through the outer surface 401f to make the first and second disk storage portions 201 and 301 openable and closable on both of the first and second sides.

Figure 10:
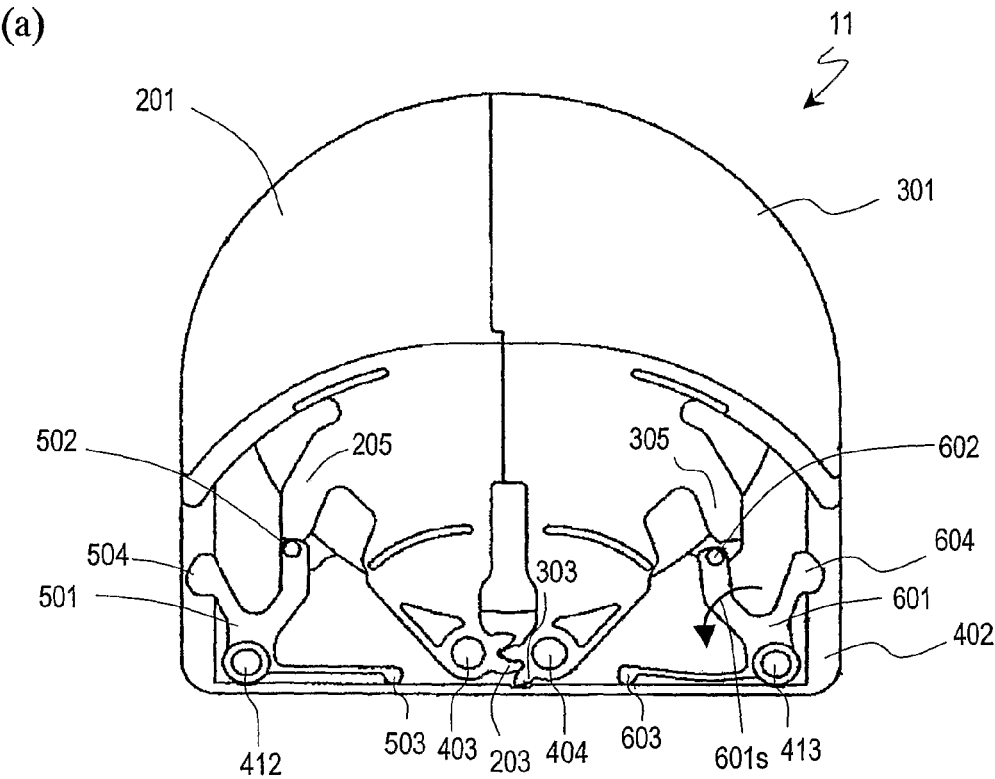
FIGS. 10(*a*) and 10(*b*) are plan views illustrating the structure of the disk cartridge of the first preferred embodiment of the present invention with one of the two locking members unlocked and with both unlocked, respectively, and with the supporting base member upper shell removed.
Figure 10:
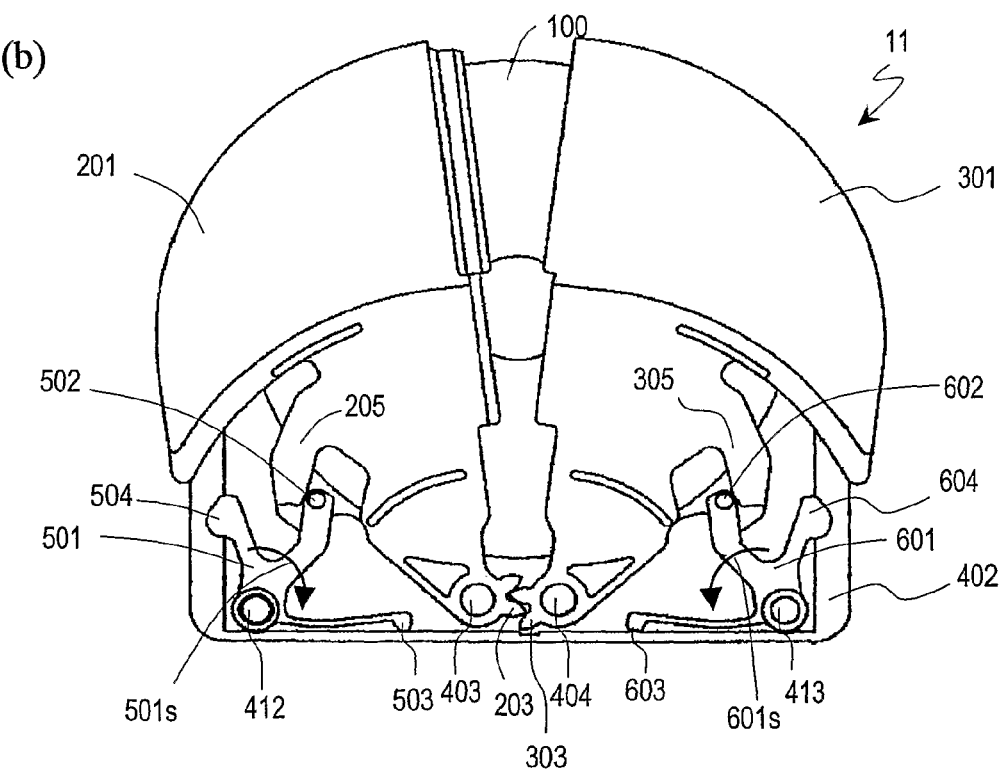

The unlocking operation will be further described. FIGS. 10(a) and 10(b) are plan views illustrating the structure of the disk cartridge 11 with one of the two locking members unlocked and with both unlocked, respectively, and with the supporting base member upper shell 401 removed.

As shown in FIG. 10(a), when the first and second disk storage portions 201 and 301 are closed up, only the second one 601 out of the two locking members 501 and 601 is unlocked. More specifically, the unlocking lever portion 604 of the second locking member 601 is pressed down, and the second locking member 601 is turned in the direction 601s with the elastic portion 603 deformed. As a result, the catching lever portion 602 of the second locking member 601 is released from the latching portion 305 of the second disk storage portion 301. Consequently, the second locking member 601 is unlocked. Meanwhile, the first disk storage portion 201 is still locked by the first locking member 501. And the first and second disk storage portions 201 and 301 are interlocked with each other via the interlocking portions 203 and 303. That is why the first and second disk storage portions 201 and 301 cannot still be opened. That is to say, the first and second disk storage portions 201 and 301 cannot be opened just by unlocking only one of the two locking members 501 and 601 externally.

On the other hand, suppose the first and second locking members 501 and 601 are both unlocked as shown in FIG. 10(b) when the first and second disk storage portions 201 and 301 are closed up. More specifically, the unlocking lever portions 504 and 604 are externally pressed down at the same time, and the first and second locking members 501 and 601 are turned in the directions 501s and 601s, respectively, with the elastic portions 503 and 603 deformed simultaneously. As a result, the catching lever portions 502 and 602 of the first and second locking members 501 and 601 are released from the latching portions 205 and 305 of the first and second disk storage portions 201 and 301, respectively. Consequently, the first and second locking members 501 and 601 are both unlocked. That is why the first and second disk storage portions 201 and 301 can be opened only when the first and second locking members 501 and 601 are unlocked at the same time. For that reason, it is difficult for the operator to open the first and second disk storage portions 201 and 301 of the disk cartridge 11 either accidentally or intentionally, and therefore, it is possible to prevent him or her from doing damage on the disk 100 carelessly or purposely. However, if at least one of the two locking members 501 and 601 is provided, the disk storage portions can be locked. That is why the disk cartridge 11 may have only one locking member. In that case, the number of components required can be reduced beneficially.

As shown in FIGS. 1(a), 1(b), 2(a) and 2(b), the side surfaces 10g and 10h of the supporting base member 400 has slits 400c and 400d that extend parallel to the inserting direction 1A of the disk cartridge 11.

Figure 11:
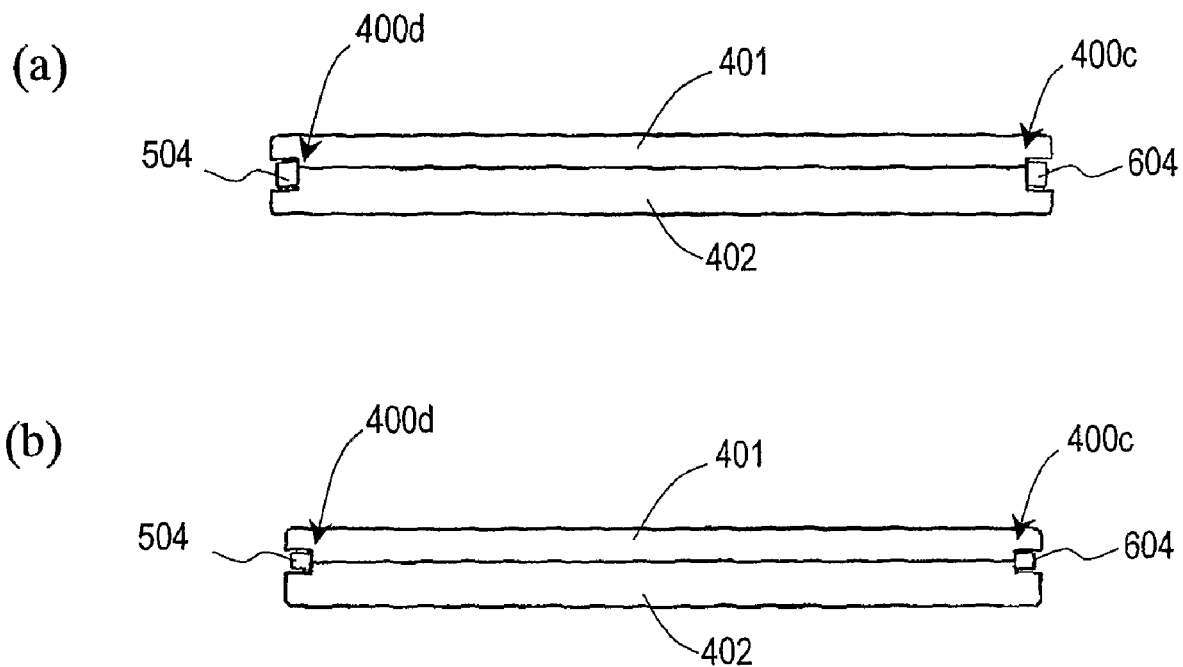
FIGS. 11(*a*) and 11(*b*) are side views illustrating the locking members of the disk cartridge of the first preferred embodiment of the present invention.

FIGS. 11(a) and 11(b) are side views of the supporting base member 400, consisting of the supporting base member upper and lower shells 401 and 402, as viewed from beside the side surface 10f. As shown in FIGS. 11(a) and 11(b), the unlocking lever portions 504 and 604 protrude into the slits 400d and 400c, respectively. The slits 400c and 400d may be located at the intermediate level of the thickness of the supporting base member 400 as shown in FIG. 11(a). Alternatively, the slits 400c and 400d may be slightly offset toward either the top or the bottom of the supporting base member 400 as shown in FIG. 11(b).

When the disk cartridge 11 is loaded into the disk drive, a pair of unlocking protrusions (not shown) provided for the disk drive is inserted into the slits 400d and 400c without interference. As the disk cartridge 11 goes deeper, these unlocking protrusions relatively move inside the slits 400d and 400c to contact with, and press down, the unlocking levers 504 and 604 simultaneously and thereby unlock the disk storage portions 201 and 301.

The structure in which the slits 400c and 400d are located at the center of the thickness of the supporting base member 400 as shown in FIG. 11(a) is applicable to a cartridge 11 that encloses a double-sided disk 100, i.e., of which the first and second sides are both data storage sides. In that case, even if the cartridge 11 is inserted upside down into the disk drive, the unlocking protrusions will also be fitted into the slits 400c and 400d properly and unlock the disk storage portions just as intended.

On the other hand, the structure in which the slits 400c and 400d are offset from the center of the thickness of the supporting base member 400 toward either side of the supporting base member 400 as shown in FIG. 11(b) is applicable to only a cartridge 11 that encloses a disk 100, just the second side of which is a data storage side.

In that case, if the cartridge 11 were inserted upside down into the disk drive, then the unlocking protrusions would not be fitted into the slits 400c and 400d but interfered with by the supporting base member 400. As a result, the disk cartridge 11 could not be loaded into the disk drive. That is to say, it is possible to prevent the cartridge 11 from being loaded erroneously. It should be noted that if that erroneous loading needs to be prevented using the drive interlocking portions 208 and 308, then the slits 400c and 400d do not have to be offset with respect to the center of the thickness of the supporting base member 400.

As described above, according to this preferred embodiment, the two disk storage portions rotate in mutually opposite directions while interlocking with each other, thus making a big opening when the disk storage portions are opened. By adopting such a structure, a head access window that is at least as large as that of a big disk cartridge can be provided. That is why even a head that is ordinarily used for a big disk cartridge can also access the disk enclosed in the disk cartridge of this preferred embodiment.

Also, according to this preferred embodiment, when the first and second disk storage portions 201 and 301 are opened, the projection formed by the disk 100, the first and second disk storage portions 201 and 301, and the supporting base member 400 along the axis of rotation 103 of the disk 100 has a greater area compared to the situation where the first and second disk storage portions 201 and 301 are closed. That is why when the disk cartridge 11 in such a state is loaded in the disk drive, the disk cartridge 11 will occupy an increased area. Nevertheless, if the disk cartridge is designed to enclose a disk with a small diameter, that increase in the area occupied should be minimum. Meanwhile, according to this preferred embodiment, the area of the head access window 702 can be increased and there are absolutely no disk cartridge opening/closing members inside the head access window 702. That is why the head of the disk drive that is going to access the disk is not interfered with at all and the head can be designed far more freely, thus compensating for the deficit of the slightly increased projection area.

Furthermore, according to this preferred embodiment, the first and second disk storage portions 201 and 301 can be opened only by releasing both of the first and second locking members 501 and 601 at the same time. A releasing operation of this type is an unusual one and cannot be done easily by every operator. That is why it becomes difficult to expose the data storage side of the disk outside of a disk drive that is compatible with the disk cartridge of this preferred embodiment. Consequently, the disk can be protected from scratches, dust and finger marks easily and a highly reliable and secure disk cartridge is realized.

Besides, according to this preferred embodiment, with the first and second disk storage portions 201 and 301 opened, the restricting members of the disk drive and the positioning portions of the supporting base member 400 can position the center of the disk more accurately. On the other hand, while the first and second disk storage portions 201 and 301 are closed, the disk can either be held firmly or have its movement restricted with a very small allowance left. Consequently, even while the cartridge is being carried, the disk will not get scratched due to its inconstant movement.

On top of that, according to this preferred embodiment, the disk is enclosed within the two highly rigid disk storage portions that also functions as a pair of shutters. As a result, the number of members required can be reduced and a disk cartridge with high mechanical strength and high dustproofness is realized.

What is more, the thin metallic plate shutter, which has been used extensively in conventional disk cartridges to enclose a disk with a small diameter, is no longer needed, and therefore, the cost can be cut down significantly. That is why even a head that is usually used for a big disk cartridge can access the disk enclosed in such a disk cartridge. Consequently, the present invention can be used effectively in a disk cartridge that has high dustproofness and high mechanical strength and that can be manufactured at an inexpensive cost for disks with a small diameter.

Embodiment 2

Hereinafter, a second preferred embodiment of a disk cartridge according to the present invention will be described.

Figure 12:
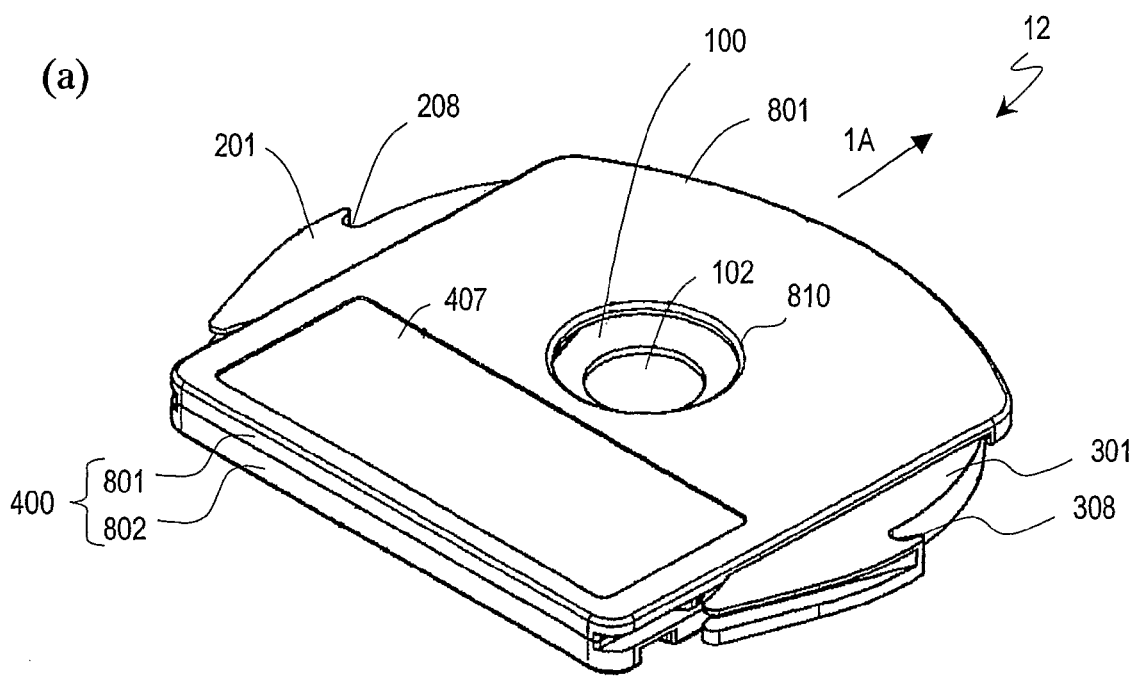
FIGS. 12(*a*) and 12(*b*) are perspective views of a disk cartridge according to a second preferred embodiment of the present invention, as viewed from above the label side of the disk enclosed there, illustrating how the disk cartridge looks in the opened state and in the closed state, respectively.
Figure 12:
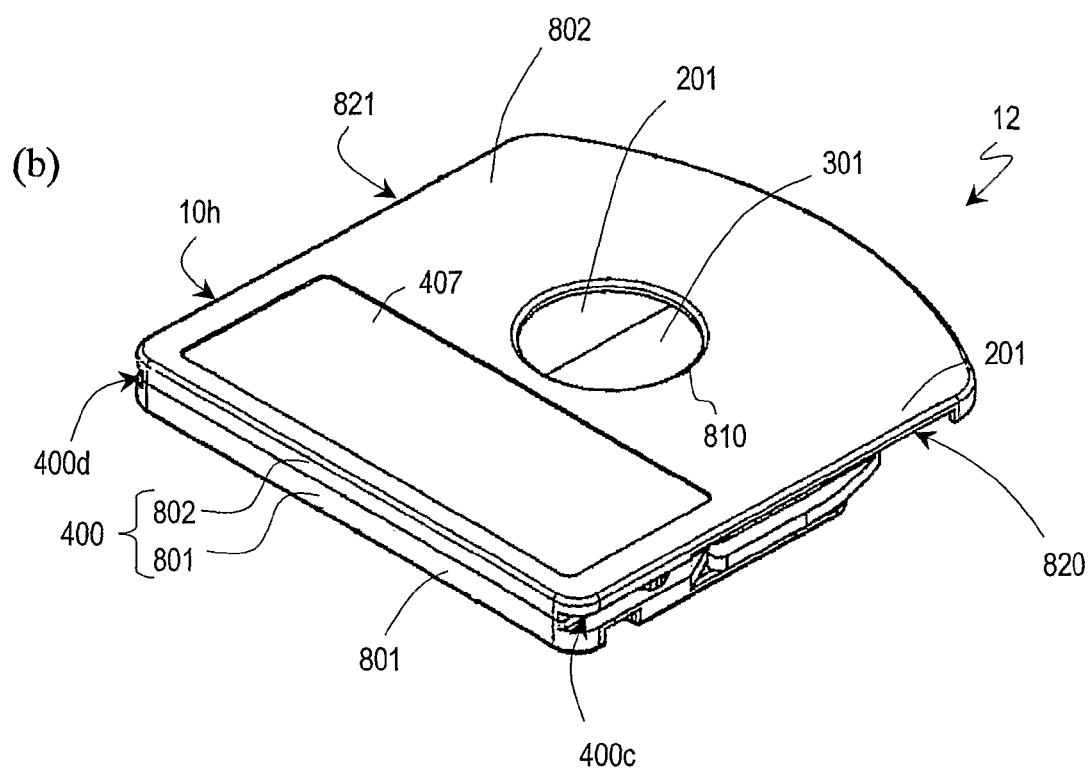

FIG. 12(*a*) is a perspective view of a disk cartridge 12, as viewed from above the cartridge, illustrating a situation where a disk 100 is enclosed in the cartridge and first and second disk storage portions 201 and 301 are opened. On the other hand, FIG. 12(*b*) is a perspective view of the disk cartridge 12, as viewed from above the cartridge, illustrating a situation where the first and second disk storage portions 201 and 301 are closed.

Figure 13:
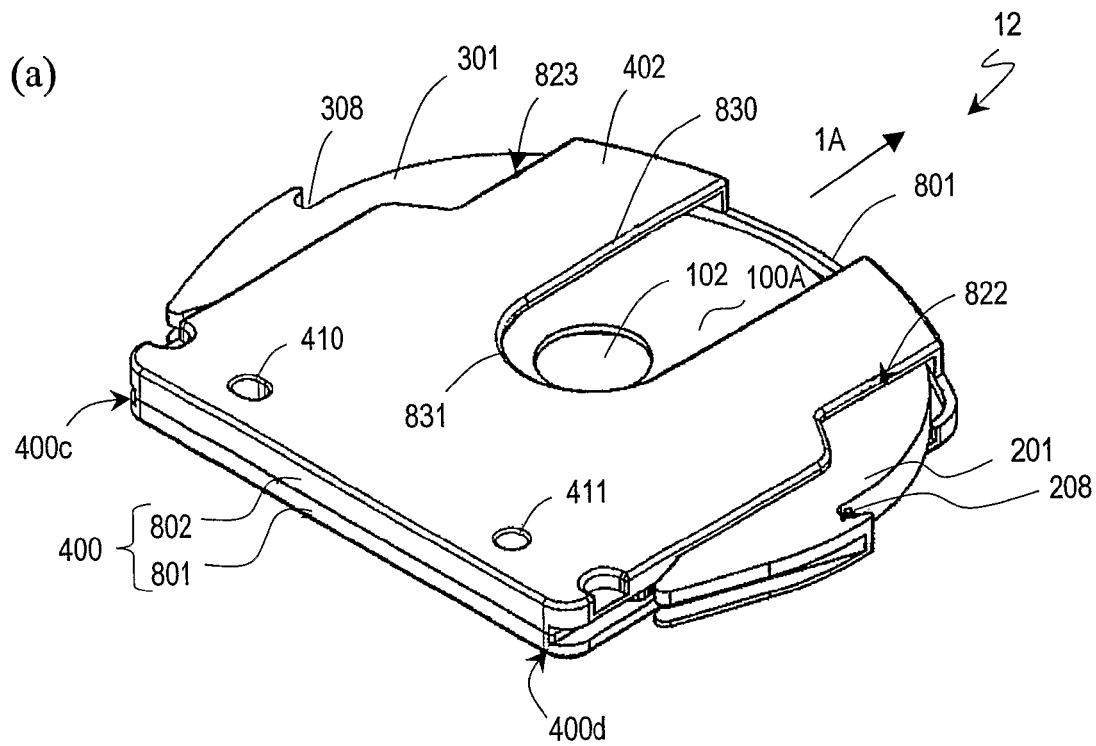
FIGS. 13(*a*) and 13(*b*) are perspective views of the disk cartridge of the second preferred embodiment of the present invention, as viewed from under the data storage side of the disk enclosed there, illustrating how the disk cartridge looks in the opened state and in the closed state, respectively.
Figure 13:
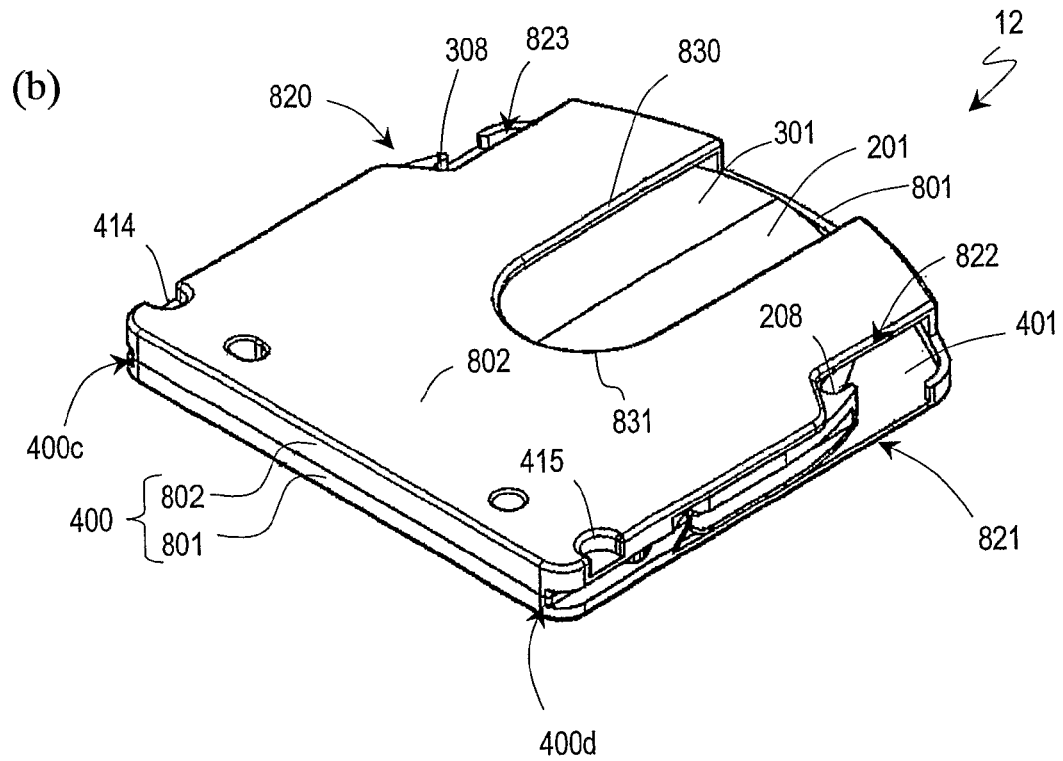

FIG. 13(*a*) is a perspective view of the disk cartridge 12, as viewed from under the data storage side 100A of the disk, illustrating a situation where the disk 100 is enclosed in the cartridge and the first and second disk storage portions 201 and 301 are opened. On the other hand, FIG. 13(*b*) is a perspective view of the disk cartridge 12, as viewed from under the data storage side 100A of the disk, illustrating a situation where the first and second disk storage portions 201 and 301 are closed.

Figure 14:
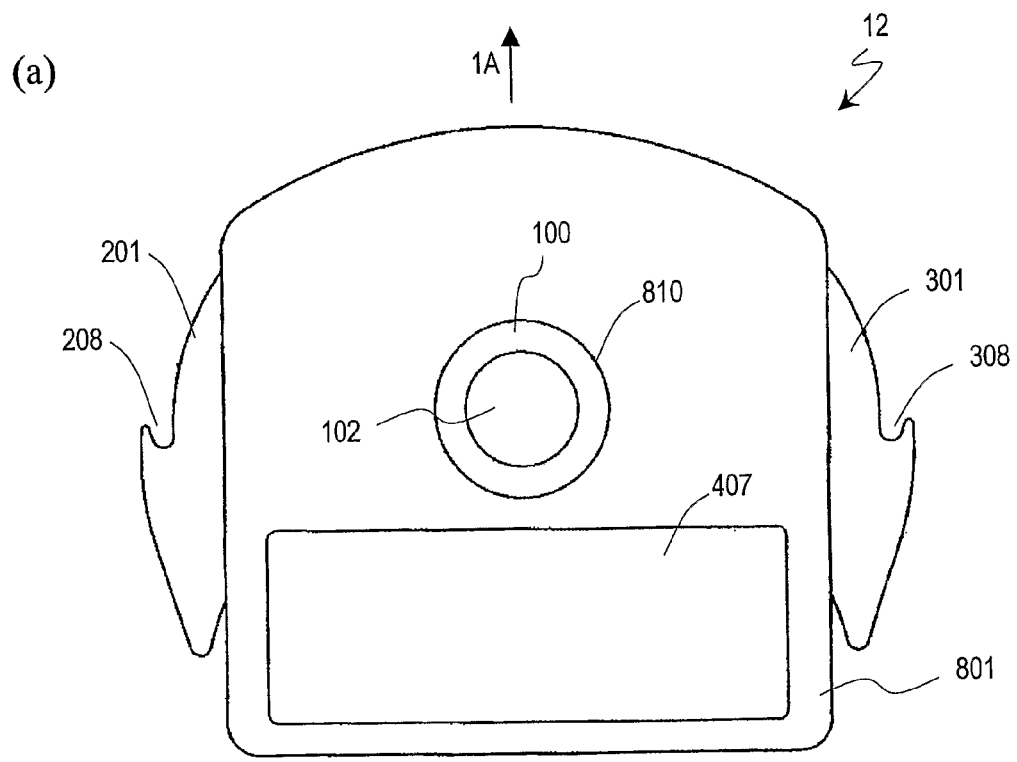
FIGS. 14(*a*) and 14(*b*) are plan views of the disk cartridge of the second preferred embodiment of the present invention, as viewed from above the label side of the disk enclosed there, illustrating how the disk cartridge looks in the opened state and in the closed state, respectively.
Figure 14:
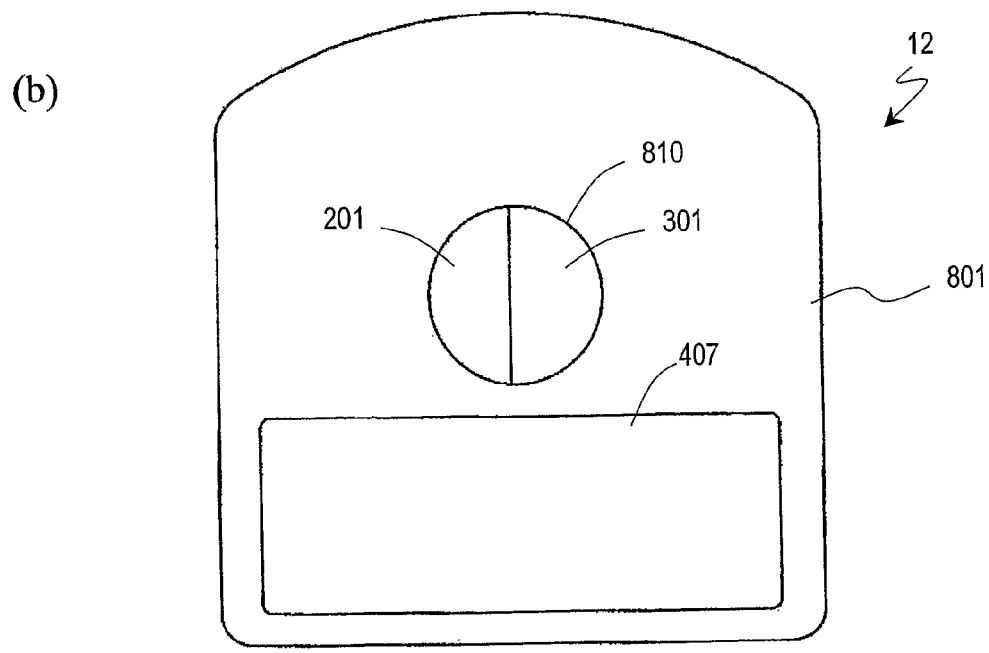

FIG. 14(*a*) is a top plan view of the disk cartridge 12 illustrating a situation where the disk 100 is enclosed in the cartridge and the first and second disk storage portions 201 and 301 are opened. On the other hand, FIG. 14(*b*) is a top plan view of the disk cartridge 12 illustrating a situation where the first and second disk storage portions 201 and 301 are closed.

Figure 15:
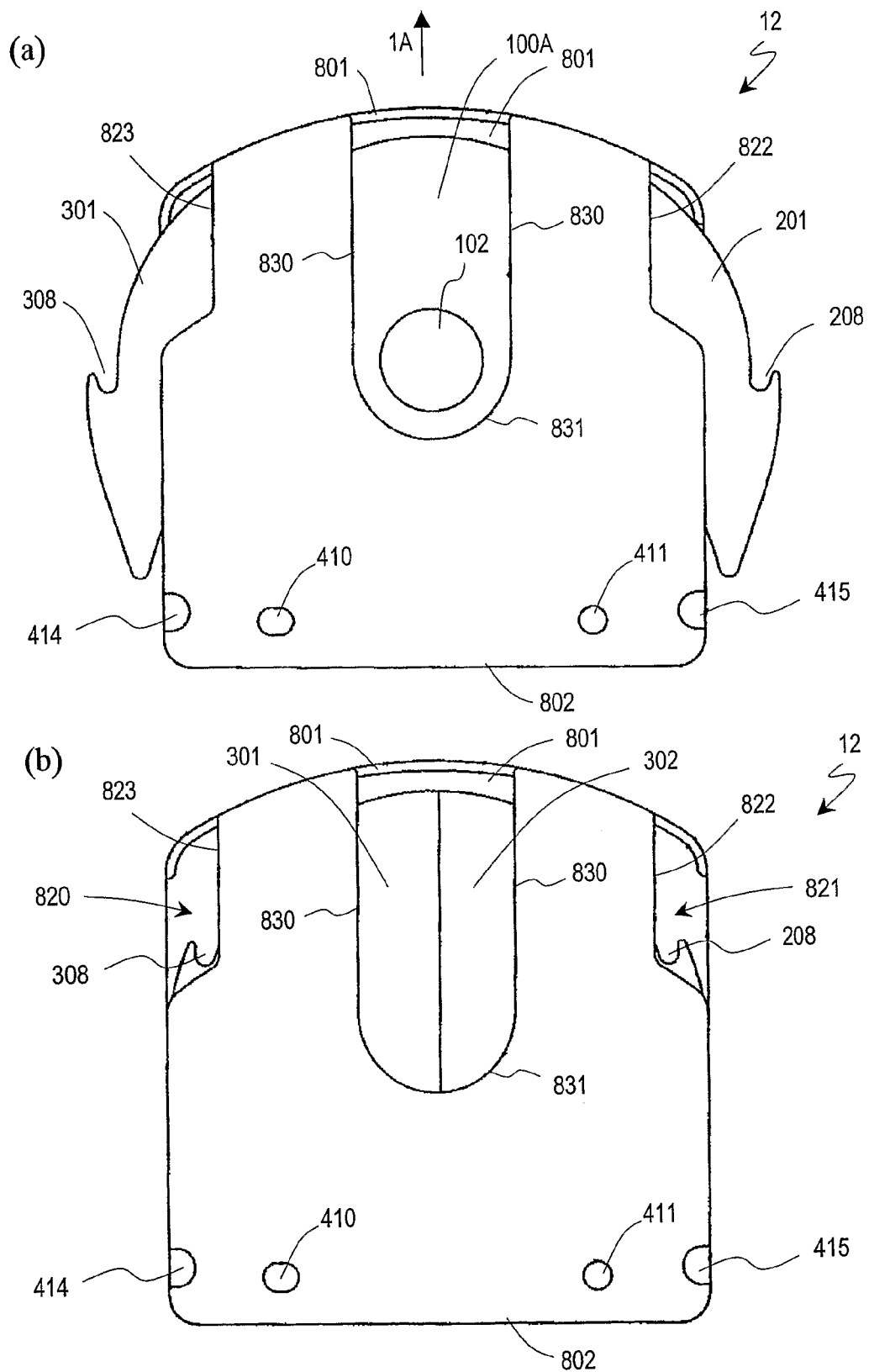
FIGS. 15(*a*) and 15(*b*) are plan views of the disk cartridge of the second preferred embodiment of the present invention, as viewed from under the data storage side of the disk enclosed there, illustrating how the disk cartridge looks in the opened state and in the closed state, respectively.

FIG. 15(*a*) is a bottom view of the disk cartridge 12 illustrating a situation where the disk 100 is enclosed in the cartridge and the first and second disk storage portions 201 and 301 are opened. On the other hand, FIG. 15(*b*) is a bottom view of the disk cartridge 12 illustrating a situation where the first and second disk storage portions 201 and 301 are closed.

As shown in these drawings, the disk cartridge 12 includes a first disk storage portion 201, a second disk storage portion 301 and a supporting base member 400 and encloses a disk 100 inside.

Figure 16:
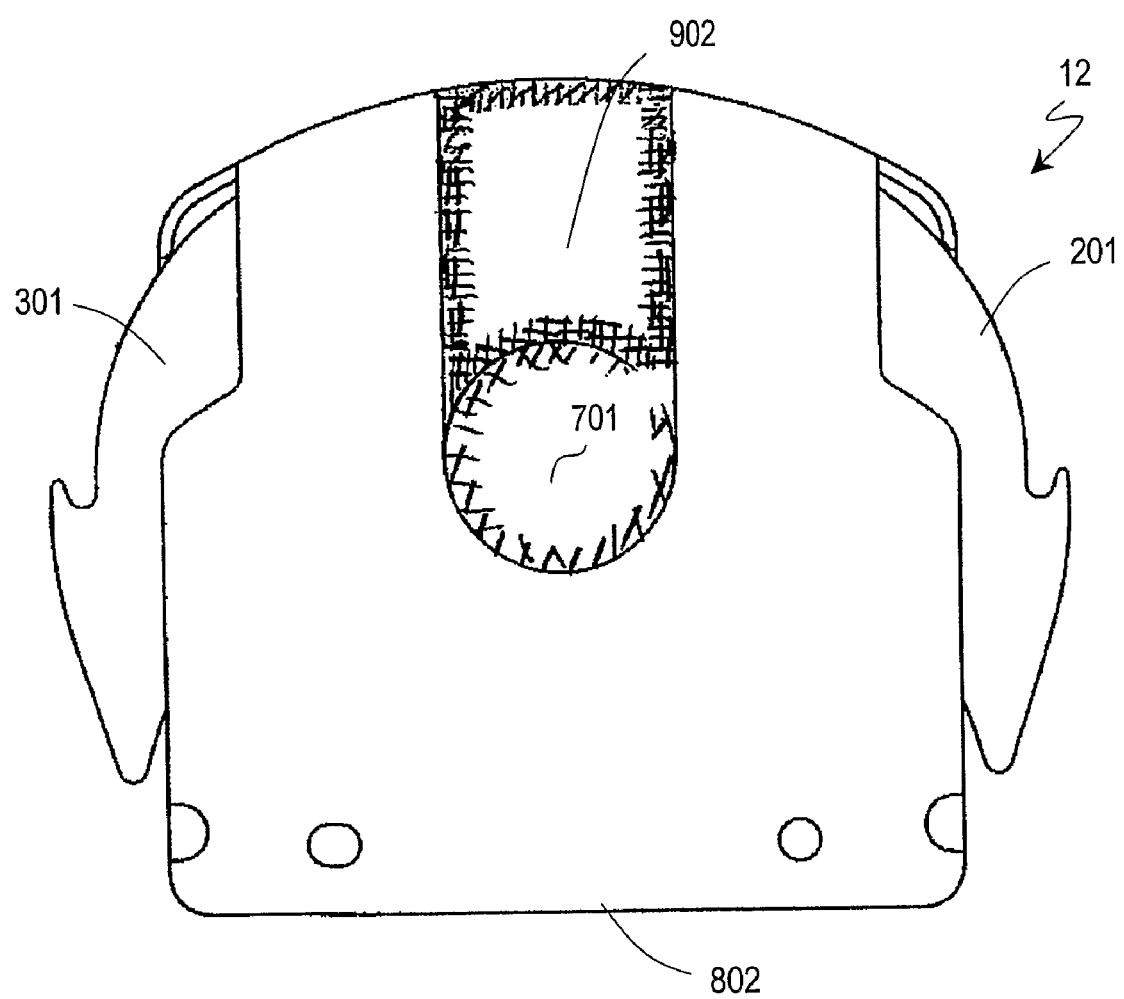
FIG. 16 is a plan view illustrating the head access window and chucking hole of the disk cartridge of the second preferred embodiment of the present invention.

FIG. 16 is a bottom view of the disk cartridge 12, of which the first and second disk storage portions 201 and 301 are opened. As in the first preferred embodiment described above, a chucking hole 701, which has been cut open to allow an external chucking member of a spindle motor to enter the disk cartridge and turn the disk 100, and a head access window 902, which has been cut open to allow a head to enter the disk cartridge and access the data storage side 100A of the disk 100 to read and/or write data from/on the disk 100, are defined between the first and second disk storage portions 201 and 301. These openings are located in a substantially fan-shaped open space to be created between the first and second disk storage portions 201 and 301 that are opened.

In this preferred embodiment, a center hole 102 has been cut through the disk 100 and the supporting base member upper shell 801 has a clamp hole 810 for getting the disk 100 clamped by a disk drive. Alternatively, a metallic clamp (not shown) to hold the disk 100 may be provided for either the disk 100 or the cartridge 12. In that case, there is no need to cut the clamp hole 810 through the supporting base member upper shell 801.

Figure 17:
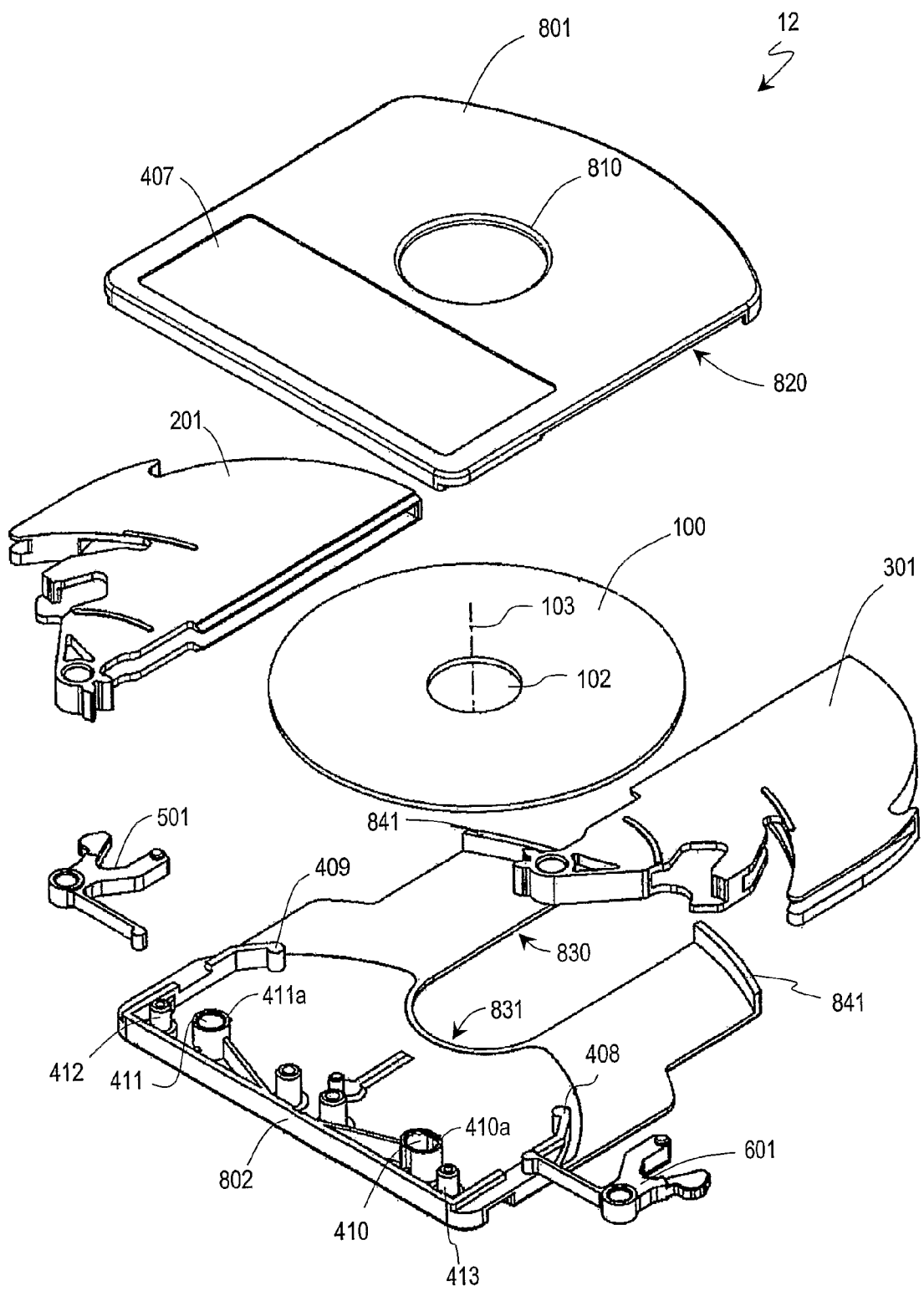
FIG. 17 is an exploded perspective view illustrating the structure of the disk cartridge of the second preferred embodiment of the present invention.

FIG. 17 is an exploded perspective view illustrating the structure of the disk cartridge 12. As shown in FIG. 17, in the disk cartridge 12, the supporting base member 400 is made up of a supporting base member upper shell 801 and a supporting base member lower shell 802. The disk cartridge 12 further includes first and second locking members 501 and 601 in addition to the first and second disk storage portions 201 and 301.

Figure 18:
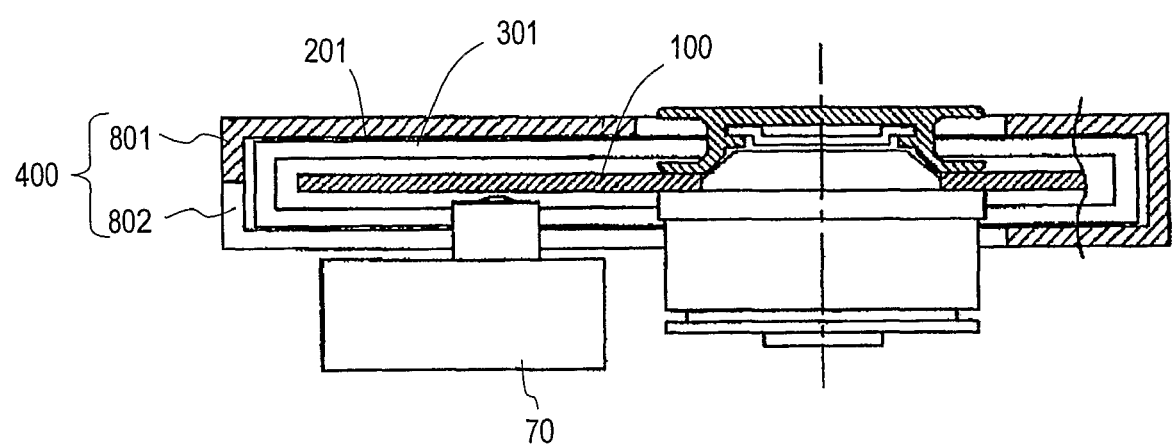
FIG. 18 is a cross-sectional view of the disk cartridge of the second preferred embodiment of the present invention.

FIG. 18 is a cross-sectional view illustrating a situation where the disk cartridge 12 enclosing the disk 100 has been loaded into a disk drive. In this cross-sectional view, the disk cartridge 12 is viewed from beside the outer side surface 10*h* with the first and second disk storage portions 201 and 301 opened.

In these drawings, any member of the disk cartridge 12, having the same function as the counterpart of the first preferred embodiment described above, is identified by the same reference numeral as that used for the first preferred embodiment. The disk cartridge 12 of this preferred embodiment is quite different from the disk cartridge 11 of the first preferred embodiment in the shapes of the supporting base member upper and lower shells 801 and 802, how to join these shells together, and the shape of the head access window 902.

As shown in FIGS. 12(*a*) and 12(*b*), on a plane that is defined parallel to the disk 100, the supporting base member upper shell 801 entirely covers the first and second disk storage portions 201 and 301 closed except some portions exposed through the clamp hole 810, which has been cut to allow a clamper (not shown) to access and clamp the disk 100.

Also, both side surfaces of the supporting base member upper shell 801 have notches 820 and 821 so as not to interfere with the first and second disk storage portions 201 and 301 that are going to open.

As shown in FIGS. 13(*a*) and 13(*b*), the supporting base member lower shell 802 partially covers the first and second disk storage portions 201 and 301 that are closed. The supporting base member lower shell 802 has a chucking hole 831 for getting the disk 100 chucked externally and a head access window 830. These openings are arranged so as to be located inside an open space created by the first and second disk storage portions 201 and 301 that are opened. Thus, as shown in FIG. 16, when the first and second disk storage portions 201 and 301 are opened, the chucking hole 701 and the head access window 902 are created. Optionally, the head access window 902 may have a substantially fan shape, which is same as the fan-shaped opening created between the first and second disk storage portions 201 and 301.

The supporting base member lower shell 802 further has notches 822 and 823 so as to allow a pair of opening/closing levers (not shown) to engage with the drive interlocking portions 208 and 308 of the first and second disk storage portions 201 and 301 when the disk cartridge 12 is being loaded into the disk drive in the direction pointed by the arrow 1A.

As shown in FIG. 17, the supporting base member upper and lower shells 801 and 802 are bonded or welded together at their outer peripheries or at the upper ends 410a and 411a on the outer peripheries of the two positioning holes 410 and 411, the upper ends of the shafts 403 and 404 of the first and second disk storage portions 201 and 301, the upper ends of the shafts 412 and 413 of the first and second locking members 501 and 601, the upper ends on the outer peripheries of positioning portions 408 and 409 for the disk 100 and bonding portions 841 of the supporting base member lower shell 802, thereby forming the supporting base member 400. The supporting base member upper and lower shells 801 and 802 can be bonded together in a greater area than in the first preferred embodiment, thus realizing an even more rigid supporting base member 400.

Also, as shown in FIG. 18, a completely double protection structure is formed by the first and second disk storage portions 201 and 301 and the supporting base member upper and lower shells 801 and 802 so as to enclose the disk 100 inside. As a result, a highly rigid disk cartridge that can withstand even huge external force applied when stepped on, for example, more easily than in the first preferred embodiment is realized.

The operations of opening and closing the first and second disk storage portions 201 and 301 and the operation of getting the first and second disk storage portions 201 and 301 locked with the first and second locking members 501 and 601 are just as already described for the disk cartridge 11 of the first preferred embodiment.

Figure 19:
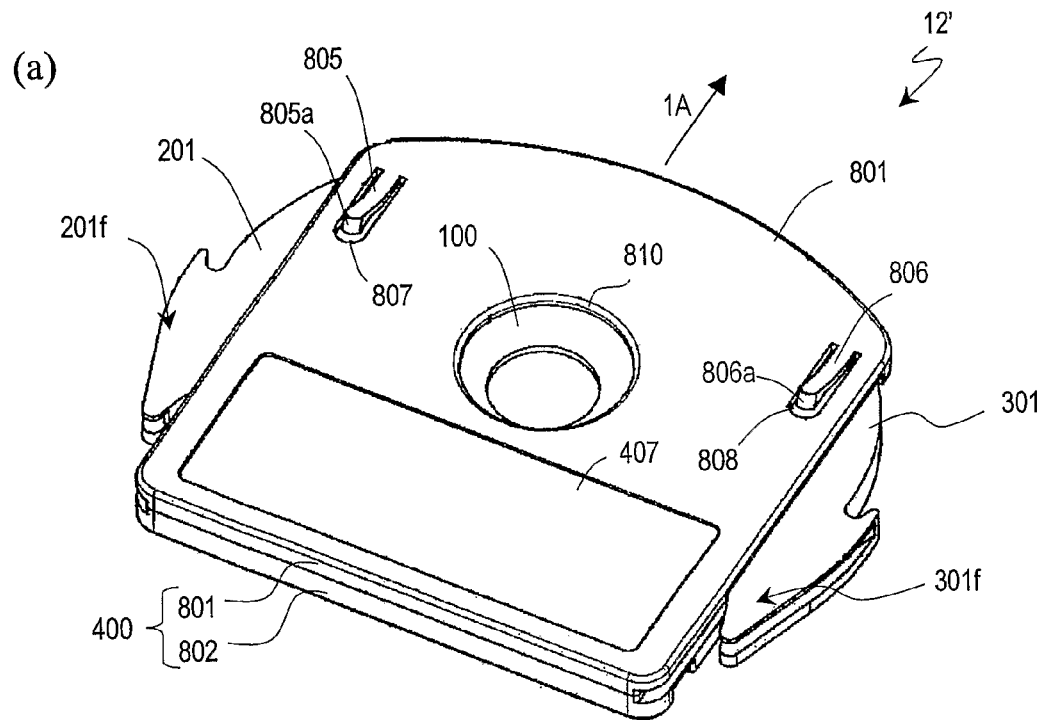
FIGS. 19(a) and 19(b) are perspective views, as viewed from above the label side of the disk and from below the data storage side of the disk, respectively, to illustrate a variation of the disk cartridge of the second preferred embodiment of the present invention in which the supporting base member has a locking function.
Figure 19:
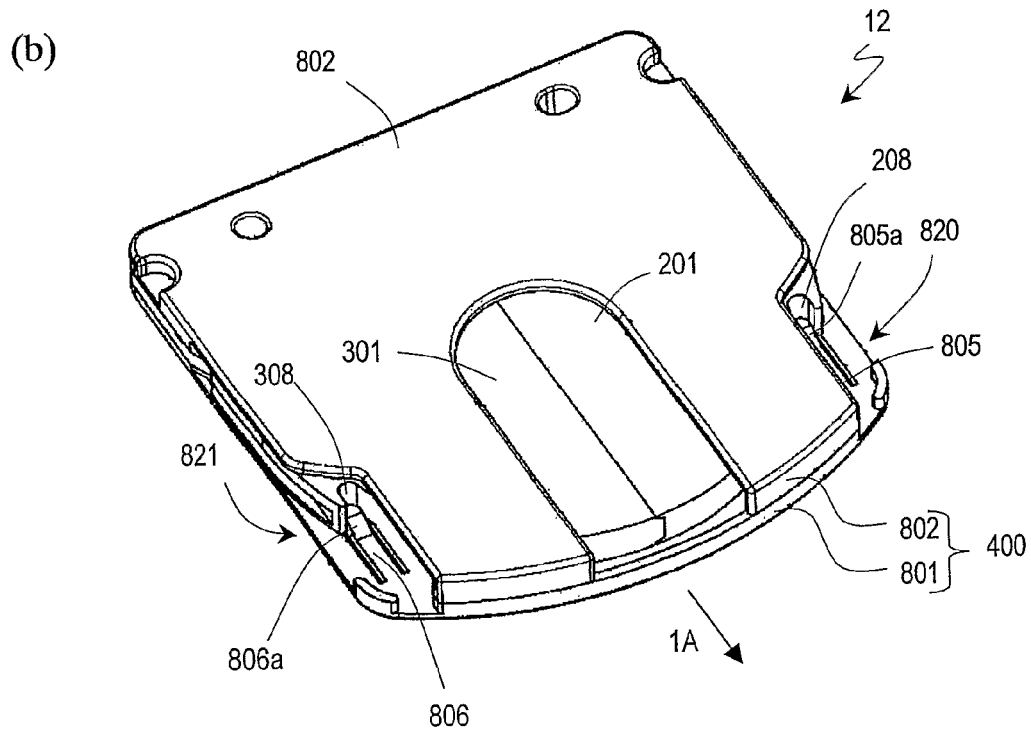

FIGS. 19(a) and 19(b) are perspective views of a disk cartridge 12', of which the supporting base member 400 is equipped with a locking function. Specifically, FIG. 19(a) is viewed from above the supporting base member upper shell 801 to illustrate a situation where the first and second disk storage portions 201 and 301 are opened, while FIG. 19(b) is viewed from below the supporting base member lower shell 802 to illustrate a situation where the first and second disk storage portions 201 and 301 are closed.

As shown in FIG. 19(a), the supporting base member upper shell 801 has U-notches 807 and 808 in the vicinity of the notches 820 and 821 on both side surfaces, thereby making portions of the supporting base member upper shell 801 function as elastic portions and forming elastic locking members 805 and 806.

As shown in FIG. 19(b), when the first and second disk storage portions 201 and 301 are closed, the protrusions 805a and 806a of the elastic locking members 805 and 806 engage with the drive interlocking portions 208 and 308, thereby preventing the disk storage portions 201 and 301 from being opened.

If the disk cartridge 12' in such a state is inserted into the disk drive in the direction pointed by the arrow 1A, a pair of opening/closing levers (not shown) of the disk drive pushes up the protrusions 805a and 806a perpendicularly to the disk 100 at the same time, thereby disengaging the protrusions 805a and 806a from the drive interlocking portions 208 and 308. Subsequently, the opening/closing levers get interlocked with the drive interlocking portions 208 and 308 to start opening the first and second disk storage portions 201 and 301. During this opening operation, the protrusions 805a and 806a of the elastic locking members 805 and 806 contact with, and slide on, the outer surfaces 201f and 301f of the first and second disk storage portions 201 and 301 while being deformed elastically.

The first and second disk storage portions 201 and 301 are closed by engaging with the opening/closing levers in reverse order compared to the opening operation, when the protrusions 805a and 806a of the elastic locking members 805 and 806 engage with the drive interlocking portions 208 and 308 to finish locking the disk storage portions 201 and 301.

In this manner, the first and second disk storage portions 201 and 301 can be opened, closed and unlocked with the pair of opening/closing levers. That is why there is no need to provide an unlocking lever for the disk drive or to separately provide an additional locking member for the cartridge 12', either. Consequently, the disk drive and the disk cartridge 12' can be both manufactured at reduced costs with high security guaranteed with the locking function.

With the elastic locking members provided, those elastic locking members 805 and 806 are kept deformed while the first and second disk storage portions 201 and 301 are opened. For that reason, to prevent the elastic locking members 805 and 806 from being deformed due to creep, recesses (not shown) may be cut on portions of the outer surfaces 201f and 301f to contact with the protrusions 805a and 806a to relieve the elastic deformation.

Embodiment 3

Figure 20:
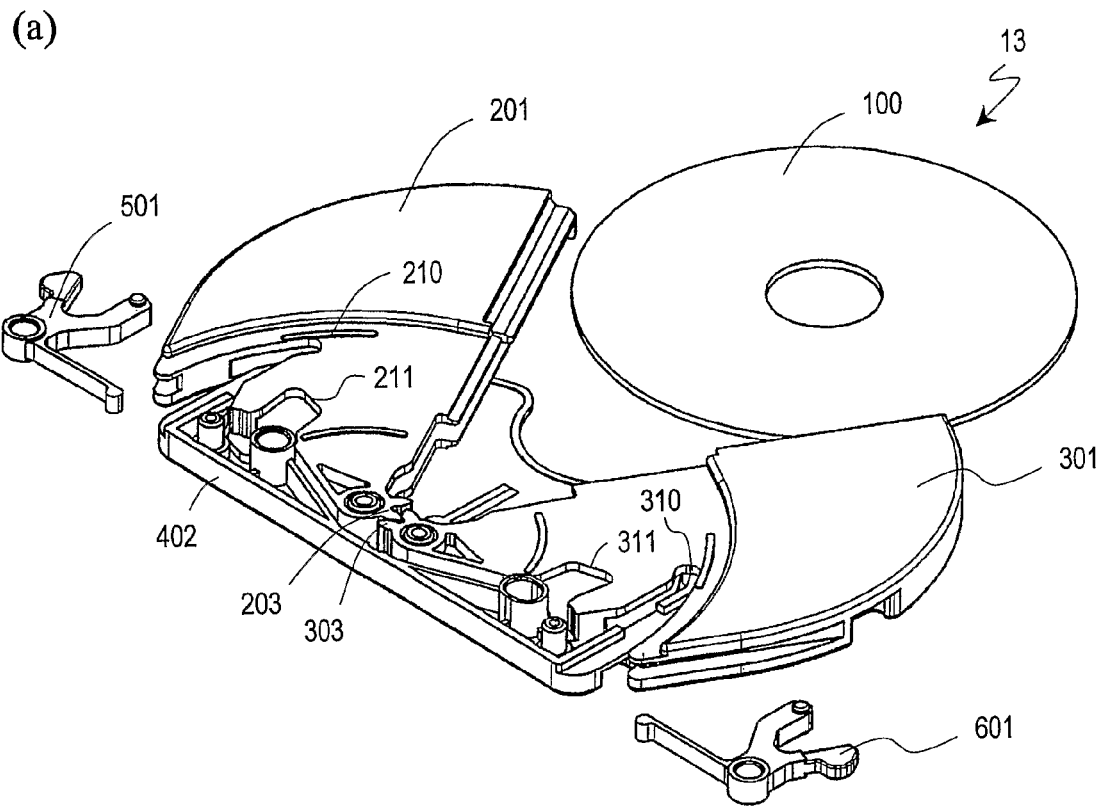
FIGS. 20(a) and 20(b) are perspective views illustrating how a disk cartridge without the supporting base member upper shell according to a third preferred embodiment of the present invention looks in a second opened state in which the disk can be inserted and removed and in a first opened state in which data is read from or written on the disk, respectively.
Figure 20:
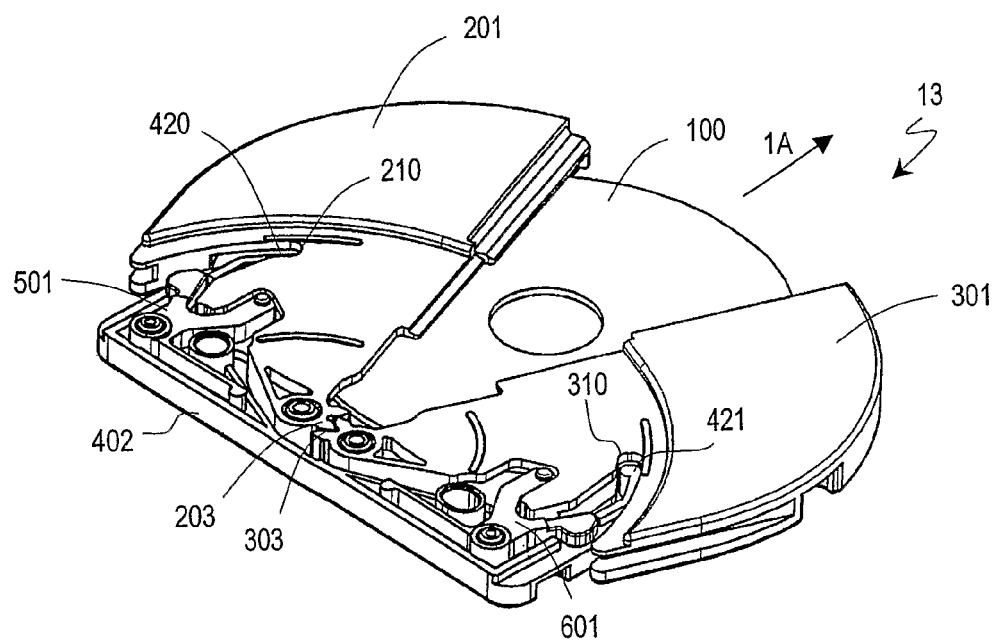
Figure 21:
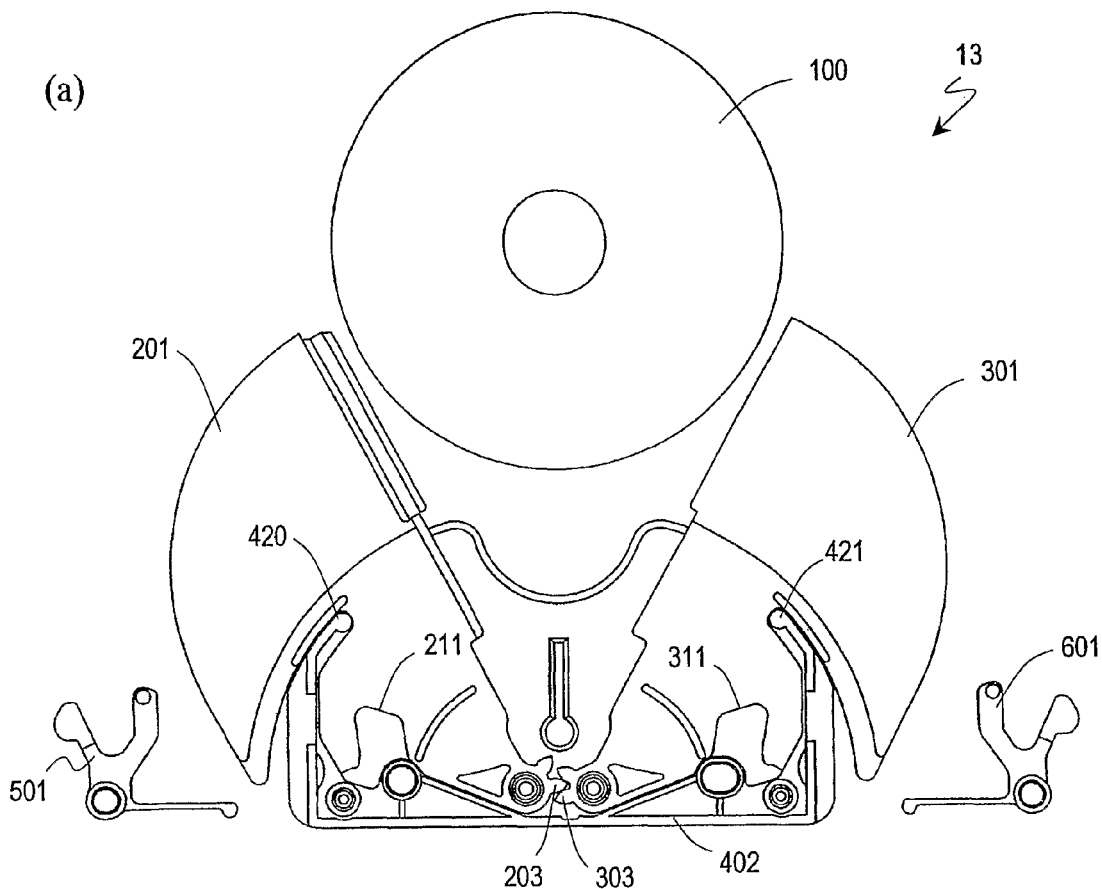
FIGS. 21(a) and 21(b) are plan views illustrating how the disk cartridge of the third preferred embodiment of the present invention without the supporting base member upper shell looks in the second opened state in which the disk can be inserted and removed and in the first opened state in which data is read from or written on the disk, respectively.
Figure 21:
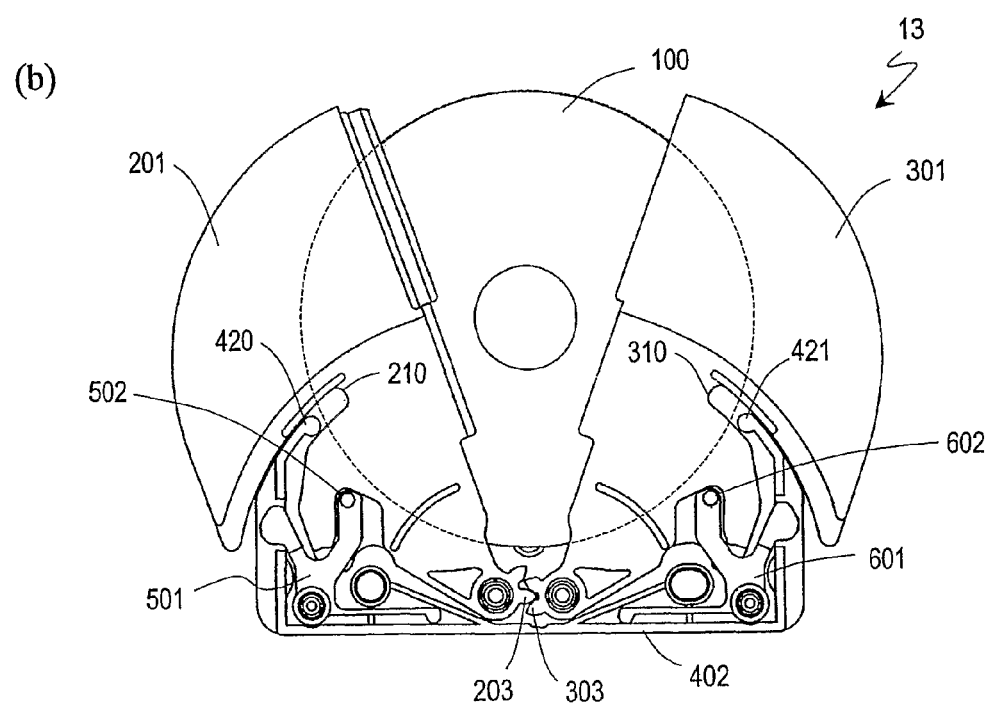

Hereinafter, a third preferred embodiment of a disk cartridge according to the present invention will be described. FIGS. 20(a) and 21(a) are respectively a perspective view and a plan view illustrating how a disk cartridge 13 without the supporting base member upper shell 401 and the first and second locking members 501 and 601 looks when the first and second disk storage portions 201 and 301 are opened. FIGS. 20(b) and 21(b) are respectively a perspective view and a plan view illustrating how the disk cartridge 13 without the supporting base member upper shell 401 looks when the first and second disk storage portions 201 and 301 are opened.

In these drawings, any member of the disk cartridge 13, having the same function as the counterpart of the first preferred embodiment described above, is identified by the same reference numeral as that used for the first preferred embodiment.

The disk cartridge 13 can assume not only a first opened state in which the chucking hole and the head access window are created by opening the first and second disk storage portions 201 and 301 with the disk 100 enclosed but also a second opened state in which the first and second disk storage portions 201 and 301 are opened to such a degree as to insert the disk 100 by removing the supporting base member upper shell 401 and the first and second locking members 501 and 601.

As shown in FIGS. 20(a) and 21(a), with the first and second disk storage portions 201 and 301 fitted to the supporting base member lower shell 402, the rotation of the first and second disk storage portions 201 and 301 is regulated by bringing disk positioning portions 420 and 421, provided for the supporting base member lower shell 402, into contact with a second pair of rotation regulating portions 210 and 310 of the first and second disk storage portions 201 and 301.

On the other hand, as shown in FIGS. 20(b) and 21(b), with the first and second locking members 501 and 601 attached to the supporting base member lower shell 402, the rotation of the first and second disk storage portions 201 and 301 is regulated by bringing catching lever portions 502 and 602, provided for the first and second locking members 501 and 601, into contact with a first pair of rotation regulating portions 211 and 311 of the first and second disk storage portions 201 and 301.

In assembling the disk cartridge 11 of the first preferred embodiment described above, the first and second disk storage portions 201 and 301 that are closed with the disk 100 already enclosed are fitted to the supporting base member lower shell 402. On the other hand, according to this preferred embodiment, first, the first and second disk storage portions 201 and 301 that have been turned to such an angle of rotation as to insert or remove the disk 100 are fitted to the supporting base member lower shell 402 and then the disk 100 is inserted. Thereafter, the first and second disk storage portions 201 and 301 are closed up and the first and second locking members 501 and 601 are attached. Finally, the supporting base member upper shell 401 is either bonded or welded to the supporting base member lower shell 402, thereby completing the disk cartridge 13.

According to this preferred embodiment, the first and second disk storage portions 201 and 301 are fitted to the supporting base member lower shell 402 before the disk 100 is inserted thereto. That is why there is no need to follow the normal assembling procedure, in which the disk 100 is enclosed first, the interlocking portions 203 and 303 get engaged together, and then the first and second disk storage portions 201 and 301 are closed up and in which it is often difficult to get the disk 100 held properly. As a result, the assembling process can be simplified.

Embodiment 4

Figure 22:
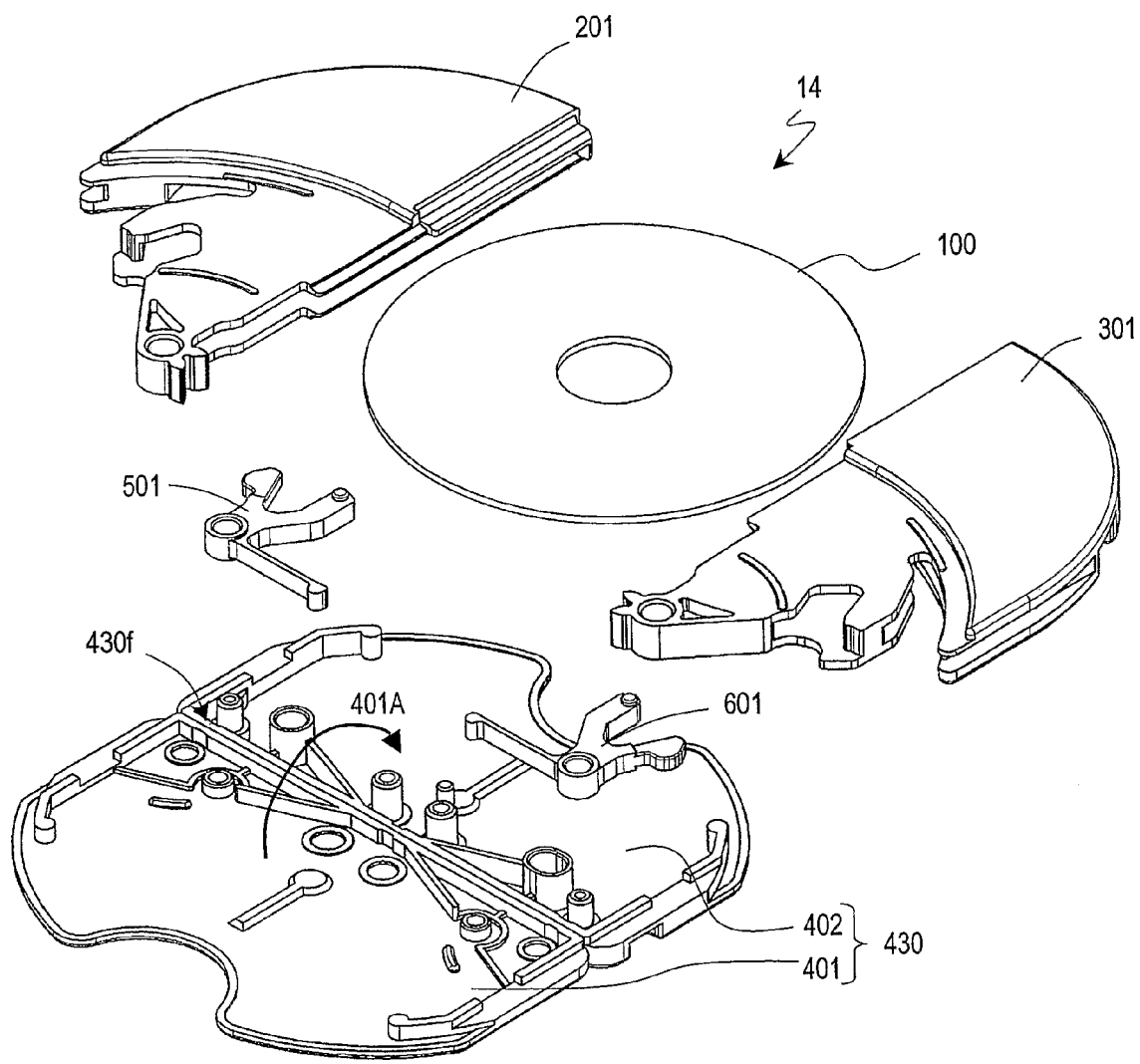
FIG. 22 is a perspective view of a disk cartridge according to a fourth preferred embodiment of the present invention, illustrating a supporting base member of which the upper and lower shells are joined together.

Hereinafter, a fourth preferred embodiment of a disk cartridge according to the present invention will be described. FIG. 22 is an exploded perspective view of a disk cartridge 14 according to the fourth preferred embodiment of the present invention. In FIG. 22, any member of the disk cartridge 14, having the same function as the counterpart of the first or second preferred embodiment described above, is identified by the same reference numeral as that used for that preferred embodiment. Unlike the disk cartridge 12 of the second preferred embodiment described above, the supporting base member upper and lower shells 401 and 402 are already joined together at a junction 430f in the disk cartridge 14 of this preferred embodiment.

In the member 430, the supporting base member upper and lower shells 401 and 402 are joined together at the junction 430f. That is why it is easy to assemble this disk cartridge 14. Specifically, as shown in FIG. 22, the first and second disk storage portions 201 and 301 that have been turned to such an angle of rotation as to insert or remove the disk 100 are fitted to the supporting base member lower shell 402 of the supporting base member 430 and the disk 100 is inserted. Thereafter, the first and second disk storage portions 201 and 301 are closed up and the first and second locking members 501 and 601 are attached.

Finally, the supporting base member 430 is folded at the junction 430f in the direction pointed by the arrow 401A and the supporting base member upper and lower shells 401 and 402 are bonded or welded together, thereby completing the disk cartridge 14.

Figure 23:
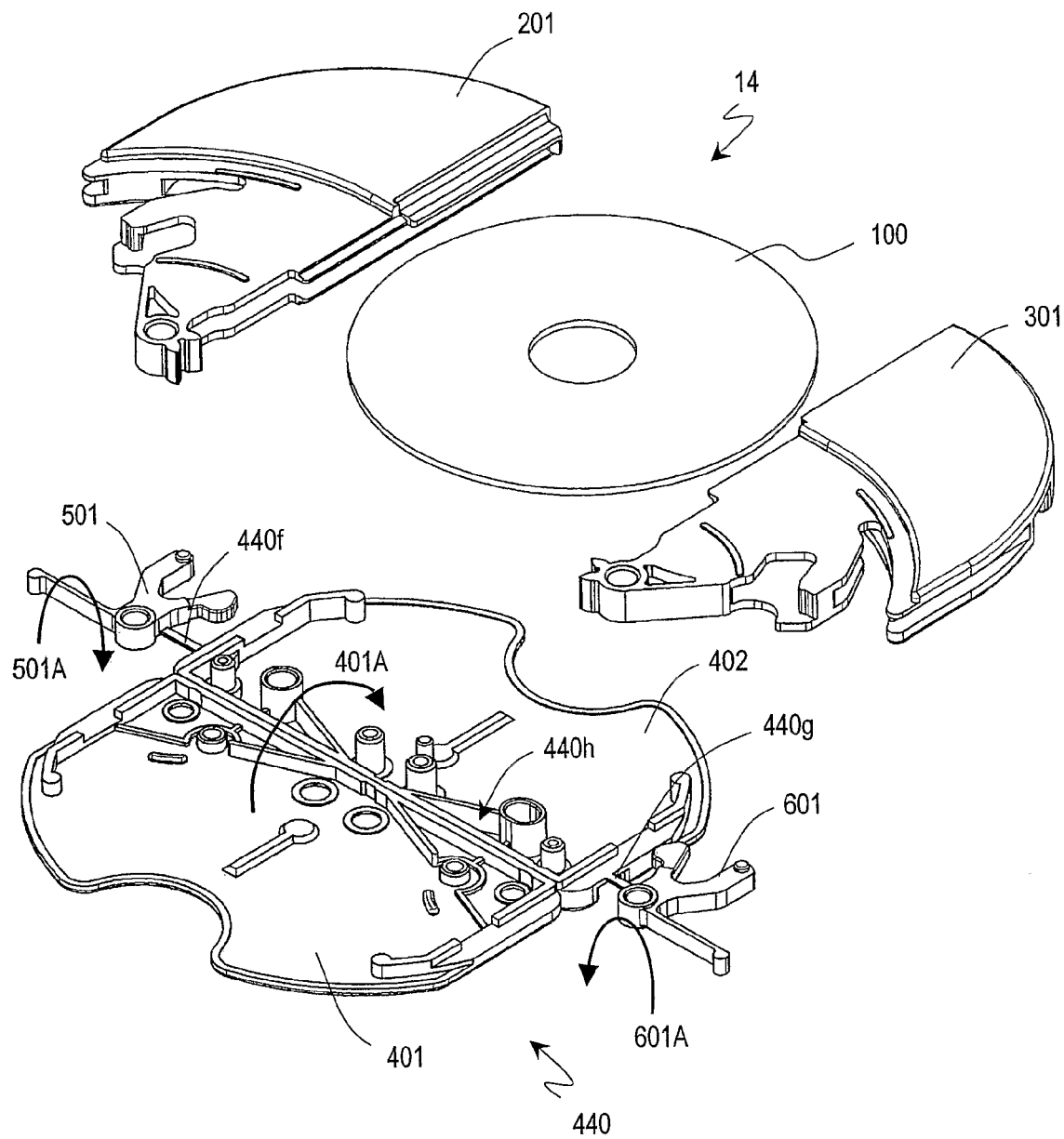
FIG. 23 is a perspective view illustrating the structure of the disk cartridge of the fourth preferred embodiment of the present invention with a supporting base member upper shell, a supporting base member lower shell and locking members connected together in the supporting base member.

Alternatively, the disk cartridge 14 may also be assembled using a member 440 in which the supporting base member upper and lower shells 401 and 402 are joined together and to which the first and second locking members 501 and 601 are attached as shown in FIG. 23.

In the member 440 shown in FIG. 23, the supporting base member upper and lower shells 401 and 402 have already been joined together as shown in FIG. 22 and the first and second locking members 501 and 601 are connected to the supporting base member lower shell 402 with connecting portions 440f and 440g.

In assembling the disk cartridge 14, first, the first and second disk storage portions 201 and 301 that have been turned to such an angle of rotation as to insert or remove the disk 100 are fitted to the supporting base member lower shell 402 of the supporting base member 440 and the disk 100 is inserted. Thereafter, the first and second disk storage portions 201 and 301 are closed up.

Next, the first and second locking members 501 and 601 are attached after having been folded at the connecting portions 440f and 440g in the directions pointed by the arrows 501A and 601A, respectively, and then the connecting portions 440f and 440g are cut off. Finally, the supporting base member 440 is folded at the junction 440h in the direction pointed by the arrow 401A and the supporting base member upper and lower shells 401 and 402 are bonded or welded together, thereby completing the disk cartridge 14'.

To get the disk cartridge 14' assembled by performing these process steps, the members 430 and 440 are preferably made of polypropylene, polyethylene or any other suitable resin material that has a fracture elongation of 200% or more, which makes these members 430 and 440 easily foldable. On the other hand, the first and second disk storage portions 201 and 301 are preferably made of a different material from that of the members 430 and 440 and may be made of PBS with high rigidity.

As described above, according to this preferred embodiment, by joining the supporting base member upper and lower shells together, the number of members required can be reduced and the assembling process can be simplified. Furthermore, if the supporting base member upper and lower shells and the first and second locking members are connected together, the number of members required can be cut down significantly and the assembling process can be further simplified.

Embodiment 5

Hereinafter, a fifth preferred embodiment of a disk cartridge according to the present invention will be described.

Figure 24:
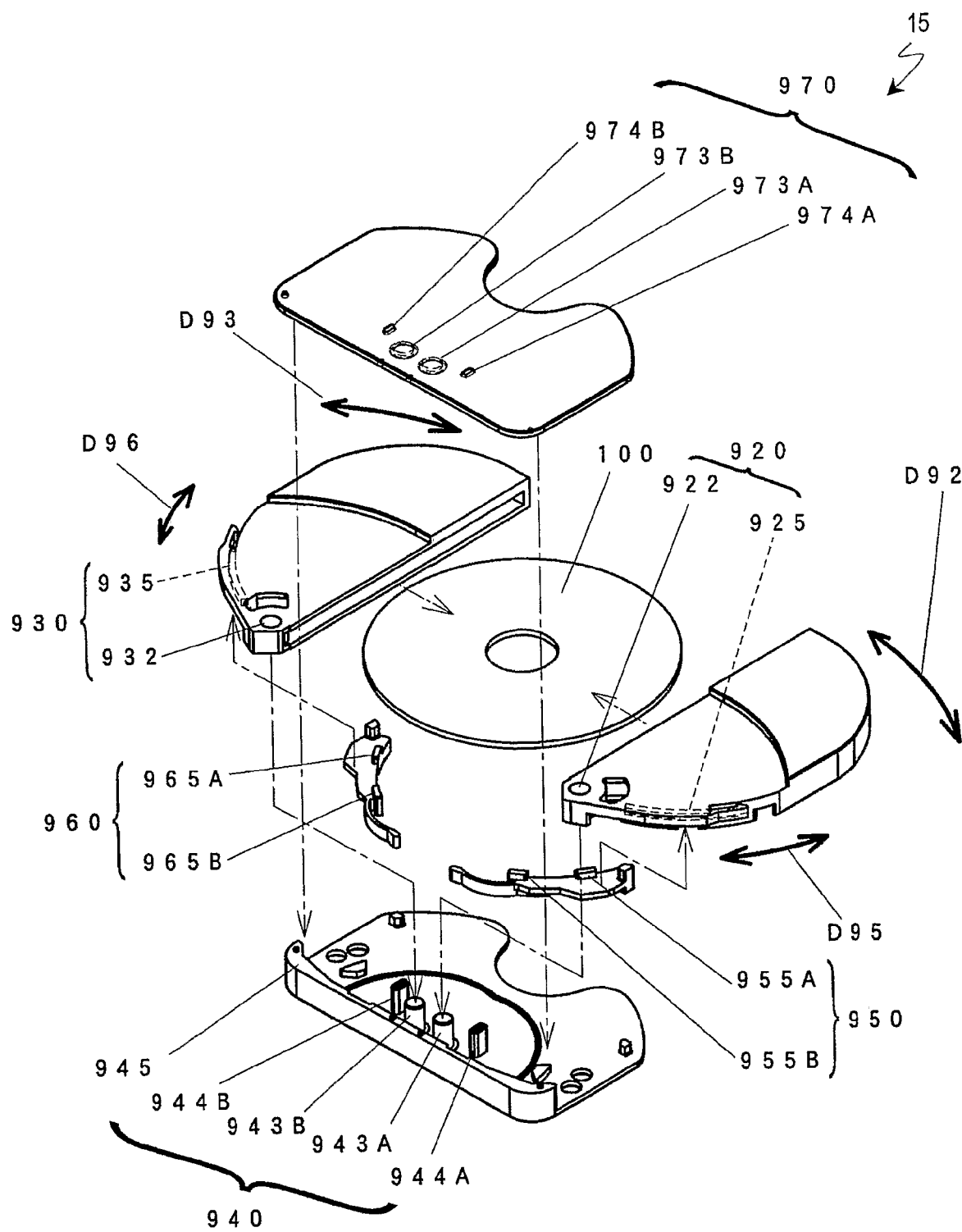
FIG. 24 is an exploded perspective view illustrating a disk cartridge according to a fifth preferred embodiment of the present invention.

FIG. 24 is an exploded perspective view of a disk cartridge 15 according to the fifth preferred embodiment of the present invention. As shown in FIG. 24, the disk cartridge 15 includes a first disk storage portion 920, a second disk storage portion 930, a supporting base member lower shell 940, a supporting base member upper shell 970 and first and second locking members 950 and 960 and encloses a disk 100 inside.

Just like the disk cartridge 11 of the first preferred embodiment described above, the disk 100 is also enclosed in the first and second disk storage portions 920 and 930 and a head access window and a chucking hole are also created when the disk storage portions 920 and 930 are opened. Also, as in the first preferred embodiment, the supporting base member, consisting of the supporting base member lower shell 940 and supporting base member upper shell 970, supports rotatably the first and second disk storage portions 920 and 930 and minimizes their deformation perpendicularly to the disk 100.

Hereinafter, the structure of the disk cartridge 15, as well as its assembling process, will be described with reference to FIGS. 25 through 27.

Figure 25:
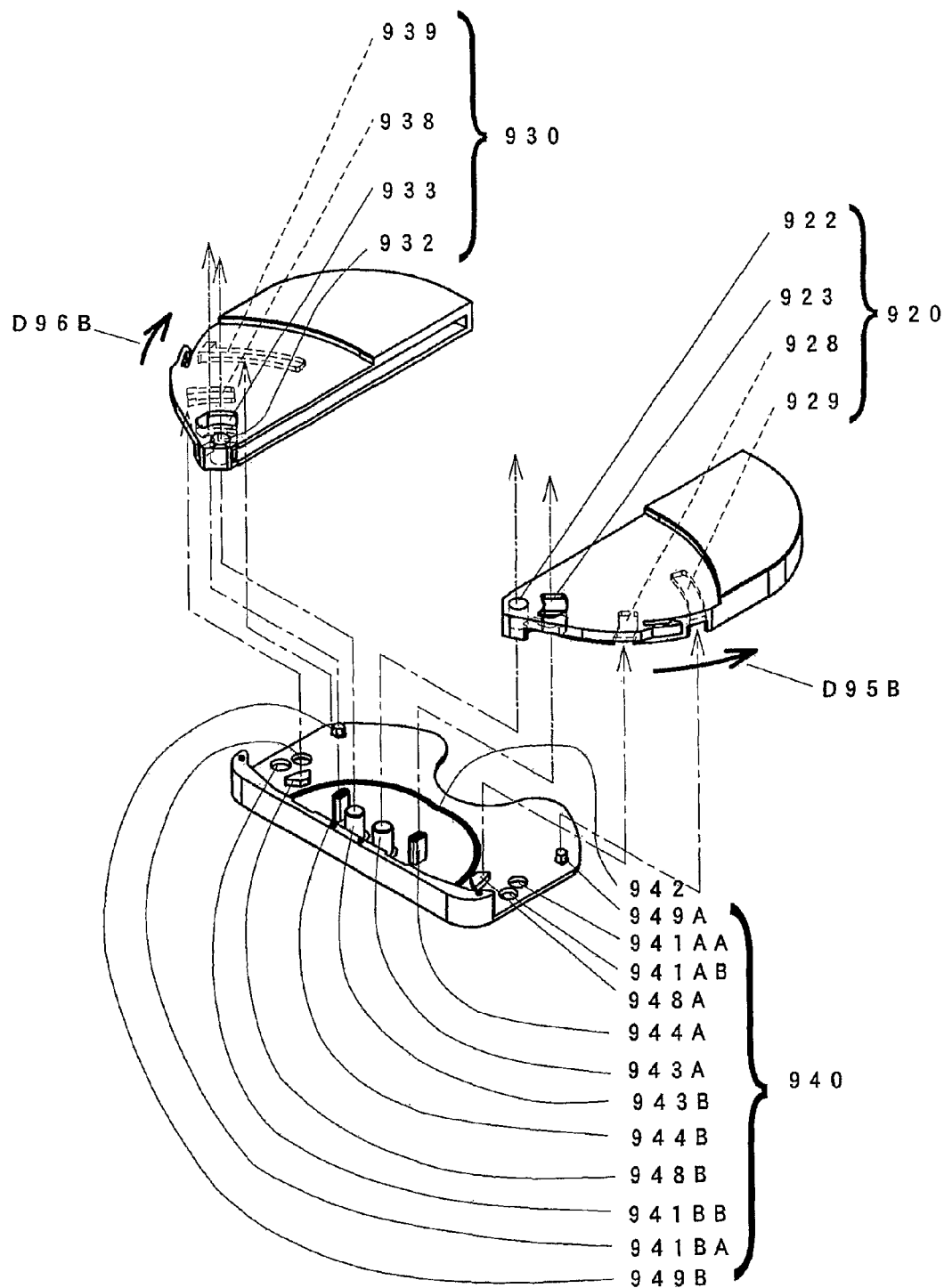
FIG. 25 is a perspective view illustrating how to fit first and second disk storage portions into the disk cartridge of the fifth preferred embodiment of the present invention.

First, as shown in FIG. 25, the first and second disk storage portions 920 and 930 are fitted into the supporting base member lower shell 940. In this process step, the first and second rotation supporting portions 943A and 943B of the supporting base member lower shell 940 are fitted into the shaft holes 922 and 932 of the first and second disk storage portions 920 and 930, respectively, such that the first and second disk storage portions 920 and 930 can rotate on the first and second rotation supporting portions 943A and 943B, respectively.

As will be described later, to increase the rigidity and mechanical strength of the overall disk cartridge, the supporting base member lower shell 940 has first and second columns 944A and 944B to be joined into the supporting base member upper shell 970. And to avoid being interfered with by these columns 944A and 944B during the rotation, the first and second disk storage portions 920 and 930 have first and second column relieves 922 and 923.

The supporting base member lower shell 940 further has first and second catching protrusions 948A and 948B that contribute to locking the first and second disk storage portions 920 and 930 closed as will be described later. To avoid being interfered with by these protrusions 948A and 948B after having been unlocked and while rotating, the first and second disk storage portions 920 and 930 have first and second clearances 928 and 938.

In addition, the supporting base member lower shell 940 further has first and second locking member stoppers 949A and 949B to prevent the first and second locking members 950 and 960 from coming off while the first and second disk storage portions 920 and 930 are closed. To avoid being interfered with by these stoppers 949A and 949B after having been unlocked and while rotating, the first and second disk storage portions 920 and 930 have first and second locking stopper relieves 929 and 939.

Furthermore, the supporting base member lower shell 940 has first and second body positioning holes (A) 941AA and 941BA and third and fourth body positioning holes (B) 941AB and 941BB, into which the positioning pins (not shown) of the disk drive fit when data is read from and/or written on the disk enclosed in the disk cartridge of this preferred embodiment.

The supporting base member lower shell 941 further has a lower shell storage reference plane 942, which is defined as a reference plane to contact with the first and second disk storage portions 920 and 930 rotating.

Figure 26:
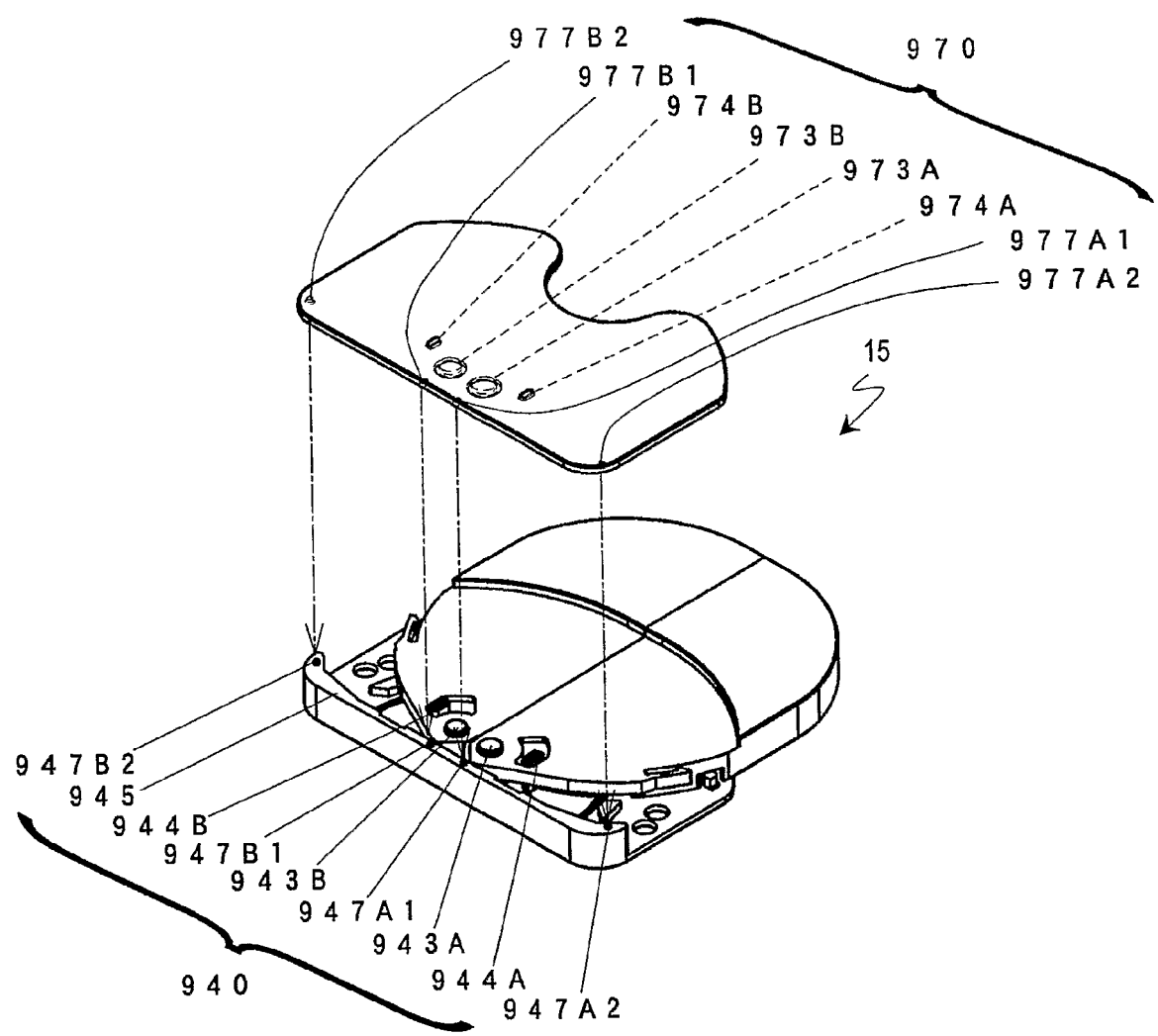
FIG. 26 is a perspective view illustrating how to fit the supporting base member upper shell into the disk cartridge of the fifth preferred embodiment of the present invention.

Next, as shown in FIG. 26, the supporting base member upper shell 970 is fixed and supported on the supporting base member lower shell 940. In this process step, the first, second, third and fourth positioning holes 977A1, 977A2, 977B1 and 977B2 of the supporting base member upper shell 970 are respectively fitted into the first, second, third and fourth positioning protrusions 947A1, 947A2, 947B1 and 947B2 of the supporting base member lower shell 940, thereby positioning the supporting base member upper shell 970 with respect to the supporting base member lower shell 940. To fix and support the supporting base member upper shell 970 onto the supporting base member lower shell 940, these positioning holes, positioning protrusions, and other flat portions may be bonded together with an adhesive applied thereto. Also, if the supporting base member upper and lower shells 970 and 940 are made of a resin material, the body edge 945 of the supporting base member lower shell 940 to be opposed to the supporting base member upper shell 970 may be ultrasonic welded to the supporting base member upper shell 970. In that case, a welding allowance needs to be provided separately but is not shown in FIG. 26.

The first and second rotation supporting portions respectively fit into the first and second shaft holes 973A and 973B of the supporting base member upper shell 970. The first and second columns 944A and 944B fit into first and second column holes 974A and 974B, respectively. These fitting portions do not have to be bonded together but just need to be fitted into each other as long as positioning can be done just as intended. However, if these portions should be fixed together more firmly, they are preferably bonded together.

Figure 27:
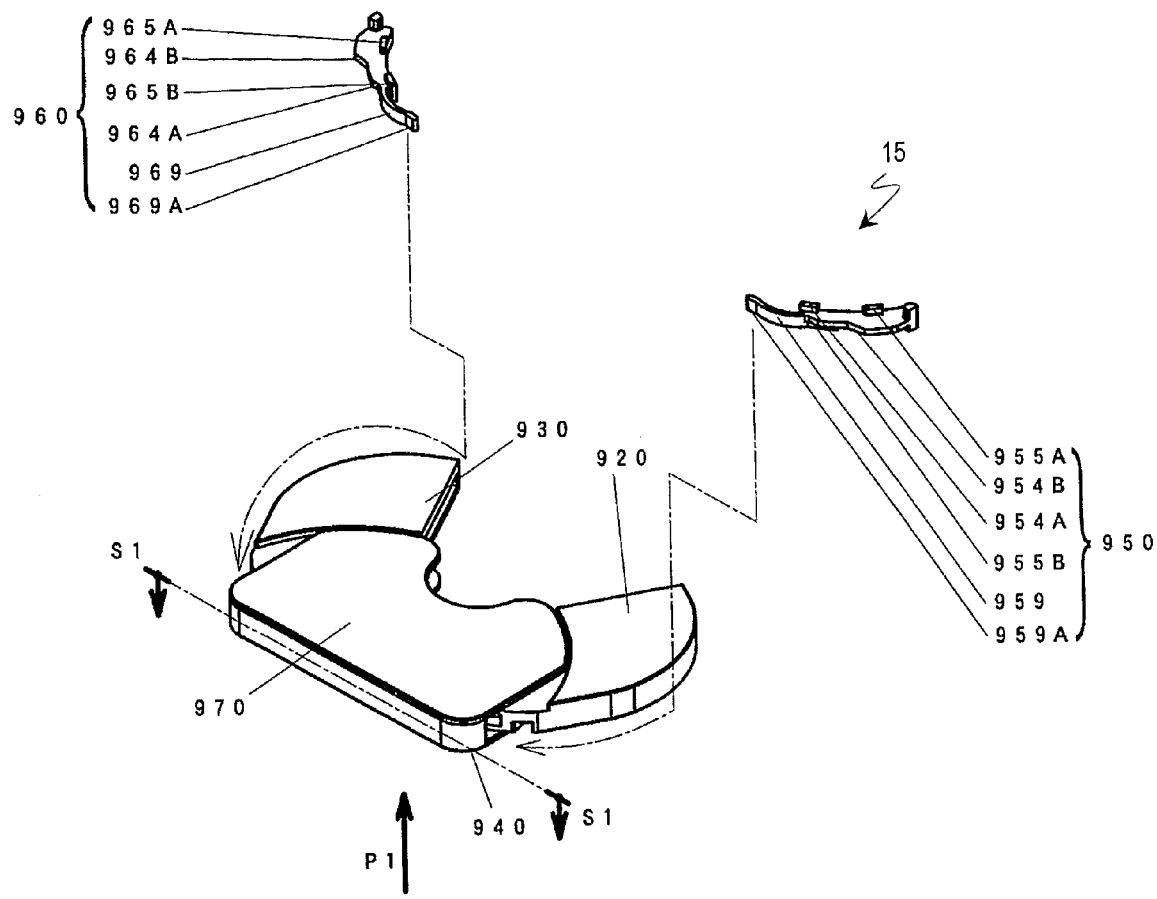
FIG. 27 is a perspective view illustrating how to attach first and second locking members to the disk cartridge of the fifth preferred embodiment of the present invention.
Figure 28:
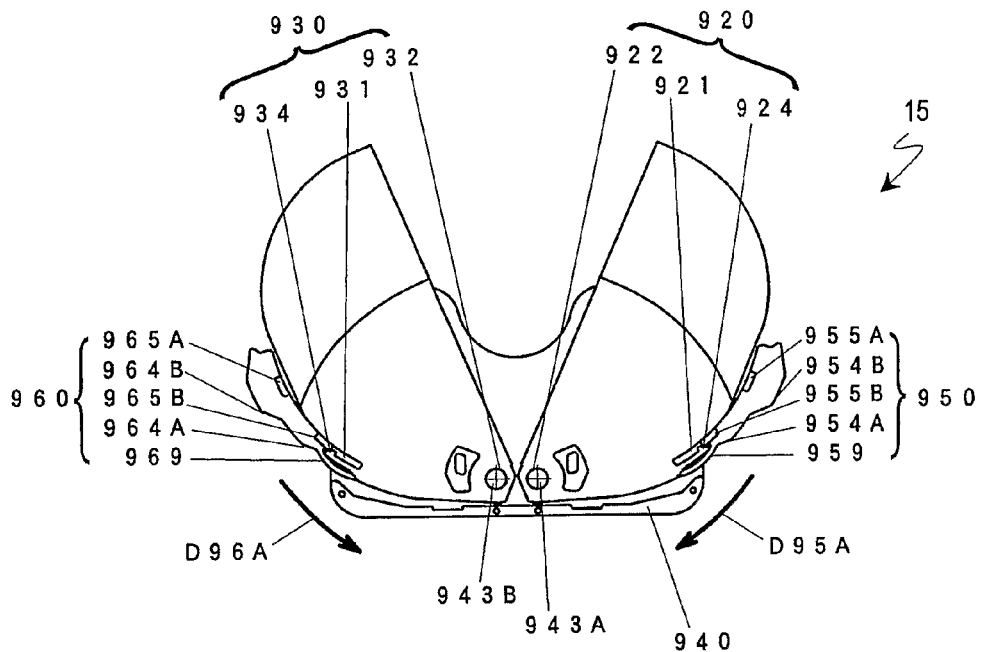
FIG. 28 is a plan view illustrating how to attach the first and second locking members to the disk cartridge of the fifth preferred embodiment of the present invention.

Next, as shown in FIG. 27, the first and second locking members 950 and 960 are attached. In this process step, as shown in FIG. 28 with the supporting base member upper shell 970 removed, the first and second unlocking guide portions (B) 955B and 965B of the first and second locking members 950 and 960 are inserted into first and second openings 921 and 931, respectively, while pushing the first and second checking portions 924 and 934 of the first and second disk storage portions 920 and 930 open in the directions pointed by the arrows D95A and D96A, respectively. Once inserted, the first and second unlocking guide portions (B) 955B and 965B are held by the first and second checking portions 924 and 934 so as not to come off. At this time, the first and second locking members 950 and 960 can slide with respect to the first and second disk storage portions 920 and 930 in the directions pointed by the arrows D95A and D96A, respectively.

In this manner, all members of the disk cartridge 15 are assembled together. In FIG. 28, after the first and second locking members 950 and 960 are further inserted in the directions pointed by the arrows D95A and D96A, first and second unlocking guide portions (A) 955A and 965A, along with the first and second unlocking guide portions (B) 955B and 965B, guide the first and second locking members 950 and 960 with respect to the first and second disk storage portions 920 and 930.

Also, elastic portions 959 and 969 have a leaf spring shape and make the first and second locking members 950 and 960 go back from unlocked positions to locked positions.

A first pair (A) of guide slopes 954A and 964A and a second pair (B) of guide slopes 954B and 964B allow the first and second locking members, which have been attached as shown in FIG. 28, to further rotate smoothly in the directions pointed by the arrows D95A and D95B, respectively. The first and second pairs (A) and (B) of guide slopes 954A, 964A, 954B, and 964B will be described in further detail later.

Figure 29:
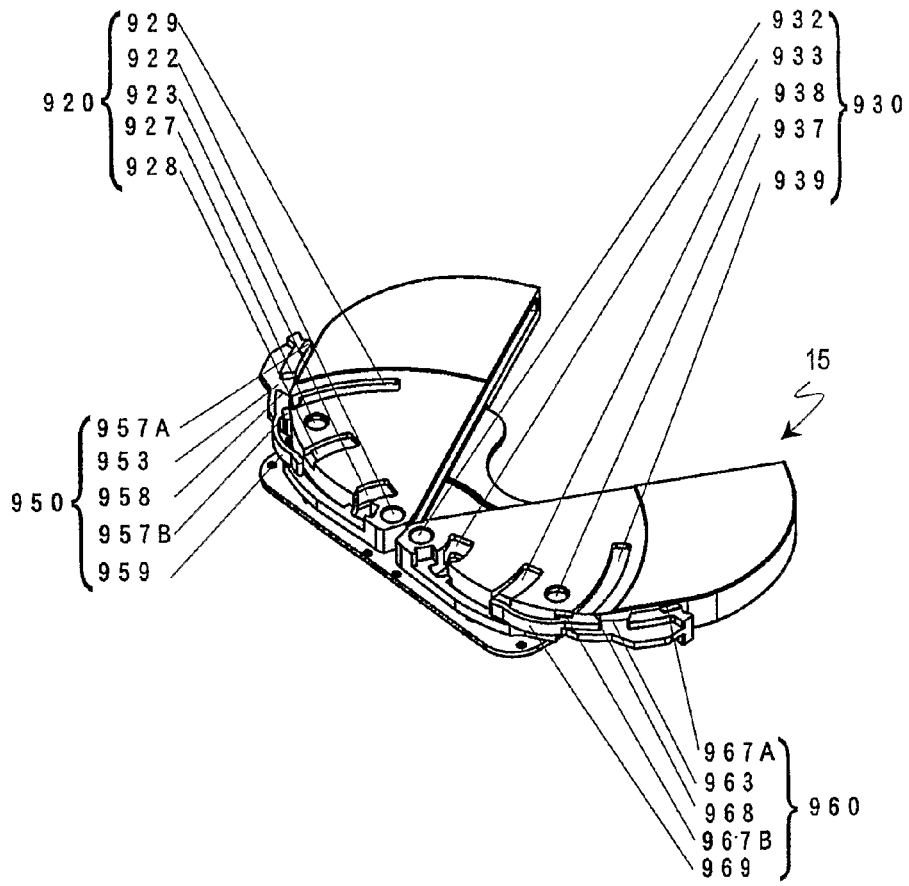
FIG. 29 is a perspective view illustrating the first and second disk storage portions of the disk cartridge of the fifth preferred embodiment of the present invention as viewed from under the supporting base member lower shell thereof.

FIG. 29 is a perspective view illustrating the arrangement of respective members that have been assembled by this point in time with the supporting base member lower shell 940 removed and as viewed from the direction pointed by the arrow P1 shown in FIG. 27.

As shown in FIG. 29, the positioning contact surfaces 957A, 957B, 967A and 967B of the first and second locking members 950 and 960 are opposed to the supporting base member lower shell 940. As will be described later, when the first and second locking members 950 and 960 are unlocked, the first and second catching protrusions 948A and 948B pass first and second pass grooves 953 and 963, respectively. Also, while the first and second disk storage portions 920 and 930 are turning to make a transition from the first opened state into a closed state, first and second unlocking slopes 958 and 968 contact with the first and second catching protrusions 948A and 948B, respectively, to once move the first and second locking members 950 and 960 in the directions pointed by the arrows D95A and D96A shown in FIG. 28.

While the disk cartridge 15 is being loaded into the disk drive, a first storage portion positioning hole 927, as well as the first body positioning hole (A) 941AA, is fitted into one positioning pin (not shown) of the disk drive, thereby positioning the supporting base member 940 and the first disk storage portions 920 at the same time. In the same way, while the disk cartridge 15 is being loaded into the disk drive, a second storage portion positioning hole 937, as well as the second body positioning hole (A) 941BA, is fitted into the other positioning pin (not shown) of the disk drive, thereby positioning the supporting base member 940 and the second disk storage portions 930 at the same time.

Next, the process step of putting the disk 100 into the disk cartridge 15 in which all members have been assembled together will be described with reference to FIGS. 30 through 34, which are cross-sectional views illustrating the lower portion of the disk cartridge 15 in various opened states, in which all members have been assembled together, as viewed on the plane S1-S1 shown in FIG. 27.

As shown in FIGS. 30 through 34, in every state of the first and second disk storage portions 920 and 930 but their closed state, the first and second columns 944A and 944B are located within the first and second column relieves 923 and 933, respectively, so as not to interfere with the first and second disk storage portions 920 and 930. Also, the first and second catching protrusions 948A and 948B are located within the first and second clearances 928 and 938, respectively, so as not to interfere with the first and second disk storage portions 920 and 930, either. Furthermore, the first and second locking member stoppers 949A and 949B are located within the first and second locking stopper relieves 929 and 939, respectively, so as not to interfere with the first and second disk storage portions 920 and 930, either.

Figure 30:
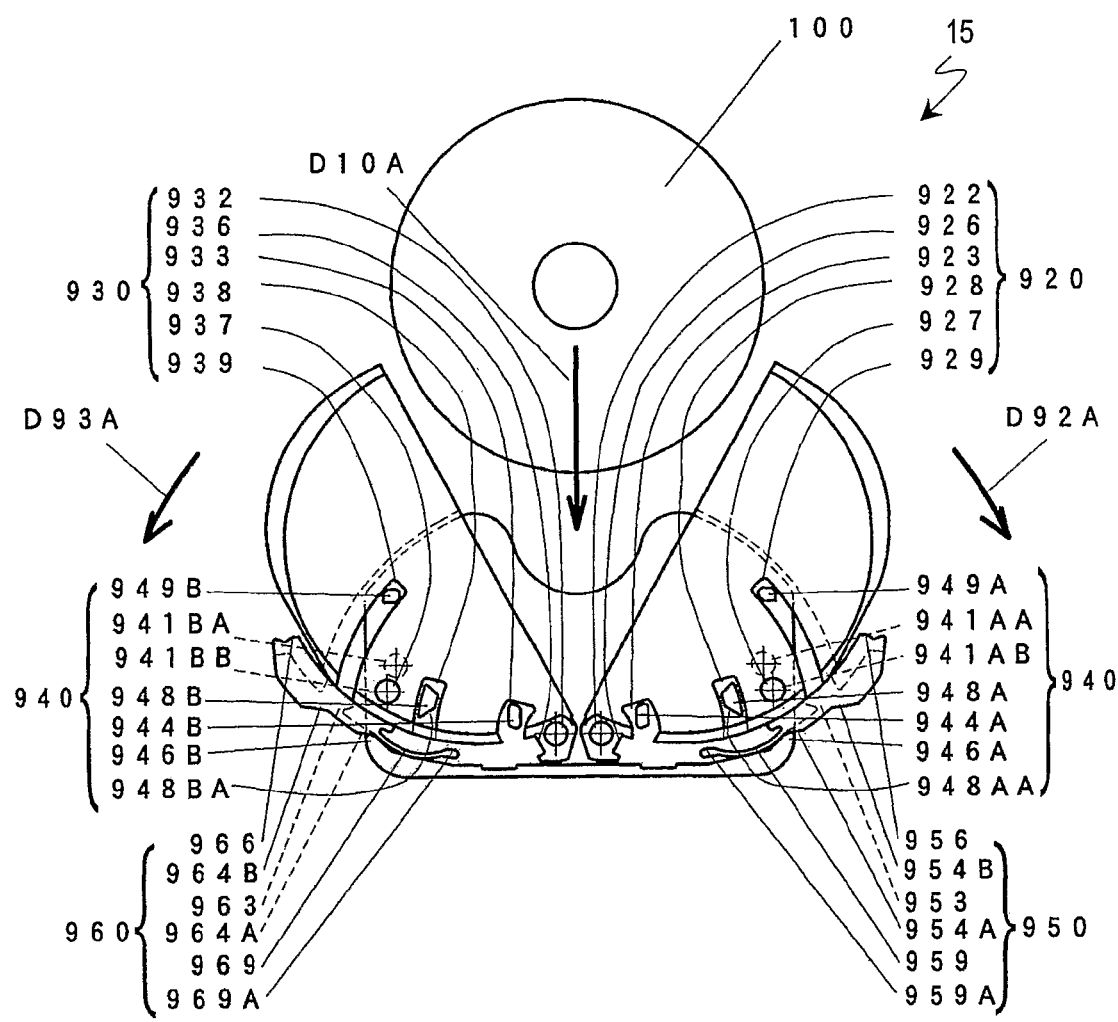
FIG. 30 illustrates how to insert a disk into the disk cartridge in a second opened state according to the fifth preferred embodiment of the present invention.

FIG. 30 shows how the first and second disk storage portions 920 and 930 are in the second opened state in which the disk 100 can be put into the disk cartridge 15 of which all members have been assembled together.

As shown in FIG. 30, in the second opened state, the first and second disk storage portions 920 and 930 have created an opening that is wide enough to insert the disk 100 in the direction pointed by the arrow D10A. At this point in time, the first disk storage portion 920 has been opened such that the first storage portion positioning hole 927 agrees with the first body positioning hole (B) 941AB. In the same way, the second disk storage portion 930 has been opened such that the second storage portion positioning hole 937 agrees with the second body positioning hole (B) 941BB.

As a result, in fixing and holding the disk cartridge on a base member (not shown) that is used to put the disk 100 into the disk cartridge, the first and second disk storage portions 920 and 930 can have the second opened state just as intended and can be positioned accurately with respect to the base member.

The first and second disk storage portions 920 and 930 include first and second spring catching portions 926 and 936 to receive the elastic force that has been applied by the first and second locking members 950 and 960. In the state illustrated in FIG. 30, however, the respective ends 959A and 969A of the first and second elastic portions 959 and 969 have not contacted with the first and second spring catching portions 926 and 936 yet.

In the state shown in FIG. 30, since the first and second guide slopes (A) 954A and 964A contact with, and are stopped by, the first and second rotation stoppers 946A and 946B of the supporting base member lower shell 940, the degree of opening of the first and second locking members 920 and 930 is limited. When the first and second body positioning holes (B) 941AB and 941BB respectively agree with the first and second storage portion holes 927 and 937, however, there is no contact but some clearance between the first and second guide slopes (A) 954A and 964A and the first and second rotation stoppers 946A and 946B. As a result, the first and second disk storage portions 920 and 930 can rotate to a certain degree in the directions pointed by the arrow D92A and D93A, respectively.

Figure 31:
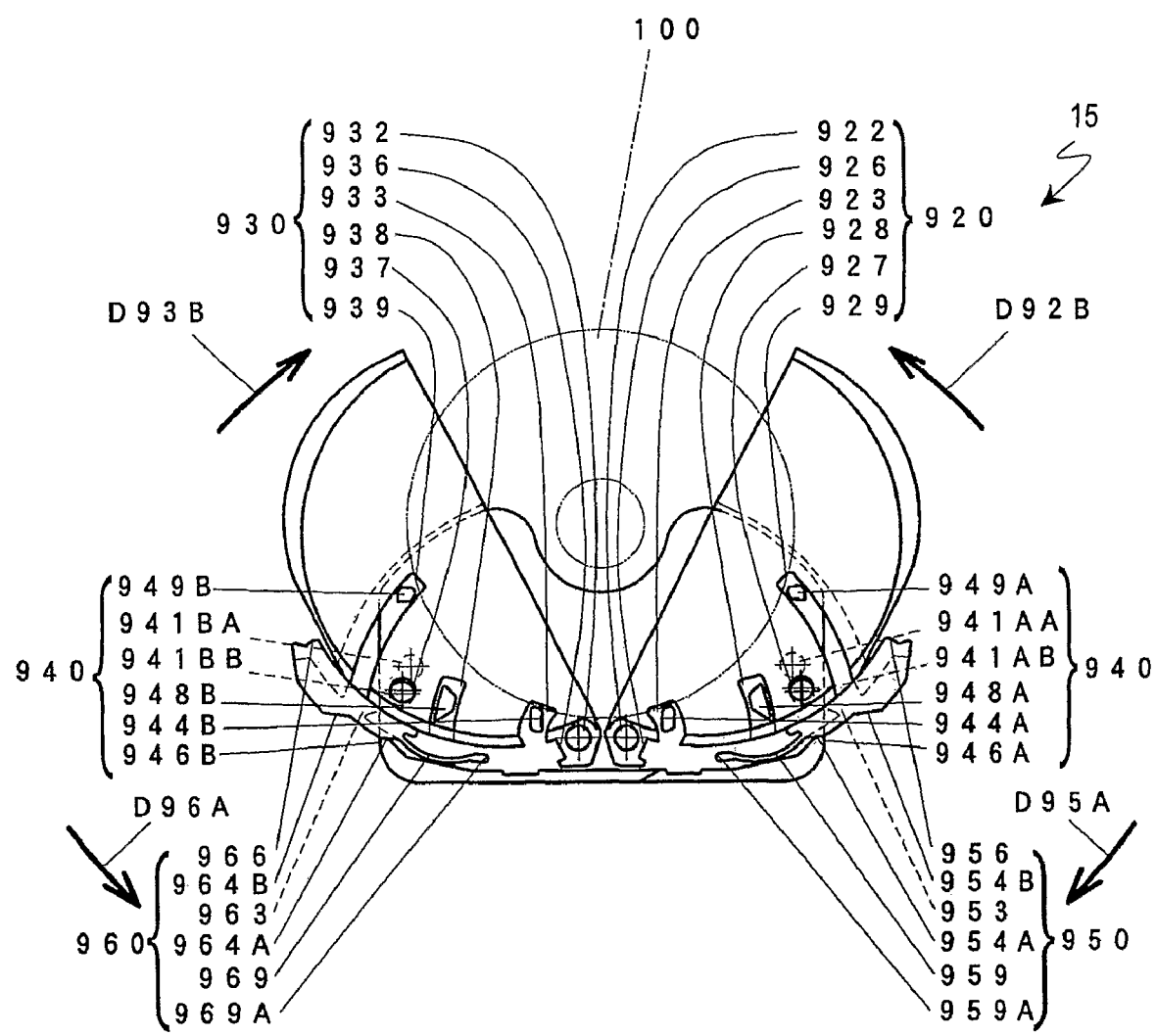
FIG. 31 illustrates how to close the first and second disk storage portions after the disk has been inserted into the disk cartridge of the fifth preferred embodiment of the present invention.

After the disk 100 has been inserted in the state shown in FIG. 30, the first and second disk storage portions 920 and 930 are rotated in the directions pointed by the arrows D92B and D93B and the first and second locking members 950 and 960 are rotated in the directions pointed by the arrows D95A and D96A, respectively, as shown in FIG. 31. In this process step, to rotate the first and second locking members 950 and 960, elastic force may be applied to the first and second lock levers 956 and 966 in the directions pointed by the arrows D95A and D96A, respectively.

In this case, as the first and second disk storage portions 920 and 930 and the first and second locking members 950 and 960 rotate, the first and second guide slopes (A) 954A and 964A may reach positions to possibly contact with the first and second rotation stoppers 946A and 946B of the supporting base member lower shell 940. However, these contact surfaces are sloped so as not to interfere with the rotation.

Figure 32:
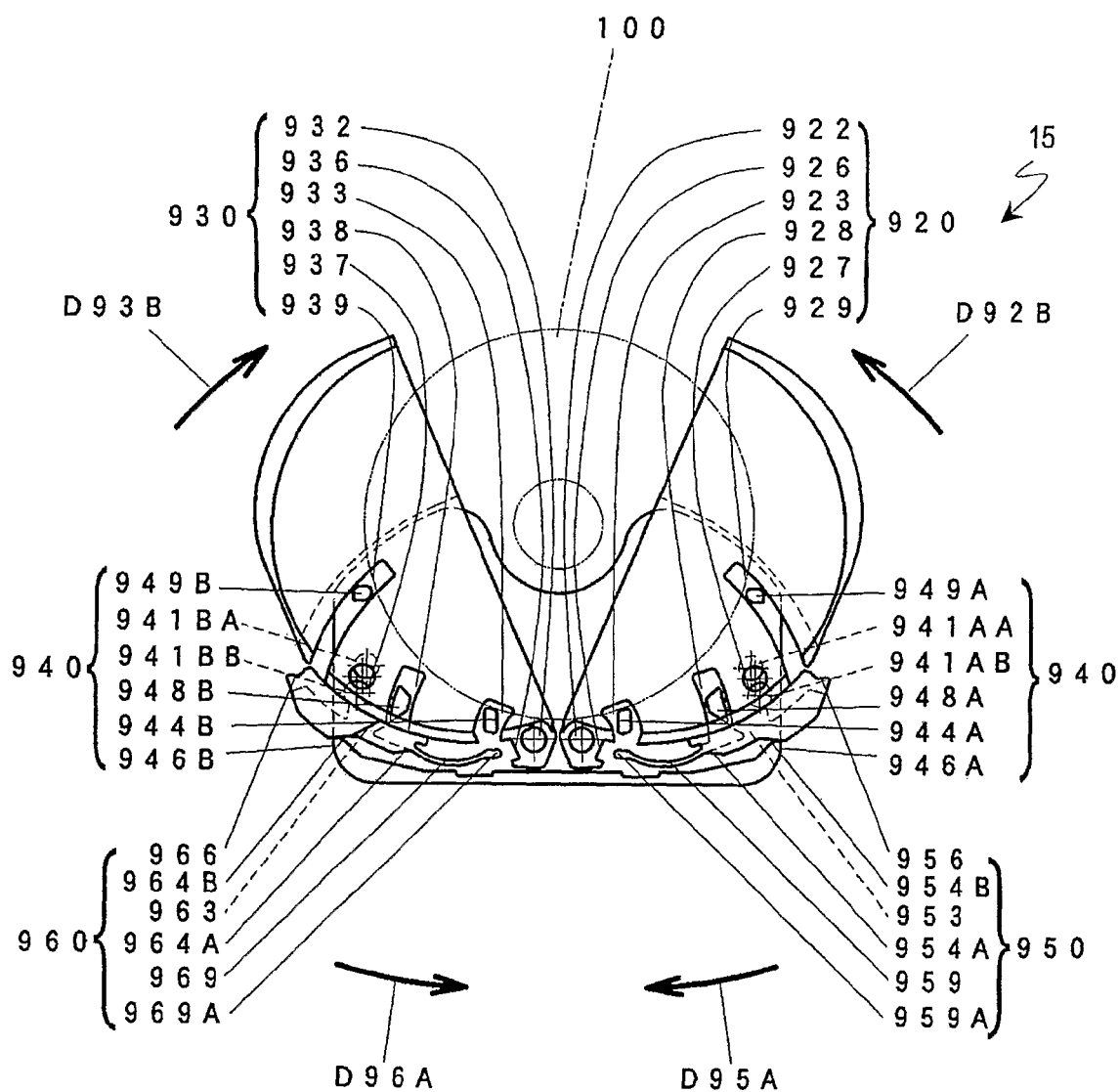
FIG. 32 illustrates how to close the first and second disk storage portions after the disk has been inserted into the disk cartridge of the fifth preferred embodiment of the present invention.

As the first and second disk storage portions 920 and 930 are further rotated in the directions pointed by the arrows D92B and D93B and the first and second locking members 950 and 960 are rotated in the directions pointed by the arrows D95A and D96A, respectively, as shown in FIG. 32, the first and second guide slopes (B) 954B and 964B may reach positions to possibly contact with the first and second rotation stoppers 946A and 946B. However, these contact surfaces are also sloped so as not to interfere with the rotation.

Figure 33:
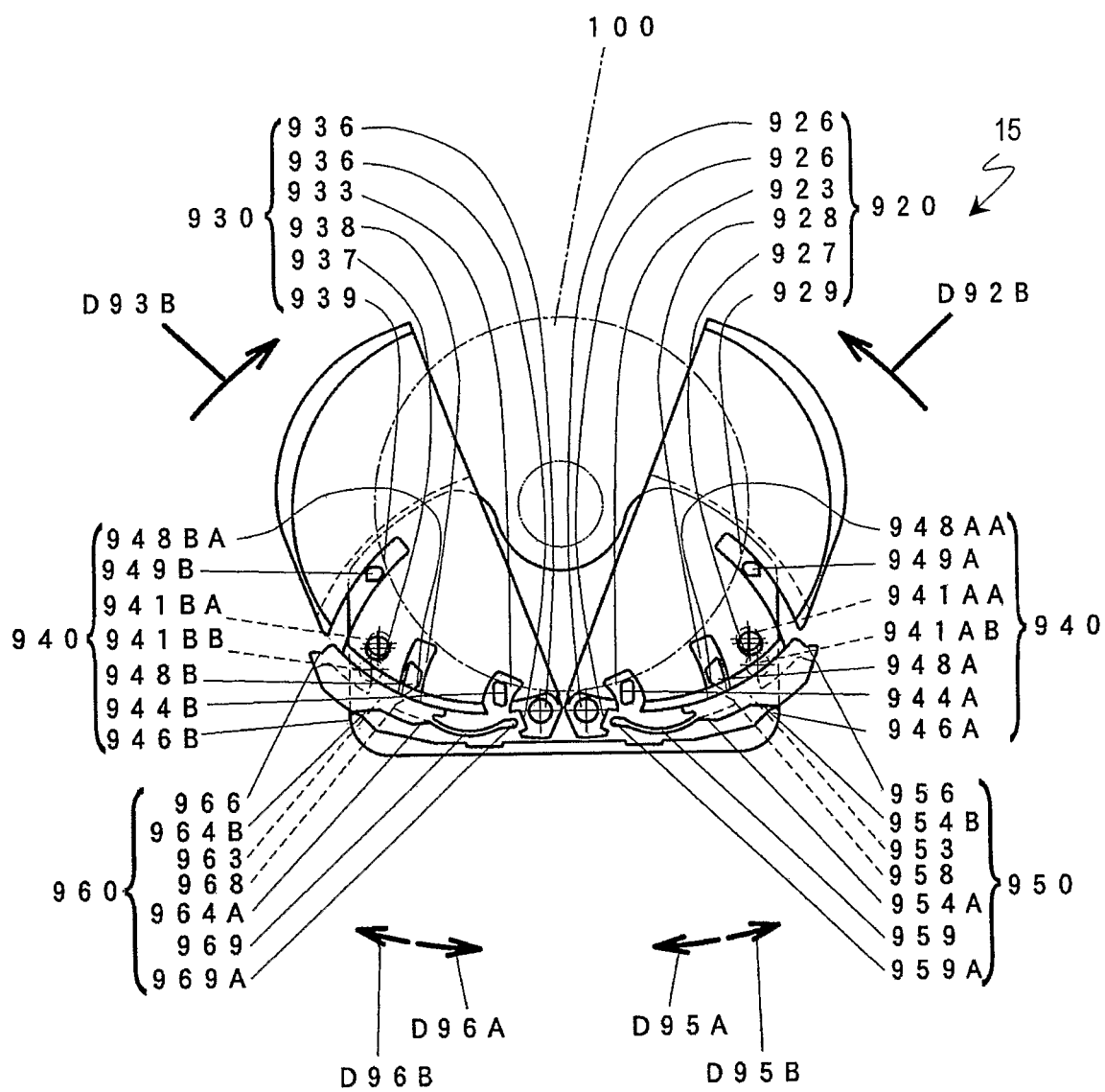
FIG. 33 illustrates how to close the first and second disk storage portions after the disk has been inserted into the disk cartridge of the fifth preferred embodiment of the present invention.

After that, the first and second disk storage portions 920 and 930 are further rotated in the directions pointed by the arrows D92B and D93B and the first and second locking members 950 and 960 are further rotated in the directions pointed by the arrows D95A and D96A, respectively, as shown in FIG. 33, thereby making the first and second guide slopes (A) 954A and 964A pass the first and second rotation stoppers 946A and 946B entirely. The first and second locking members 950 and 960 are sized so as not to interfere with the first and second catching protrusions until this passage is complete.

Figure 34:
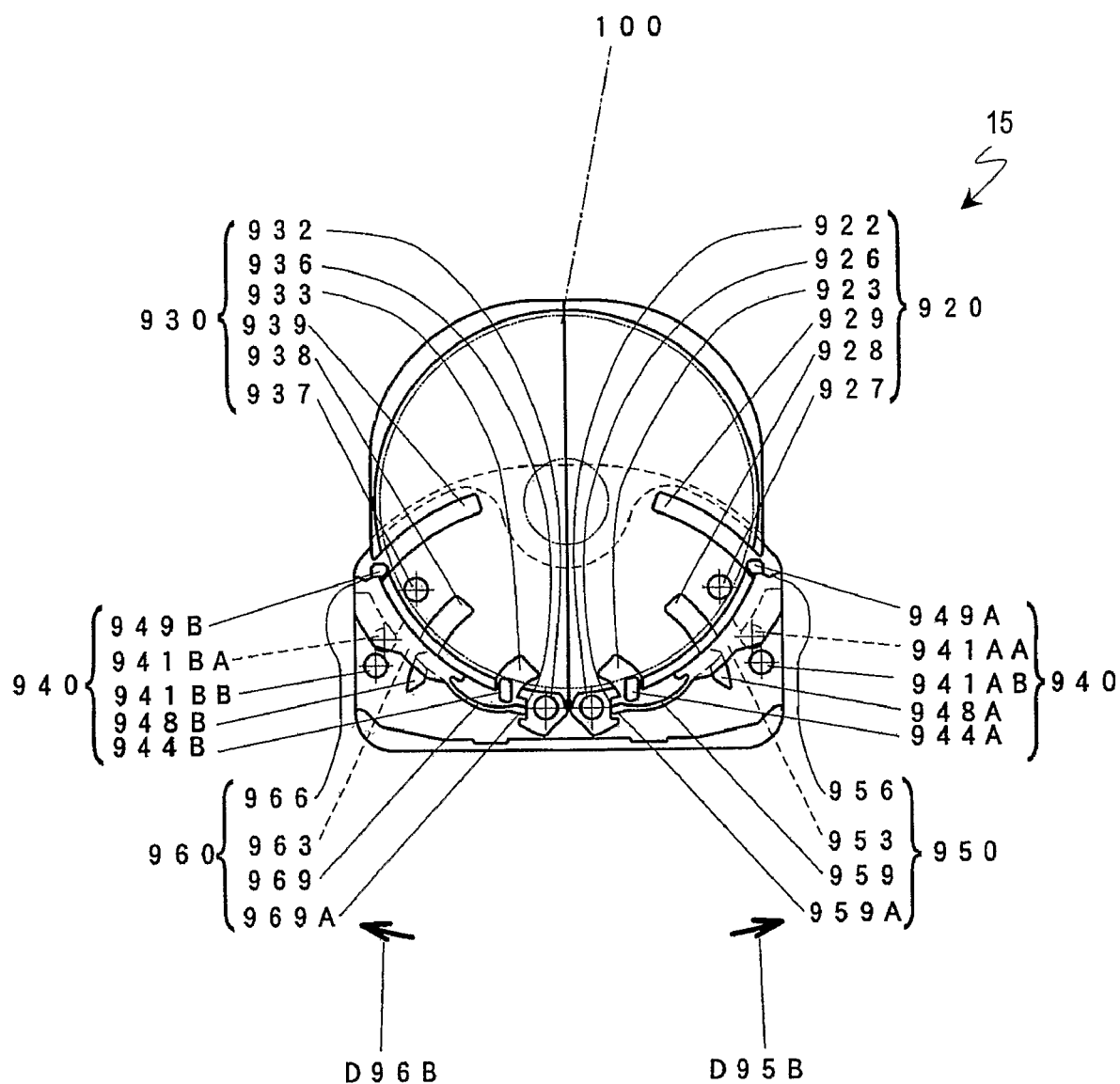
FIG. 34 illustrates a situation where the first and second disk storage portions are closed after the disk has been inserted into the disk cartridge of the fifth preferred embodiment of the present invention.

And then the first and second disk storage portions 920 and 930 are closed as shown in FIG. 34 to enclose the disk 100 completely.

In making a transition from the state shown in FIG. 33 into that shown in FIG. 34, the first and second unlocking slopes 958 and 968 shown in FIG. 33 contact with first and second raised slopes 948AA and 948BA to receive elastic force that has been applied in the directions pointed by the arrows D95A and D96A. As a result, the first and second pass grooves 953 and 963 of the first and second locking members 950 and 960 pass the first and second catching protrusions 948A and 948B, respectively. In this manner, the first and second disk storage portions 920 and 930 can be closed up without being interfered with by the first and second catching protrusions 948A and 948B.

Also, as elastic force is applied to the first and second locking members 950 and 960 in the directions pointed by the arrows D95A and D96A, the ends 959A and 969A of the first and second elastic portions 959 and 969 contact with the first and second spring catching portions 926 and 936, thereby further deforming the first and second elastic portions 959 and 969 elastically. As a result, force that moves the first and second locking members 950 and 960 in the directions pointed by the arrows D95B and D96B is produced.

Consequently, the first and second locking members 950 and 960 block the first and second catching protrusions 948A and 948B from reaching the first and second clearances 928 and 938 so as to keep the first and second disk storage portions 920 and 930 closed as shown in FIG. 34.

Also, when the first and second disk storage portions 920 and 930 are closed, the first and second unlocking guides (A) 955A and 965A provided for the first and second locking members 950 and 960 as shown in FIG. 28 have already moved sufficiently in the directions pointed by the arrows D95A and D96A and the first and second locking members 950 and 960 are blocked by the first and second checking portions 924 and 934 from being ejected in the directions pointed by the arrows D95B and D96B.

Figure 35:
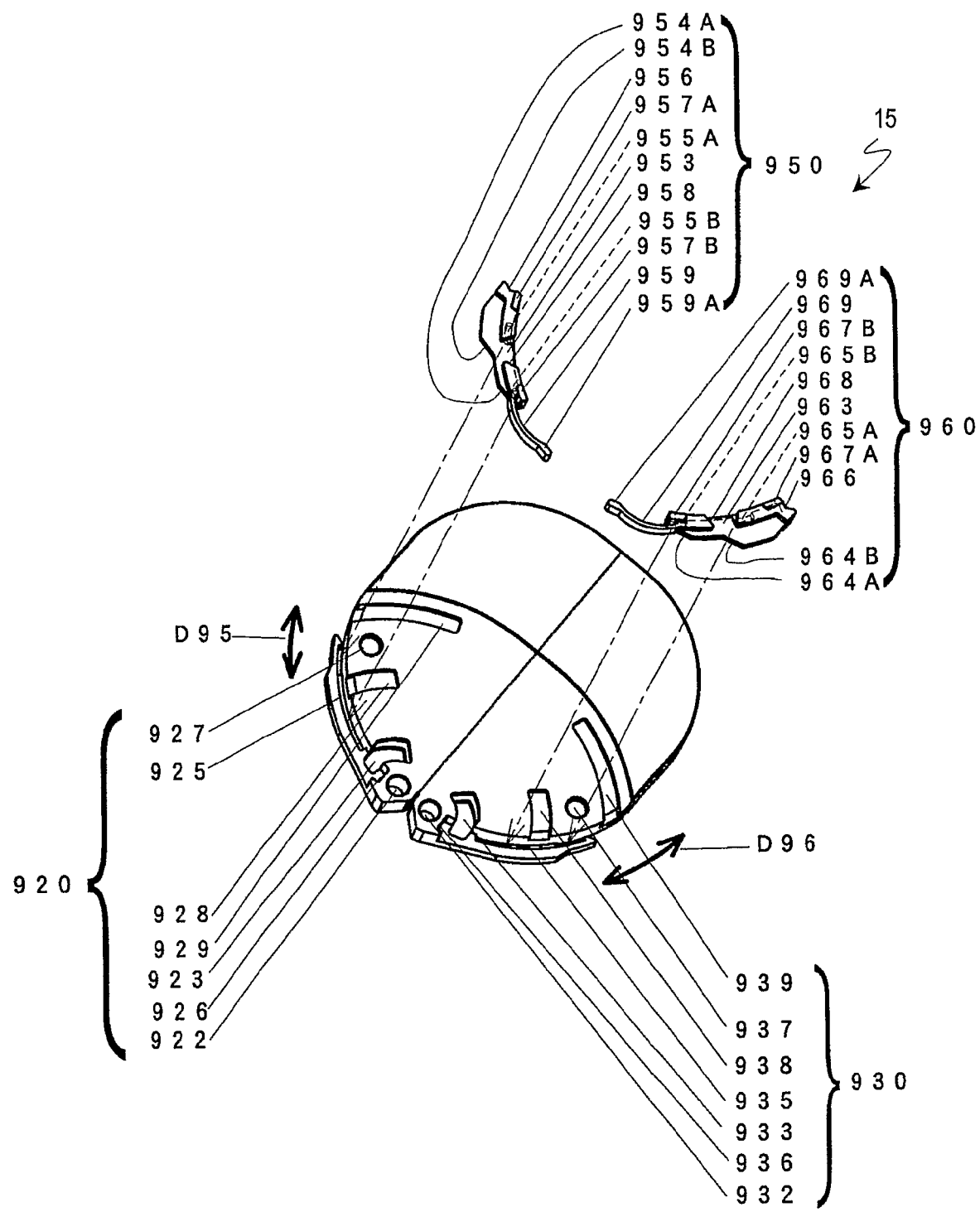
FIG. 35 illustrates where to attach the first and second locking members in the disk cartridge of the fifth preferred embodiment of the present invention.

FIG. 35 is a perspective view of the first and second disk storage portions 920 and 930 closed and the first and second locking members 950 and 960 as viewed from the direction pointed by the arrow P1 in FIG. 27. The first and second lock guide portions 925 and 935 guide the first and second locking members 950 and 960 and allow them to move in the directions pointed by the arrows D95 and D96.

As described above, the first and second unlocking guide portions (A) 955A and 965A and the first and second unlocking guide portions (B) 955B and 965B are blocked by the first and second checking portions 924 and 934 from being ejected in the directions pointed by the arrows D95B and D96B. These portions are fittingly inserted into, and guided along, the first and second lock guide portions 925 and 935, which are provided as grooves around the first and second disk storage portions 920 and 930, respectively.

Figure 36:
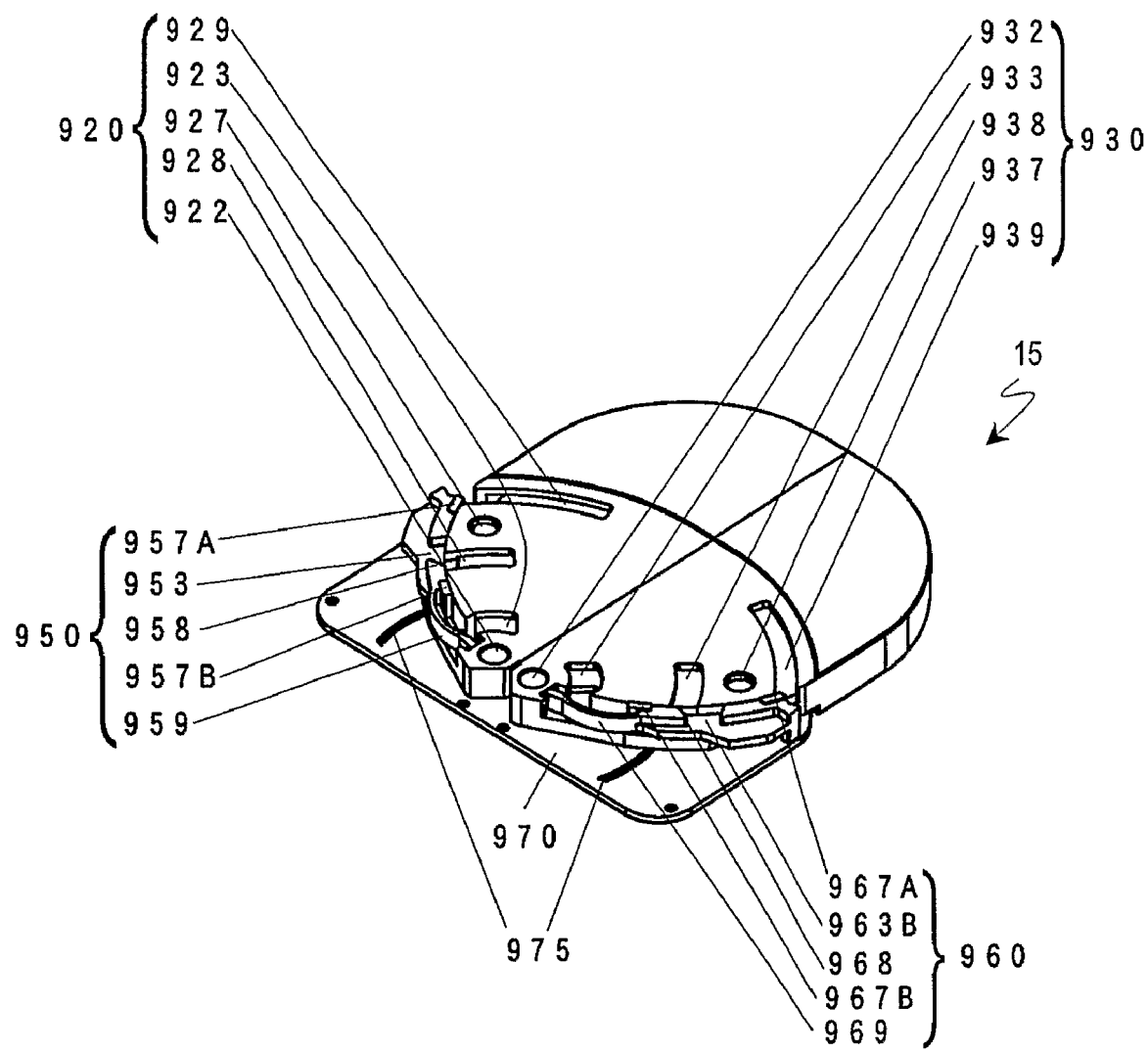
FIG. 36 is a perspective view of the first and second disk storage portions of the disk cartridge of the fifth preferred embodiment of the present invention, to which the first and second locking members have already been attached, as viewed from under the supporting base member lower shell.

FIG. 36 is a perspective view illustrating how the first and second locking members 950 and 960 have been attached to the first and second disk storage portions 920 and 930 as viewed from the direction pointed by the arrow P1 in FIG. 27. In FIG. 36, these members are shown with the supporting base member lower shell 940 removed.

As shown in FIG. 36, the supporting base member upper shell 970 has an upper storage reference plane 975 that sticks out of the supporting base member upper shell 970 as a reference plane to contact with the first and second disk storage portions 920 and 930 rotating.

The supporting base member 940 further includes first and second locking member stoppers 949A and 949B that prevent the first and second locking members 950 and 960 from moving in the directions pointed by the arrows D95B and D96B while the first and second disk storage portions 920 and 930 are closed as shown in FIG. 34. As a result, while the first and second disk storage portions 920 and 930 are closed, even stronger force can be applied to prevent the first and second locking members 950 and 960 from moving in the directions pointed by the arrows D95B and D96B.

Figure 37:
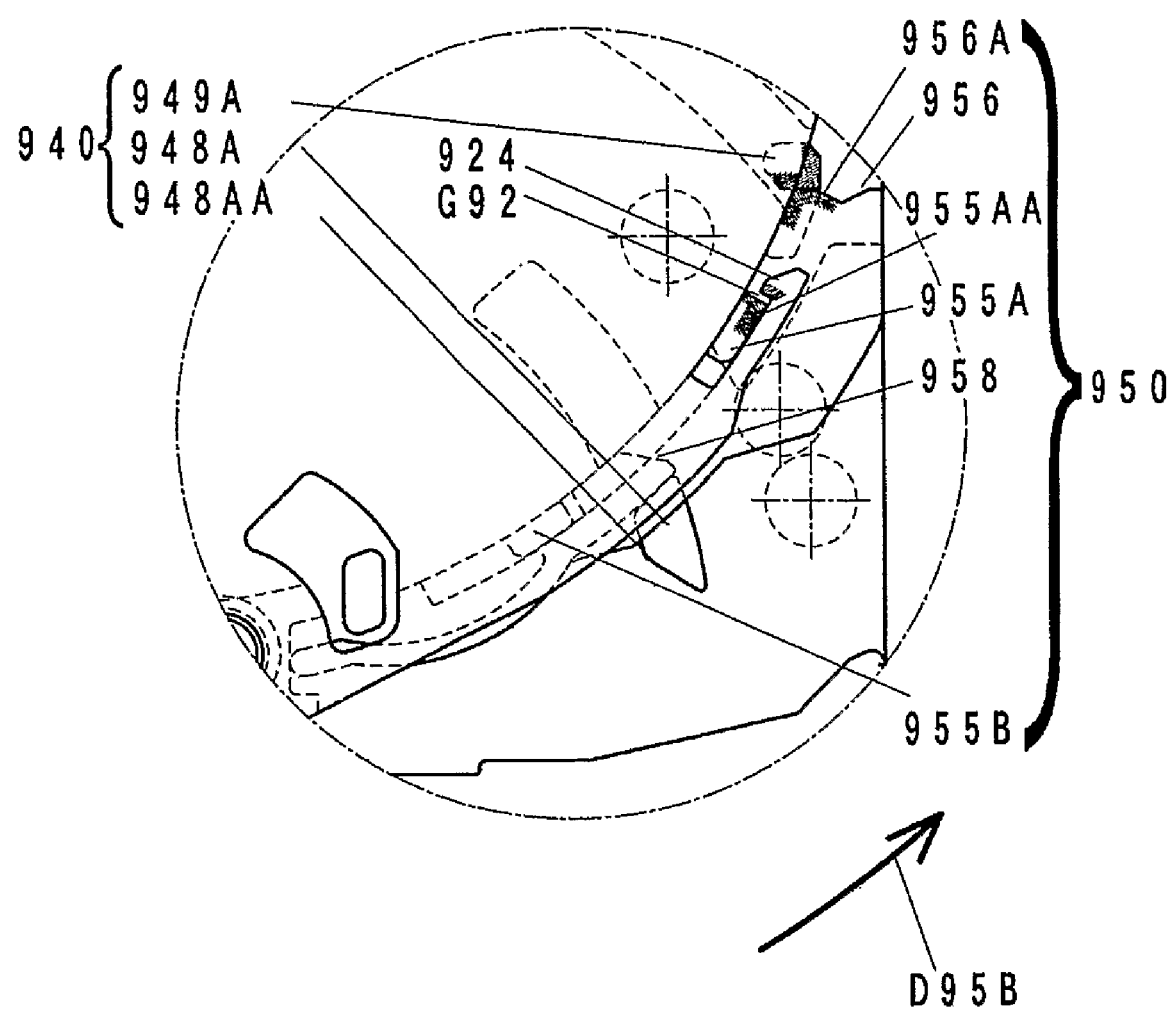
FIG. 37 illustrates an arrangement for latching the first and second locking members in the disk cartridge of the fifth preferred embodiment of the present invention.

At this time, the sizes are determined so as to bring the first locking member stopper 9494A into contact with a first stopper contact portion 956A, which is provided for the first locking member 950 so as to face the first locking member stopper 949A, but not to bring the first checking portion 924 into contact with a first checking portion contact portion 955AA that faces the first checking portion 924, and a gap G92 is provided between the first checking portion 924 and the first checking portion contact portion 955AA as shown in FIG. 37. In this case, while the first disk storage portion 920 is closed, the force that is going to eject the first locking member 950 in the direction pointed by the arrow D95B is always received at the first locking member stopper 949A. As a result, compared to the situation where the force that is going to eject the first unlocking guide portion 955A is damped by the first checking portion 924, higher braking performance is realized because the first locking member stopper 949A with a high degree of stability performs the main stopping function.

Hereinafter, the operation of loading the disk cartridge 15 in which the disk 100 is enclosed into the disk drive (not shown) will be described with reference to FIGS. 38 and 39.

Figure 38:
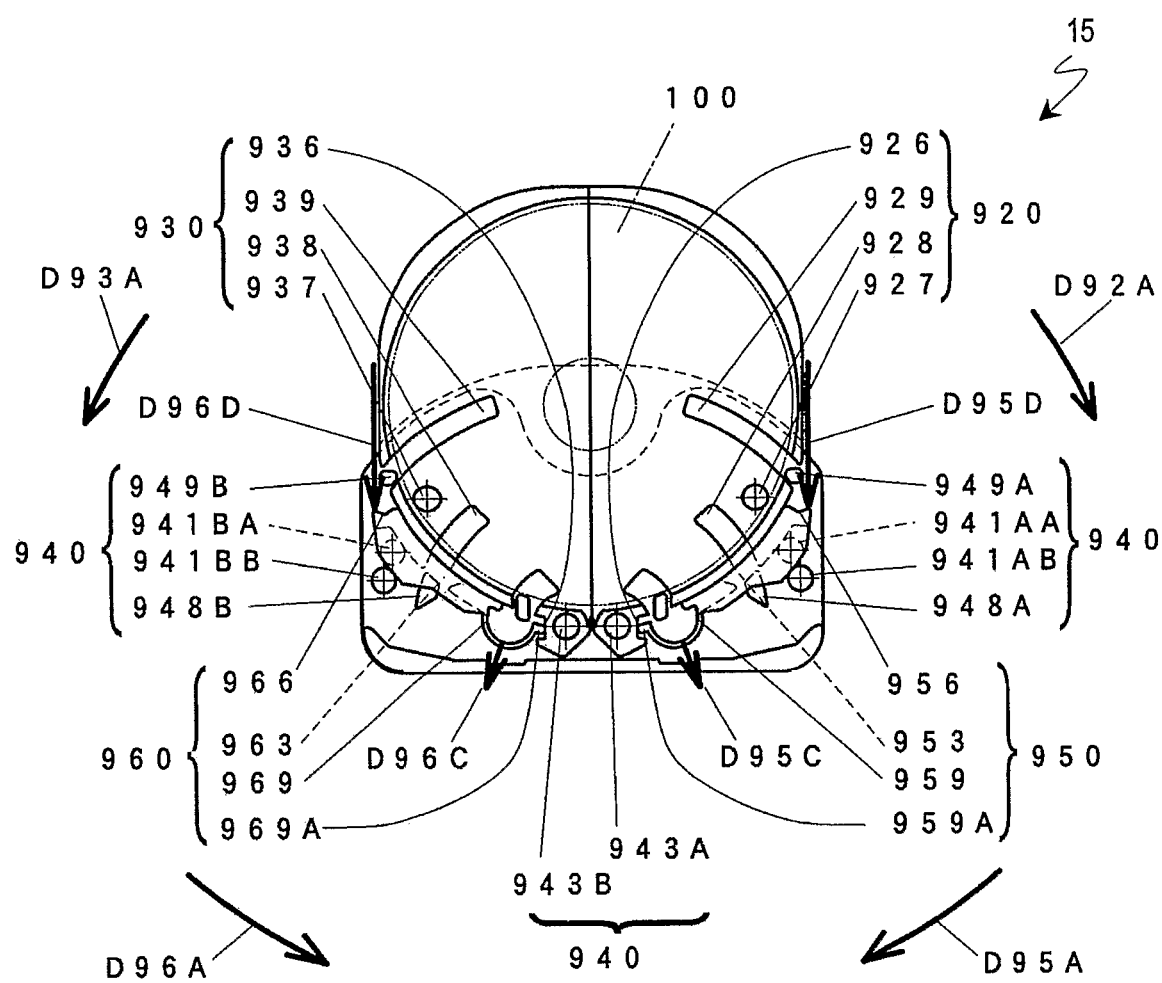
FIG. 38 illustrates how the disk cartridge of the fifth preferred embodiment of the present invention looks when the first and second locking members are unlocked.
Figure 39:
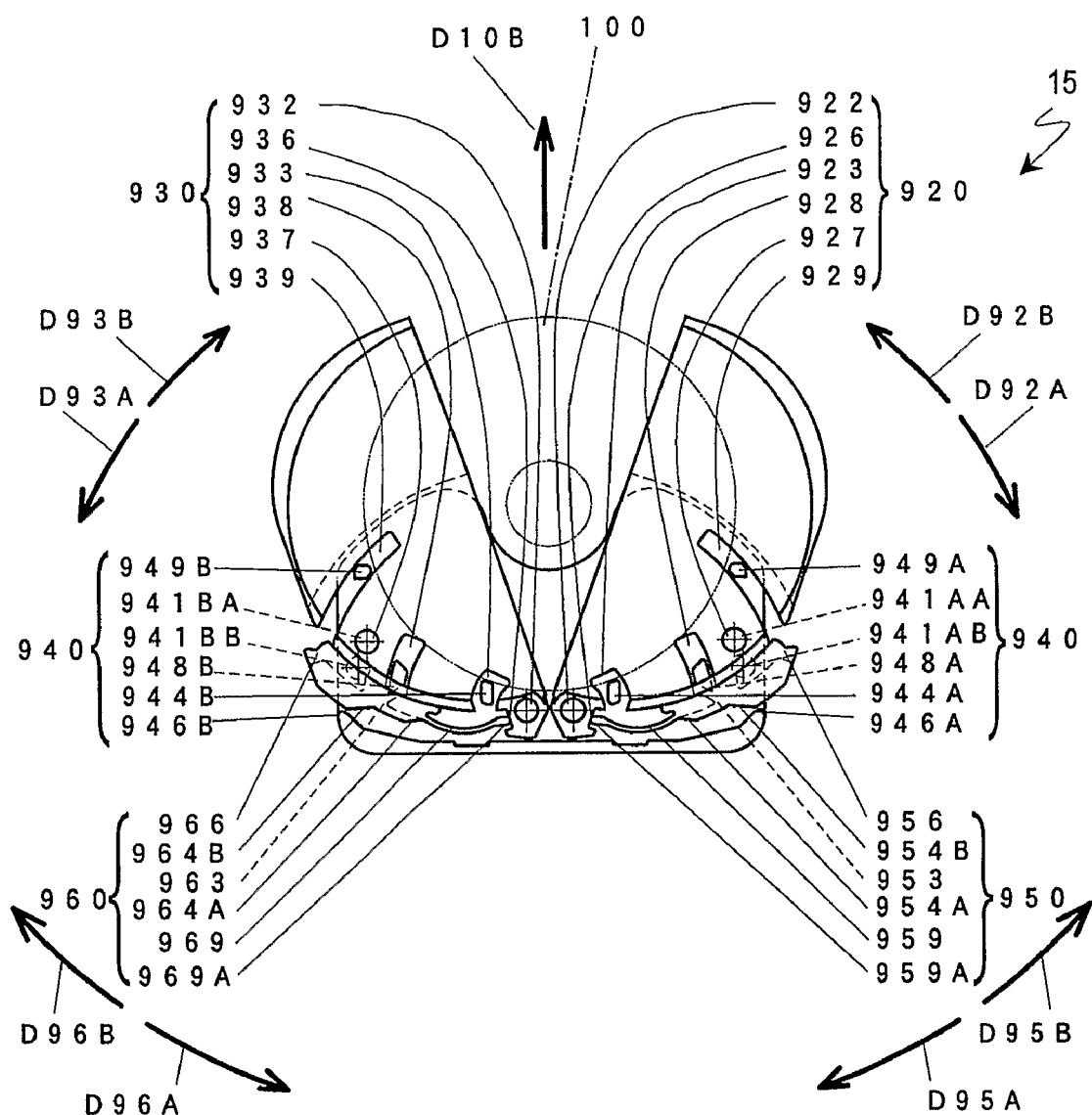
FIG. 39 illustrates the first opened state of the disk cartridge of the fifth preferred embodiment of the present invention.

FIGS. 38 and 39 are cross-sectional views of the disk cartridge 15 as viewed on the plane S1-S1 shown in FIG. 27.

When the disk cartridge 15 in which the first and second disk storage portions 920 and 930 are closed is inserted into the disk drive, an operating mechanism (not shown) provided for the disk drive presses the first and second lock levers 956 and 966 of the first and second locking members 950 and 960 in the directions pointed by the arrows D95D and D96D. As a result, the first and second locking members 950 and 960 rotate in the directions pointed by the arrows D95A and D96A, respectively.

As shown in FIG. 38, as the first and second locking members 950 and 960 rotate in the directions pointed by the arrows D95A and D96A, the ends 959A and 969A of the first and second elastic portions 959 and 969 are pushed by the first and second spring catching portions 926 and 936, thereby deforming the first and second elastic portions 959 and 969 elastically and making these portions advance in curved traces in the directions pointed by the arrows D95C and D96C, respectively.

In this manner, while the first and second disk storage portions 920 and 930 are rotating in the directions pointed by the arrows D92A and D93A, the first and second locking members 950 and 960 are turned in the directions pointed by the arrows D95A and D96A to such a degree that the first and second pass grooves 953 and 963 can avoid interfering with the first and second catching protrusions 948A and 948B. As a result, the first and second disk storage portions 920 and 930 are unlocked.

If the first and second disk storage portions 920 and 930 that have been unlocked as described above are rotated in the directions pointed by the arrows D92A and D93A, the disk cartridge now enters the first opened state shown in FIG. 39 in which the disk drive (not shown) can actually read and write data from/on the disk 100 enclosed in the disk cartridge.

By this point in time, the first and second pass grooves 953 and 963 of the first and second locking members 950 and 960 have already passed the first and second catching protrusions 948A and 948B. Also, the disk cartridge is designed such that the pressure that has been applied by the operating mechanism (not shown) of the disk drive is removed at this point in time. That is why the first and second elastic portions 959 and 969 are not deformed due to the elastic force as shown in FIG. 38 anymore but reenter the state shown in FIG. 39. At this time, the relative positions of the first and second locking members 950 and 960 with respect to the first and second disk storage portions 920 and 930 are the same as those shown in FIG. 34, i.e., before the first and second locking members 950 and 960 in the closed state apply pressure in the directions pointed by the arrows D95D and D96D shown in FIG. 38.

It should be noted that the first and second locking member stoppers 949A and 949B of the supporting base member lower shell are located off the trajectory of rotation of the first and second locking members 950 and 960 while the first and second disk storage portions 920 and 930 are rotating in the directions pointed by the arrows D92A and D93A, and do not interfere with the rotation of the first and second locking members 950 and 960.

Also, even if the disk cartridge 15 has entered the first opened state as shown in FIG. 39, the first and second locking members 950 and 960 never contact with the first and second rotation stoppers 946A and 946B.

However, if the relative positions of the first and second locking members 950 and 960 with respect to the first and second disk storage portions 920 and 930 are as shown in FIG. 39, the first and second disk storage portions 920 and 930 are never opened to the second opened state described above. Also, at these relative positions, the movement of the first and second unlocking guide portions (A) in the directions pointed by the arrows D95B and D96B can be blocked by the first and second checking portions 924 and 934 unless their ejection force is too strong. That is why once the disk 100 has got enclosed in the disk cartridge and once the first and second locking members 950 and 960 have been attached to the first and second disk storage portions 920 and 930, the disk 100 can no longer be removed in the direction pointed by the arrow D10B. As a result, it is possible to prevent the disk 100 from being removed carelessly and getting soiled or scratched. It should be noted that the disk 100 cannot be removed in any direction other than that pointed by the arrow D10B.

Furthermore, in the state shown in FIG. 39, the first disk storage portion 920 has been opened to such a degree that the first storage portion positioning hole 927 agrees with the first body positioning hole (A) 941AA. In the same way, the second disk storage portion 930 has been opened to such a degree that the second storage portion positioning hole 937 agrees with the second body positioning hole (A) 941BA.

As a result, while the disk cartridge is going to be fixed at a predetermined position in the disk drive (not shown) to get data actually read or written by the disk drive (not shown) from/on the disk 100 enclosed in the disk cartridge, the first and second disk storage portions 920 and 930 can be made to assume the first opened state just as intended using the position pins (not shown) and can be accurately positioned with respect to the disk drive.

In ejecting the disk cartridge 15 from the disk drive, the disk cartridge 15 makes a transition from the state shown in FIG. 39 into that shown in FIG. 38. In that case, the disk cartridge 15 operates just as described above to make a transition from the second opened state shown in FIG. 33 in which the first and second locking members 950 and 960 are attached into the state shown in FIG. 34 in which the disk 100 is inserted. More specifically, as the first and second disk storage portions 920 and 930 are rotated in the directions pointed by the arrows D92B and D93B, the first and second unlocking slopes 958 and 968 shown in FIG. 10 contact with the first and second raised slopes 948AA and 948BA to receive the elastic force that has been applied in the directions pointed by the arrows D95A and D96A. As a result, the first and second pass grooves 953 and 963 of the first and second locking members 950 and 960 can pass the first and second catching protrusions 948A and 948B.

In the preferred embodiment described above, the first and second disk storage portions 920 and 930 and the supporting base member lower shell 400 are positioned with positioning pins (not shown) that are located at mutually different positions between the first and second opened states. More specifically, in positioning the supporting base member lower shell 940 and the first and second disk storage portions 920 and 930 at the same time, when the first and second disk storage portions 920 and 930 are in the first opened state, the first and second body positioning holes (A) 941AA and 941BA and the first and second storage portion positioning holes 927 and 937 are used. On the other hand, when the first and second disk storage portions 920 and 930 are in the second opened state, the first and second body positioning holes (B) 941AB and 941BB and the first and second storage portion positioning holes 927 and 937 are used.

In this manner, by using the positioning pins at mutually different positions between the first opened state in which the disk cartridge is loaded in the disk drive and the second opened state in which the disk 100 is inserted into the disk cartridge, it is possible to avoid an unwanted situation where the disk cartridge in the first opened state is used in the process step of inserting the disk 100 by mistake or where the disk cartridge in the second opened state is loaded into the disk drive erroneously.

Figure 40:
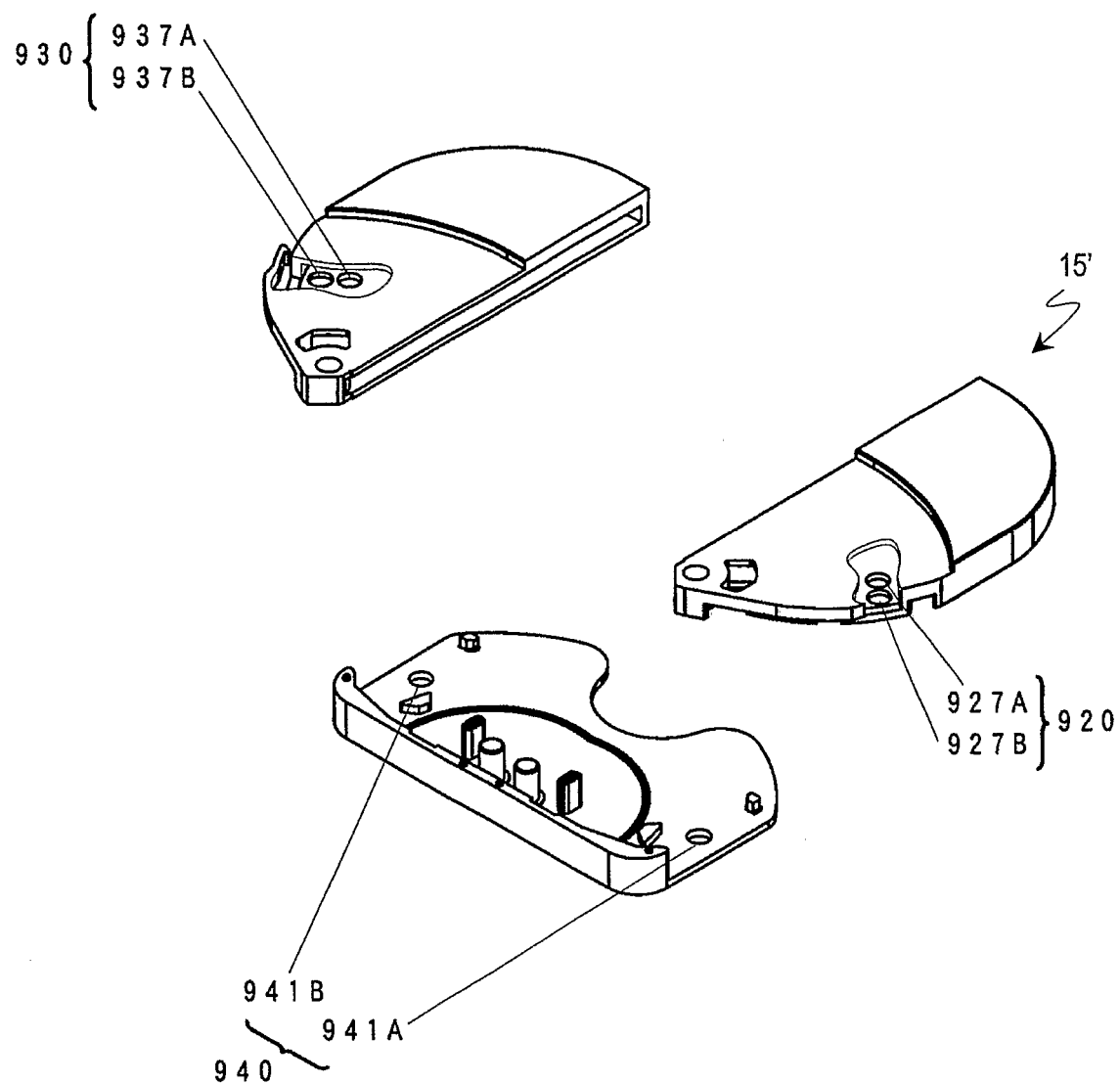
FIG. 40 is an exploded perspective view illustrating a modified example of the disk cartridge of the fifth preferred embodiment of the present invention in which the position holes are relocated.

Alternatively, the first and second disk storage portions 920 and 930 and the supporting base member lower shell 400 may also be positioned using positioning pins (not shown) that remain at the same positions between the first and second opened states. FIG. 40 is an exploded perspective view illustrating the supporting base member lower shell 940 and first and second disk storage portions 920 and 930 of such a disk cartridge 15'.

Unlike the disk cartridge 15 of the fifth preferred embodiment described above, the first and second disk storage portions 920 and 930 of this disk cartridge 15' have first and second storage portion positioning holes (A) 927A and 937A and first and second storage portion positioning holes (B) 927B and 937B and the supporting base member lower shell 940 has only the first and second body positioning holes 941A and 941B.

It should be noted that the first and second storage portion positioning holes (A) 927A and 937A and first and second storage portion positioning holes (B) 927B and 937B are located on the lower surface of the first and second disk storage portions 920 and 930 so as to face the supporting base member lower shell 940 and should actually be invisible from the viewpoint shown in FIG. 40. That is why these holes are shown in FIG. 40 by partially cutting away the first and second disk storage portions 920 and 930 as indicated by the broken curves.

The disk cartridge 15' in the first opened state is positioned using the first and second body positioning holes 941A and 941B and the first and second storage portion positioning holes (A) 927A and 937A. On the other hand, the disk cartridge 15' in the second opened state is positioned using the first and second body positioning holes 941A and 941B and the first and second storage portion positioning holes (B) 927B and 937B.

As a result, the positioning pins provided for the disk drive can be designed so as to be located at the same positions as the positioning pins provided for a base member (not shown) that is used in the process step of inserting the disk 100 into the disk cartridge 15'. Consequently, the number of designing process steps can be reduced or some member may be used in common.

In the preferred embodiment described above, after the supporting base member lower shell 940, the first and second disk storage portions 920 and 930 and the supporting base member upper shell 970 have been assembled together, the first and second locking members 950 and 960 are supposed to be attached to the assembly as shown in FIG. 28. Alternatively, the first and second locking members 950 and 960 may be provisionally attached to the first and second disk storage portions 920 and 930 and then the assembly may be fitted into the supporting base member lower shell 940.

Also, the supporting base member lower shell 940, the supporting base member upper shell 970, the first and second disk storage portions 920 and 930 and the first and second locking members 950 and 960 may be made of a resin or any other known material for normally use in disk cartridges. The first and second elastic portions 959 and 969 are deformed elastically only after the first and second disk storage portions 920 and 930 are unlocked and before the first and second disk storage portions 920 and 930 are fully opened. Thus, the first and second elastic portions 959 and 969 that are being deformed elastically are never used for a long time. That is why even if the elastic portions 959 and 969 were made of a resin material, almost no creep deformation should be produced.

Furthermore, in the preferred embodiment described above, the first and second elastic portions 959 and 969 form integral parts of the first and second locking members 950 and 960 but need to have particularly high elasticity and high toughness. That is why if it is difficult to realize these two properties at the same time by making the first and second elastic portions 959 and 969 form integral parts of the first and second locking members 950 and 960, then the first and second elastic portions 959 and 969 and the first and second locking members 950 and 960 may be made of two different materials that realize these two properties and then joined together.

Optionally, the first and second locking members 950 and 960 may be linked together between the elastic portions 959, 969 and the first spring catching portions 926, 936 and may form integral parts of the first and second disk storage portions 920 and 930.

The first and second clearances 928 and 938 have an arc shape, of which the centers are defined at the first and second shaft holes 922 and 932, as shown in FIGS. 35 and 36. However, as long as the clearances 928 and 938 have such a shape as to avoid interference with the first and second catching protrusions 948A and 948B, the clearances 928 and 938 do not have to have such an arc shape.

Likewise, the first and second lock stopper relieves 929 and 939 have an arc shape, of which the centers are also defined at the first and second shaft holes 922 and 932, as shown in FIGS. 35 and 36. However, as long as the clearances 929 and 939 have such a shape as to avoid interference with the first and second locking member stoppers 949A and 949B, the clearances 929 and 939 do not have to have such an arc shape.

Furthermore, the first and second catching protrusions 948A and 948B have an arc shape, of which the centers are defined at the first and second rotation supporting portions 943A and 943B, as shown in FIGS. 24 and 25. However, as long as the protrusions 948A and 948B have such a shape as to hold the first and second disk storage portions 920 and 930, the protrusions 948A and 948B do not have to have such an arc shape.

The first and second body positioning holes (A) 941AA and 941BA are both complete round as shown in FIGS. 34 and 35. However, one of these two holes may be elongated parallel to a line, which connects together the respective centers of these two holes, into an elliptical shape, of which the position with respect to the positioning pins is determined in its minor axis direction.

The first and second body positioning holes (B) 941AB and 941BB are both complete round as shown in FIGS. 24 and 25. However, one of these two holes may be elongated parallel to a line, which connects together the respective centers of these two holes, into an elliptical shape, of which the position with respect to the positioning pins is determined in its minor axis direction.

Also, the first and second body positioning holes 941A and 941B are both complete round as shown in FIG. 40. However, one of these two holes may be elongated parallel to a line, which connects together the respective centers of these two holes, into an elliptical shape, of which the position with respect to the positioning pins is determined in its minor axis direction.

Furthermore, the first and second storage portion positioning holes 927 and 937 are both complete round as shown in FIGS. 35 and 36. However, one of these two holes may be elongated parallel to a line, which connects together the respective centers of these two holes, into an elliptical shape, of which the position with respect to the positioning pins is determined in its minor axis direction.

Furthermore, the first and second storage portion positioning holes (A) 927A and 937A are both complete round as shown in FIG. 40. However, one of these two holes may be elongated parallel to a line, which connects together the respective centers of these two holes, into an elliptical shape, of which the position with respect to the positioning pins is determined in its minor axis direction.

Furthermore, the first and second storage portion positioning holes (B) 927B and 937B are both complete round as shown in FIG. 40. However, one of these two holes may be elongated parallel to a line, which connects together the respective centers of these two holes, into an elliptical shape, of which the position with respect to the positioning pins is determined in its minor axis direction.

As described above, the disk cartridge of the present invention has no housing that defines the profile of a conventional cartridge but instead includes a pair of disk storage portions that not only defines the profile of the cartridge but also functions as shutters. By rotating this pair of disk storage portions in mutually opposite directions with respect to the supporting base member, even a disk cartridge of a small size can open and close a big head access window and a big chucking hole for an external device.

In a conventional disk cartridge, a movement guide portion for opening and closing a shutter needs to be provided for its head access window and therefore, the height of the head used is limited. However, according to the present invention, a big head access window with no movement guide portion can be created by opening the pair of disk storage portions. Consequently, even a small cartridge can create as big a head access window as that of a large cartridge, and constraints on the height of the optical head can be relaxed significantly during the designing process.

Also, when the pair of disk storage portions is opened, the center of the disk may be positioned not just by the supporting base member but also by the positioning members of the disk drive as well. As a result, the positioning accuracy of the supporting base member that should be very high in a conventional disk cartridge does not have to be that high, and yet the disk can be positioned far more accurately within the disk drive.

Meanwhile, while the pair of disk storage portions is closed, the positioning allowance that has been required in a conventional disk cartridge may be eliminated and the disk can be held completely with the inner walls of the disk storage portions. As a result, no uncomfortable sounds should be caused by inconstant movement of the disk and no dust should deposit on the data storage side of the disk.

On top of that, since just a pair of disk storage portions can function both as shutters and disk housing, the structure can be simplified, the number of members required can be reduced and the manufacturing cost of the disk cartridge can be cut down significantly.

Besides, since the disk storage portions function not only as disk storage but also as shutters, the disk storage portions can be thicker than conventional ones, considering the ratio of the maximum allowable height of the disk cartridge to that of the disk drive. Consequently, the airtightness and mechanical strength of the disk cartridge can be increased significantly.

What is more, the pair of disk storage portions is provided with two locking members that are interlocked with each other so as to rotate in mutually opposite directions and regulate the rotations in their opening directions. That is why even if one of the two locking members is unlocked externally, the disk storage portions cannot still be rotated. That is to say, only when the two locking members are both unlocked completely, the disk storage portions can be opened. As a result, it is possible to almost entirely prevent the user from opening the disk storage portions unnecessarily and leaving finger marks on the surface of the disk accidentally or carelessly.

Moreover, the disk storage portions with the shutter function and the supporting base member all have a fully or partially double layer structure. That is why the disk cartridge of the present invention can have much higher mechanical strength than conventional cartridges.

Consequently, even if the disk cartridge is subjected to some unexpected serious disturbance, e.g., dropped or stepped on while be carried, the disk cartridge realizes much higher shock resistance than conventional ones and fully satisfies one of the most important requirements for portable small disk cartridges.

Also, in a cartridge that is supposed to enclose a disk with a small diameter, such a disk is sometimes enclosed in the disk cartridge with a metallic clamp fitted into the disk. However, according to the principle of the present invention, chucking holes of similar shapes can be created easily both over and under the disk, and therefore, there is no need to provide any clamp plate inside the cartridge. That is to say, the clamp may be provided for the disk drive, not the disk cartridge. As a result, such a disk cartridge with absolutely no metallic parts can be manufactured at an even lower cost.

Besides, the structure of the present invention, including a pair of disk storage portions functioning as not only disk storage but also as shutters and a supporting base member that supports the disk storage portions rotatably, realizes a totally new and unique cartridge design that should not be found anywhere else.

Consequently, according to the present invention, the head access window can be designed so as to account for a relatively large percentage of the projection area of the cartridge and the constraint on the height of the head can be relaxed during the designing process. In addition, according to the present invention, the disk can be positioned far more accurately in the disk drive, the overall manufacturing cost can be cut down by reducing the number of members required, and high dustproofness and high reliability are realized by the structure with significantly increased mechanical strength and shock resistance. On top of that, the disk cartridge of the present invention realizes a quite new and unique design and can be used effectively as a portable disk cartridge for various small-sized disk drives including disk camcorders.

Furthermore, although a disk cartridge with a disk is also called a "data storage medium" collectively, the members of the disk cartridge are actually manufactured and assembled together by quite different manufacturing and testing processing steps from those of the disk itself. For that reason, these two groups of manufacturing processing steps should be separated from each other completely. In the disk cartridge of the present invention, the disk can be inserted into the disk cartridge after all members of the disk cartridge, except the disk, have already been assembled together. As a result, the processing steps of assembling and completing the disk cartridge alone and the processing step of inserting the disk thereto can be totally separated from each other, and the manufacturing cost can be cut down significantly.

Furthermore, in the disk cartridge of the present invention, the locking members are held movably on the disk storage portions that are rotatable themselves, too. As a result, constraints on the positions of the locking members and the maximum allowable degrees of rotation of the respective disk storage portions can be relaxed and the locking members and disk storage portions can be designed much more freely.

Also, in the disk cartridge of the present invention, while the disk storage portions can assume the four different states of the closed and locked state, the unlocked state, the first opened state and the second opened state, the locking members can be located at respectively different positions, and therefore, can perform respectively different functions in those four states.

Furthermore, in the disk cartridge of the present invention, the relative positions of the locking members in the third pair of positions with respect to the two disk storage portions are the same as those of the locking members in the first pair of positions. That is why except while the disk storage portions are rotating to make a transition from the first opened state into the second opened state, the locking members can easily resume their original stabilized state.

What is more, in the disk cartridge of the present invention, the second opened state is realized only when the locking members stay in the fourth pair of positions. That is to say, the disk cannot be removed unless the locking members are at those particular locations that are specially defined to take the disk out. As a result, it is possible to prevent the disk from being ejected unnecessarily.

On top of that, in the disk cartridge of the present invention, while the locking members are at the third pair of positions, the supporting base member, which function as a fixing member, can prevent the disk storage portions from making a transition from the first opened state into the second opened state with more certainty.

Besides, the disk cartridge of the present invention is designed such that the locking members are interposed between the catching protrusions and the disk storage portions so as to prevent the disk storage portions from rotating unnecessarily. As a result, a locking mechanism that can keep the respective disk storage portions closed can be formed easily with the space saved and secure and tight locking function is realized, too.

In addition, in the disk cartridge of the present invention, the catching protrusions are arranged with the rotation operation area of the respective disk storage portions, and therefore, the area of the disk cartridge projected along the axis of rotation thereof, and eventually the overall size of the disk cartridge, can be reduced.

Also, in the disk cartridge of the present invention, the respective disk storage portions have clearances that can avoid interference with the catching protrusions, and therefore, it is possible to avoid the catching protrusions within a plane that crosses the axis of rotation of the respective disk storage portions at right angles. As a result, the size of the disk cartridge as measured parallel to the axis of rotation thereof, i.e., the thickness of the disk cartridge, can be reduced.

Furthermore, in the disk cartridge of the present invention, the locking members include elastic portions for making a transition from the unlocked state into the locked state. That is why the locking members can return from the second pair of positions to the first pair of positions by themselves without being operated externally.

On top of that, in the disk cartridge of the present invention, the elastic portions apply no elastic force to the disk storage portions or the supporting base member except when the disk storage portions are unlocked. For that reason, even if the elastic portions, disk storage portions or supporting base member is made of a material that could possibly cause creep deformation such as a resin material, such an inconvenience can still be avoided.

Moreover, in the disk cartridge of the present invention, while the disk storage portions are rotating to make a transition from the first or second opened state into the closed state, the locking members can move from the third pair of positions to the second pair of positions. Thus, there is no need to externally operate and move the locking members while the disk storage portions are closed.

Furthermore, the disk cartridge of the present invention is designed such that by bringing portions of the locking members and portions of the supporting base member into contact with each other, the locking members can move from the third pair of positions to the second pair of positions while the respective disk storage portions are closing. In this manner, the locking members can be interlocked with each other just as intended using a simple arrangement with no additional members provided.

What is more, in the disk cartridge of the present invention, the locking members are supported so as to be slidable with respect to the respective disk storage portions. As a result, a locking mechanism can be formed easily with the space saved.

Also, the disk cartridge of the present invention is designed such that the locking members can be attached to the respective disk storage portions that have been fitted into the supporting base member. That is to say, since the locking members can be attached to the disk storage portions that have been settled on the supporting base member, the assembling process can be performed more smoothly.

Furthermore, in the disk cartridge of the present invention, a wide opening for attaching the locking members to the respective disk storage portions that have been fitted into the supporting base member is provided for the lock guide portions, thus making it possible to get the assembling process done more accurately.

Besides, in the disk cartridge of the present invention, checking portions for preventing the locking members once attached from coming off accidentally are provided for the opening of the lock guide portions. As a result, the locking members will not come off accidentally just after having been attached to the disk storage portions, among other things.

In addition, in the disk cartridge of the present invention, locking member stoppers are provided for the supporting base member, thus further providing the function of preventing the locking members from dropping off for the checking portions and realizing double drop-off preventing function. As a result, even if the disk cartridge is subjected to a great force that is too strong for the checking portions to handle, e.g., even if the disk cartridge is subjected to a strong impact while the disk storage portions are closed and when the disk cartridge could be unloaded from the disk drive, it is still possible to prevent the locking members from dropping off the respective disk storage portions. As a result, the unwanted situation where the locking members drop off accidentally to open the disk storage portions unnecessarily while the disk cartridge is being unloaded from the disk drive can be avoided with more certainty.

Furthermore, in the disk cartridge of the present invention, only while the respective disk storage portions are closed, the stop function of the locking member stoppers is enabled. In other words, while the disk storage portions are opened, the locking members can be positioned at the fourth pair of positions and the disk cartridge can be designed more freely.

On top of that, the checking portions are designed so as to insert the locking members into the lock guide portions more easily and prevent, with more certainty, the locking members from dropping off. However, the ability of the checking portions to prevent the drop-off of the locking members is naturally inferior to that of the locking member stoppers. In the disk cartridge of the present invention, the function of preventing the locking members from dropping off the lock guide portions is mainly performed by the locking member stoppers, which are provided only for the purpose of drop-off prevention, not by the checking portions. As a result, it is possible to prevent, with more certainty and more security, the locking members from dropping off the disk storage portions.

Furthermore, in the disk cartridge of the present invention, body positioning holes and storage portion positioning holes (A), which can receive the same pair of positioning pins in positioning the disk cartridge, are provided. Thus, when the disk included in the disk cartridge in the first opened state is accessed by the disk drive, the respective disk storage portions and the supporting base member can be held in the first opened state just as intended and can be accurately positioned with respect to the disk drive.

Furthermore, in the disk cartridge of the present invention, body positioning holes and storage portion positioning holes (B), which can receive the same pair of positioning pins in positioning the disk cartridge, are provided. Thus, when the disk is inserted into the disk cartridge in the second opened state, the respective disk storage portions and the supporting base member can be held in the second opened state just as intended and can be accurately positioned with respect to the base member during the process step of inserting the disk.

In addition, in the first and second opened states of the disk storage portions, the disk cartridge is positioned with respect to the disk drive and to the base during the process step of inserting the disk, respectively, by using the same pair of body positioning holes of the supporting base member. That is why the positioning pins to be inserted into the holes in those two situations can be located at the same pair of positions. And the testing equipment can also be used in common in those two situations. This arrangement is effective particularly when the disk itself is tested by using the disk drive as a part of the testing equipment.

Furthermore, in the disk cartridge of the present invention, storage portion positioning holes and body positioning holes (A), which can receive the same pair of positioning pins in positioning the disk cartridge, are provided. Thus, when the disk included in the disk cartridge in the first opened state is accessed by the disk drive, the respective disk storage portions and the supporting base member can be held in the first opened state just as intended and can be accurately positioned with respect to the disk drive.

Furthermore, in the disk cartridge of the present invention, storage portion positioning holes and body positioning holes (B), which can receive the same pair of positioning pins in positioning the disk cartridge, are provided. Thus, when the disk is inserted into the disk cartridge in the second opened state, the respective disk storage portions and the supporting base member can be held in the second opened state just as intended and can be accurately positioned with respect to the base member during the process step of inserting the disk.

In this manner, by using mutually different pairs of body positioning holes (A) and (B) for the supporting base member in the first and second opened states of the disk storage portions, the disk cartridge is positioned with respect to the disk drive that is going to access the disk in the disk cartridge and to the base member during the process step of inserting the disk, respectively. Consequently, it is possible to avoid an error such as using the disk storage portions in the second opened state by mistake when a disk cartridge in the first opened state should be loaded into the disk drive or using the disk cartridge in the first opened state by mistake when the disk should be inserted into the disk cartridge in the second opened state.

On top of that, in the disk cartridge of the present invention, leaf springs may be used as the elastic portions. In that case, the elastic force to recover the first slide state from the second slide state can be applied by a simplified arrangement.

Furthermore, in the disk cartridge of the present invention, the elastic portions may form integral parts of the locking members. Then, the number of members required can be reduced.

What is more, in the disk cartridge of the present invention, the locking members may be made of a resin material. Then, the shape of the locking members may be determined more freely at a reduced cost.

In addition, in the disk cartridge of the present invention, the lock guide portions are arranged concentrically to the disk enclosed in the disk storage portions. Thus, guides for the locking members can be provided with the space saved.

Furthermore, in the disk cartridge of the present invention, locking members that prevent the disk storage portions once closed from being opened unnecessarily are provided the two disk storage portions, respectively. As a result, the locking function can be performed just as intended with the resistance to disturbances increased.

Also, in the disk cartridge of the present invention, the clearances are notches with an arc shape, of which the centers are defined in the rotation supporting portions. Thus, the clearances can be provided efficiently in minimum required areas.

Furthermore, in the disk cartridge of the present invention, the catching protrusions are parts of ribs in an arc shape, of which the centers are also defined in the rotation supporting portions. Thus, the catching protrusions can be provided efficiently in minimum required areas.

INDUSTRIAL APPLICABILITY

The disk cartridge of the present invention can be used effectively to enclose a disk storage medium that is compliant with any various recording/playback formats. Also, even when the disk cartridge of the present invention is subjected to a serious disturbance, e.g., dropped or stepped on accidentally, the disk cartridge has such high mechanical strength as to withstand such a disturbance easily. On top of that, the disk cartridge of the present invention is highly dustproof, too, and therefore, can be used very effectively to carry and enclose a storage medium on which data is stored highly densely. In addition, a big head access window can be created for a cartridge of such a shape, and a head for disks of a large size can also be used in a small-sized disk drive. As a result, a disk cartridge that allows a small-sized disk drive for a disk camcorder, for example, to use a normal large head can be provided.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

The invention claimed is:

1. A disk cartridge comprising
first and second disk storage portions, each having a space to partially store a disk with at least one data storage side, wherein when closed up, the first and second disk storage portions enclose the disk entirely,
a supporting base member with a disk storage portion rotation supporting portion that supports rotatably the first and second disk storage portions so as to make or cover an opening with respect to the disk, the opening being used to get the disk chucked externally and to allow a head to access the data storage side of the disk and read and/or write data from/on that side, and
at least one locking member for locking the first and second disk storage portions closed and preventing the first and/or second disk storage portion(s) from rotating with respect to the supporting base member,
wherein at least a portion of the supporting base member overlaps with the first and second disk storage portions so as to prevent the first and second disk storage portions from moving perpendicularly to the disk, and
wherein the first and second disk storage portions assume either a first opened state in which the disk is not removable or a second opened state in which the disk is removable.

2. The disk cartridge of claim 1, wherein each of the first and second disk storage portions has a flat and thin inner space to store at least a portion of the disk, and
wherein the first and second disk storage portions store the disk so as to prevent the disk from being exposed at least where the first and second disk storage portions closed do not overlap with the supporting base member.

3. The disk cartridge of claim 2, wherein the supporting base member overlaps with only parts of the first and second disk storage portions that are located closer to the disk storage portion rotation supporting portion with respect to the center of the disk that is enclosed in the first and second disk storage portions closed.

4. The disk cartridge of claim 1, wherein the first and second disk storage portions have parts engaging with each other and rotate in mutually opposite directions synchronously with each other.

5. The disk cartridge of claim 4, wherein the supporting base member includes first and second locking members that prevent the first and second disk storage portions closed up from rotating unnecessarily.

6. The disk cartridge of claim 5, wherein the first and second locking members are supported rotatably by a locking member rotation supporting portion that is arranged on the supporting base member, and
wherein the disk cartridge further includes:
catching lever portions to contact with respective latching portions of the first and second disk storage portions that are closed up;
restriction planes for restricting the rotation of the first and second locking members in the same directions as the first and second disk storage portions that are turning to make the opening by contacting partially with the supporting base member;
unlocking levers; and
elastic portions for applying elastic force to the first and second locking members to make the first and second locking members rotate in the same directions as the first and second disk storage portions that are turning to make the opening,
wherein a distance between the locking member rotation supporting portion and the disk storage portion rotation supporting portion is equal to or shorter than a distance from the latching portions of the first and second disk storage portions to the disk storage portion rotation supporting portion, and wherein when the latching portions of the first and second disk storage portions contact with the catching lever portion while the first and second disk storage portions closed are going to rotate, the restriction planes contact with parts of the supporting base member, thereby restricting the rotation of the first and second locking members in the same directions as the first and second disk storage portions, and the unlocking levers are pressed down, thereby rotating the first and second locking members in mutually opposite directions and releasing the catching lever portions from the latching portions of the first and second disk storage portions.

7. The disk cartridge of claim 5, wherein the first and second locking members are arranged symmetrically with respect to not only a line segment that connects together the center of the disk and the midpoint between the centers of the disk storage portion rotation supporting portion but also a plane including the axis of rotation of the disk.

8. The disk cartridge of claim 1, wherein at least one of the first and second disk storage portions includes a drive interlocking portion to interlock with an external disk drive in order to open or close the first and second disk storage portions.

9. The disk cartridge of claim 8, wherein the drive interlocking portion is a groove that has been cut through a side surface of the first and second disk storage portions.

10. The disk cartridge of claim 1, wherein the locking member is supported rotatably with respect to the first and/or second disk storage portion(s), and wherein the locking member is located at one of:
a first position in which the locking member locks the first and second disk storage portions closed and prevents the first and second disk storage portions from rotating with respect to the supporting base member;
a second position in which the first and second disk storage portions are rotatable and are able to make a transition from the closed state into the first opened state, or vice versa;
a third position in the first opened state; and
a fourth position in the second opened state.

* * * * *